US007463370B2

(12) United States Patent
Yada et al.

(10) Patent No.: US 7,463,370 B2

(45) Date of Patent: Dec. 9, 2008

(54) RECORDING APPARATUS

(75) Inventors: Junya Yada, Nagano-ken (JP); Tomohiro Takahashi, Nagano-ken (JP); Koichi Ono, Nagano-ken (JP); Shunsaku Miyazawa, Nagano-ken (JP); Toshihiko Katayama, Nagano-ken (JP); Hideyuki Narusawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1171 days.

(21) Appl. No.: 10/674,810

(22) Filed: Oct. 1, 2003

(65) Prior Publication Data

US 2005/0099660 A1 May 12, 2005

(30) Foreign Application Priority Data

| | | | |
|---|---|---|---|
| Oct. 1, 2002 | (JP) | ............................. | 2002-288977 |
| Oct. 2, 2002 | (JP) | ............................. | 2002-290404 |
| Oct. 2, 2002 | (JP) | ............................. | 2002-290405 |
| Apr. 16, 2003 | (JP) | ............................. | 2003-111331 |
| Sep. 19, 2003 | (JP) | ............................. | 2003-329167 |

(51) Int. Cl.
*G06F 15/00* (2006.01)
*H04N 1/40* (2006.01)

(52) U.S. Cl. .......................... 358/1.1; 358/1.3; 358/1.8; 358/2.1

(58) Field of Classification Search .................. 358/1.1, 358/1.3, 1.8, 2.1
See application file for complete search history.

(56) References Cited

FOREIGN PATENT DOCUMENTS

| | | | |
|---|---|---|---|
| JP | 09-037000 | | 2/1997 |
| JP | 11-240227 | A | 9/1999 |
| JP | 2000-062293 | A | 2/2000 |
| JP | 2000-165632 | A | 6/2000 |
| JP | 2001-061042 | A | 3/2001 |
| JP | 2001-225515 | A | 8/2001 |
| JP | 2001-256008 | A | 9/2001 |
| JP | 2001-358953 | A | 12/2001 |
| JP | 2002-219830 | | 8/2002 |

*Primary Examiner*—Houshang Safaipour
(74) *Attorney, Agent, or Firm*—Sughrue Mion, PLLC

(57) ABSTRACT

A recording apparatus, and so forth, capable of outputting at high speed is provided. Second recording data that are stored in a memory based on data obtained by a data obtaining section are transferred to a data generator via a second transfer path, and based on the second recording data that have been transferred, the data generator generates first recording data for performing recording on a medium.

17 Claims, 37 Drawing Sheets

Image of pixels read from original one pixel main-scanning direction

| 1 | 2 | 3 | 4 | 5 | 6 | 7 | 8 | 9 | 10 | 11 | 12 | ...... | 78 | 79 | 80 |
|---|---|---|---|---|---|---|---|---|---|---|---|---|---|---|---|
| 81 | 82 | 83 | 84 | 85 | 86 | 87 | 88 | 89 | 90 | 91 | 92 | ...... | 158 | 159 | 160 |
| 161 | 162 | 163 | 164 | 165 | 166 | 167 | 168 | 169 | 170 | 171 | 172 | ...... | 238 | 239 | 240 |
| 241 | 242 | 243 | 244 | 245 | 246 | 247 | 248 | 249 | 250 | 251 | 252 | ...... | 318 | 319 | 320 |
| 321 | 322 | 323 | 324 | 325 | 326 | 327 | 328 | 329 | 330 | 331 | 332 | ...... | 398 | 399 | 400 |
| 401 | 402 | 403 | 404 | 405 | 406 | 407 | 408 | 409 | 410 | 411 | 412 | ...... | 478 | 479 | 480 |
| 481 | 482 | 483 | 484 | 485 | 486 | 487 | 488 | 489 | 490 | 491 | 492 | ...... | 558 | 559 | 560 |
| 561 | 562 | 563 | 564 | 565 | 566 | 567 | 568 | 569 | 570 | 571 | 572 | ...... | 638 | 639 | 640 |
| 641 | 642 | 643 | 644 | 645 | 646 | 647 | 648 | 649 | 650 | 651 | 652 | ...... | 718 | 719 | 720 |
| 721 | 722 | 723 | 724 | 725 | 726 | 727 | 728 | 729 | 730 | 731 | 732 | ...... | 798 | 799 | 800 |
| 801 | 802 | 803 | 804 | 805 | 806 | 807 | 808 | 809 | 810 | 811 | 812 | ...... | 878 | 879 | 880 |
| 881 | 882 | 883 | 884 | 885 | 886 | 887 | 888 | 889 | 890 | 891 | 892 | ...... | 958 | 959 | 960 |
| 961 | 962 | 963 | 964 | 965 | 966 | 967 | 968 | 969 | 970 | 971 | 972 | ...... | 1038 | 1039 | 1040 |
| 1041 | 1042 | 1043 | 1044 | 1045 | 1046 | 1047 | 1048 | 1049 | 1050 | 1051 | 1052 | ...... | 1118 | 1119 | 1120 |
| 1121 | 1122 | 1123 | 1124 | 1125 | 1126 | 1127 | 1128 | 1129 | 1130 | 1131 | 1132 | ...... | 1198 | 1199 | 1200 |
| 1201 | 1202 | 1203 | 1204 | 1205 | 1206 | 1207 | 1208 | 1209 | 1210 | 1211 | 1212 | ...... | 1278 | 1279 | 1280 |
| 1281 | 1282 | 1283 | 1284 | 1285 | 1286 | 1287 | 1288 | 1289 | 1290 | 1291 | 1292 | ...... | 1358 | 1359 | 1360 |
| : | : | : | : | : | : | : | : | : | : | : | : | : | : | : | : |
| : | : | : | : | : | : | : | : | : | : | : | : | : | : | : | : |

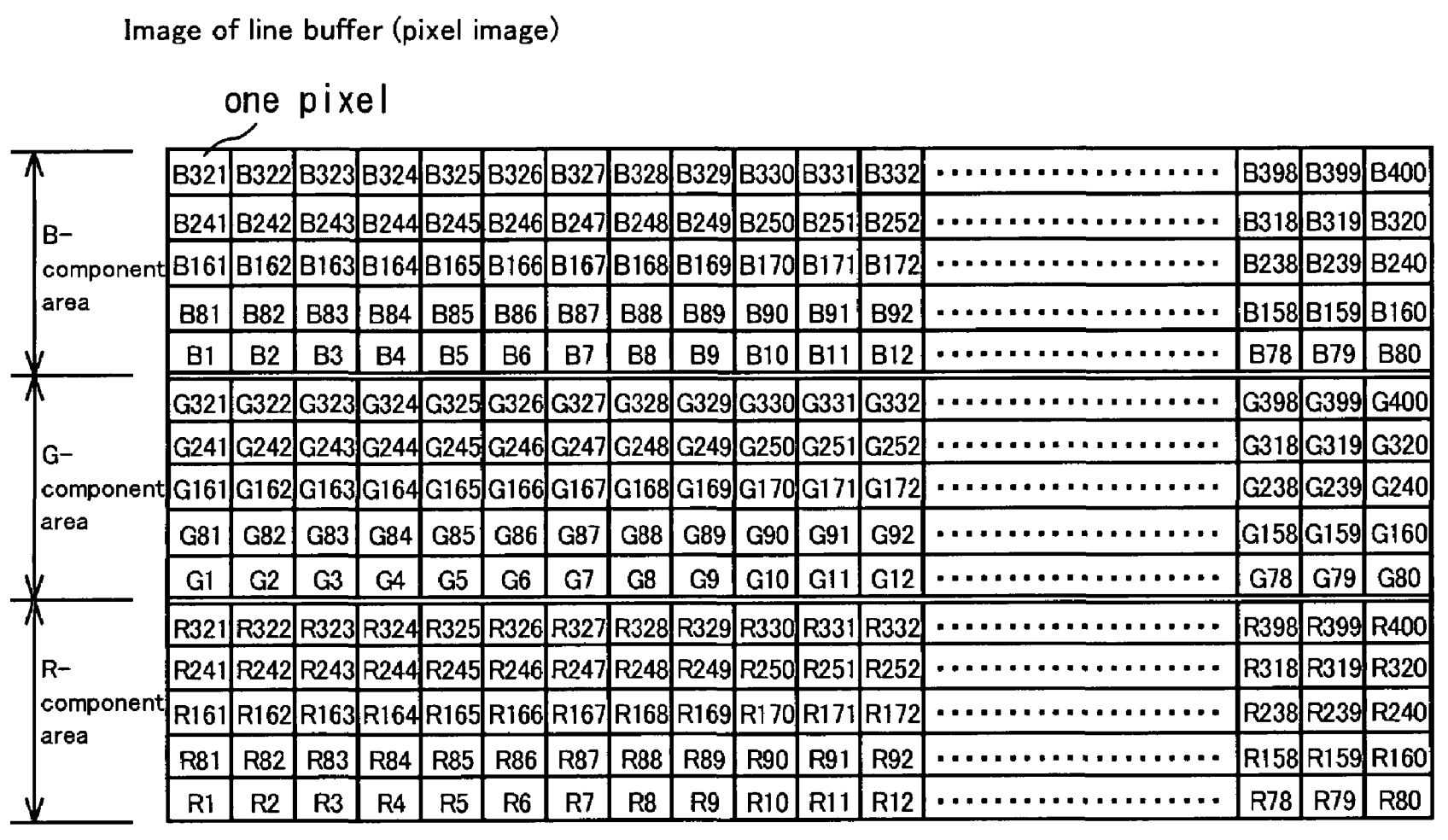

Image of line buffer (pixel image)

one pixel

| | | | | | | | | | | | | | | | | |
|---|---|---|---|---|---|---|---|---|---|---|---|---|---|---|---|---|
| B-component area | B321 | B322 | B323 | B324 | B325 | B326 | B327 | B328 | B329 | B330 | B331 | B332 | ........ | B398 | B399 | B400 |
| | B241 | B242 | B243 | B244 | B245 | B246 | B247 | B248 | B249 | B250 | B251 | B252 | ........ | B318 | B319 | B320 |
| | B161 | B162 | B163 | B164 | B165 | B166 | B167 | B168 | B169 | B170 | B171 | B172 | ........ | B238 | B239 | B240 |
| | B81 | B82 | B83 | B84 | B85 | B86 | B87 | B88 | B89 | B90 | B91 | B92 | ........ | B158 | B159 | B160 |
| | B1 | B2 | B3 | B4 | B5 | B6 | B7 | B8 | B9 | B10 | B11 | B12 | ........ | B78 | B79 | B80 |
| G-component area | G321 | G322 | G323 | G324 | G325 | G326 | G327 | G328 | G329 | G330 | G331 | G332 | ........ | G398 | G399 | G400 |
| | G241 | G242 | G243 | G244 | G245 | G246 | G247 | G248 | G249 | G250 | G251 | G252 | ........ | G318 | G319 | G320 |
| | G161 | G162 | G163 | G164 | G165 | G166 | G167 | G168 | G169 | G170 | G171 | G172 | ........ | G238 | G239 | G240 |
| | G81 | G82 | G83 | G84 | G85 | G86 | G87 | G88 | G89 | G90 | G91 | G92 | ........ | G158 | G159 | G160 |
| | G1 | G2 | G3 | G4 | G5 | G6 | G7 | G8 | G9 | G10 | G11 | G12 | ........ | G78 | G79 | G80 |
| R-component area | R321 | R322 | R323 | R324 | R325 | R326 | R327 | R328 | R329 | R330 | R331 | R332 | ........ | R398 | R399 | R400 |
| | R241 | R242 | R243 | R244 | R245 | R246 | R247 | R248 | R249 | R250 | R251 | R252 | ........ | R318 | R319 | R320 |
| | R161 | R162 | R163 | R164 | R165 | R166 | R167 | R168 | R169 | R170 | R171 | R172 | ........ | R238 | R239 | R240 |
| | R81 | R82 | R83 | R84 | R85 | R86 | R87 | R88 | R89 | R90 | R91 | R92 | ........ | R158 | R159 | R160 |
| | R1 | R2 | R3 | R4 | R5 | R6 | R7 | R8 | R9 | R10 | R11 | R12 | ........ | R78 | R79 | R80 |

FIG. 12

Image of interlace buffer (data block image)

| area | | | | | |
|---|---|---|---|---|---|
| black binary data even-number dot area | : | : | : | : | : |
| | K2 | K4 | K6 | K8 | K10 |
| black binary data odd-number dot area | : | : | : | : | : |
| | K1 | K3 | K5 | K7 | K9 |
| yellow binary data even-number dot area | : | : | : | : | : |
| | Y2 | Y4 | Y6 | Y8 | Y10 |
| yellow binary data odd-number dot area | : | : | : | : | : |
| | Y1 | Y3 | Y5 | Y7 | Y9 |
| magenta binary data even-number dot area | : | : | : | : | : |
| | M2 | M4 | M6 | M8 | M10 |
| magenta binary data odd-number dot area | : | : | : | : | : |
| | M1 | M3 | M5 | M7 | M9 |

cyan binary data even-number dot area:

| C42 | C44 | C46 | C48 | C50 |
|---|---|---|---|---|
| C32 | C34 | C36 | C38 | C40 |
| C22 | C24 | C26 | C28 | C30 |
| C12 | C14 | C16 | C18 | C20 |
| C2 | C4 | C6 | C8 | C10 |

cyan binary data odd-number dot area:

| C161 | C163 | C165 | C167 | C169 |
|---|---|---|---|---|
| C151 | C153 | C155 | C157 | C159 |
| C141 | C143 | C145 | C147 | C149 |
| C131 | C133 | C135 | C137 | C139 |
| C121 | C123 | C125 | C127 | C129 |
| C111 | C113 | C115 | C117 | C119 |
| C101 | C103 | C105 | C107 | C109 |
| C91 | C93 | C95 | C97 | C99 |
| C81 | C83 | C85 | C87 | C89 |
| C71 | C73 | C75 | C77 | C79 |
| C61 | C63 | C65 | C67 | C69 |
| C51 | C53 | C55 | C57 | C59 |
| C41 | C43 | C45 | C47 | C49 |
| C31 | C33 | C35 | C37 | C39 |
| C21 | C23 | C25 | C27 | C29 |
| C11 | C13 | C15 | C17 | C19 |
| C1 | C3 | C5 | C7 | C9 |

← 64 bits

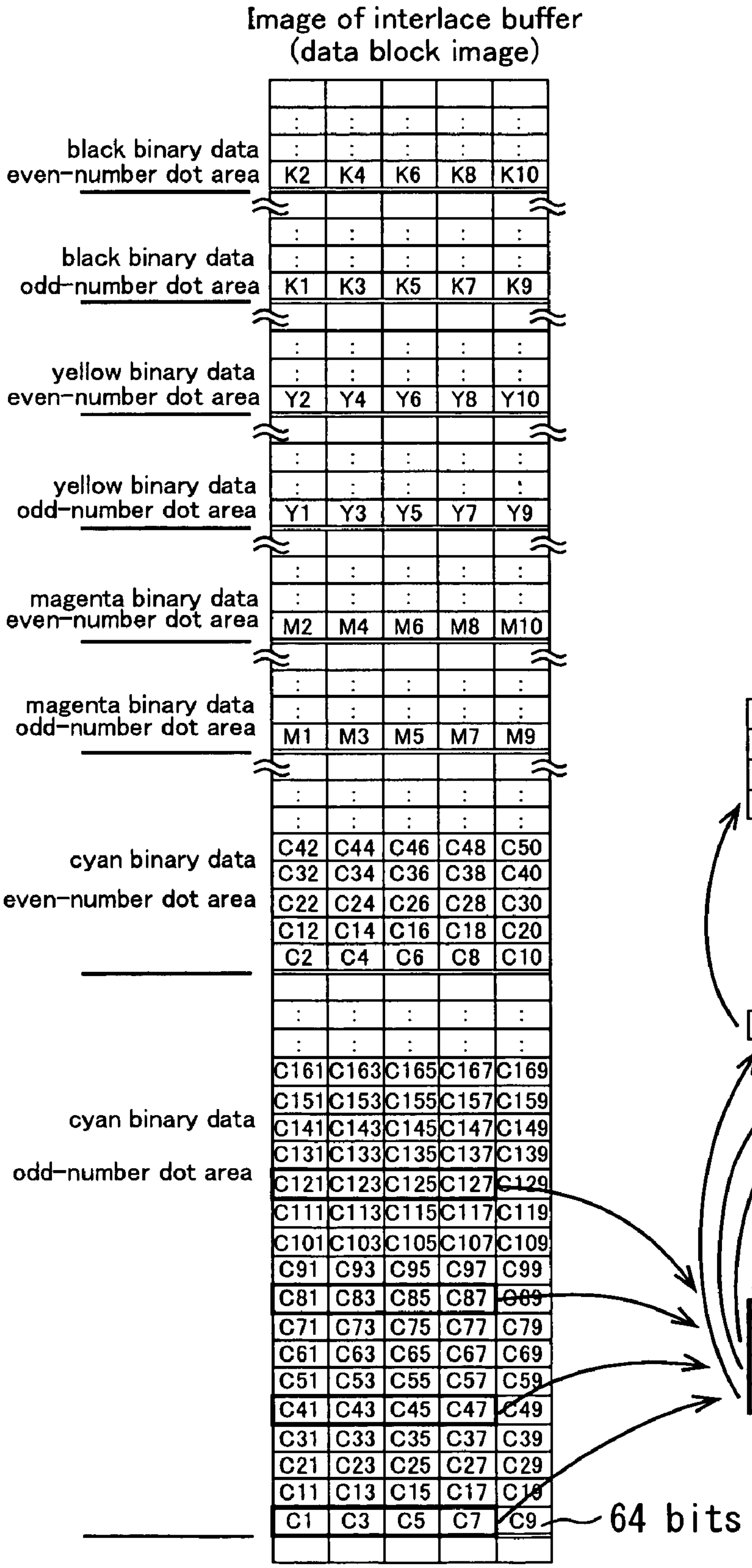

FIG. 13A

SRAM image

| C7 | C47 | C87 | C127 |
|---|---|---|---|
| C5 | C45 | C85 | C125 |
| C3 | C43 | C83 | C123 |
| C1 | C41 | C81 | C121 |

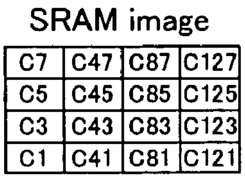

FIG. 13D register image

| C1 | C41 | C81 | C121 |
|---|---|---|---|

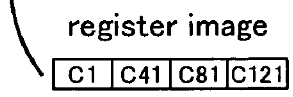

FIG. 13C

SRAM image

| C121 | C123 | C125 | C127 |
|---|---|---|---|
| C81 | C83 | C85 | C87 |
| C41 | C43 | C45 | C47 |
| C1 | C3 | C5 | C7 |

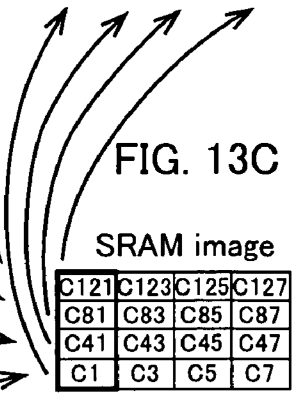

FIG. 13B

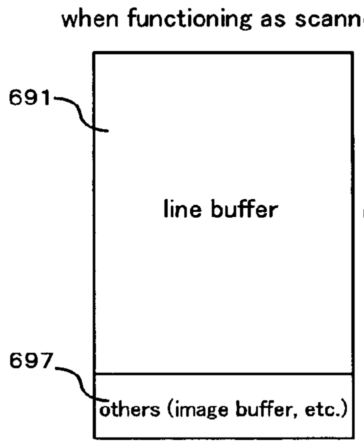
FIG. 17A
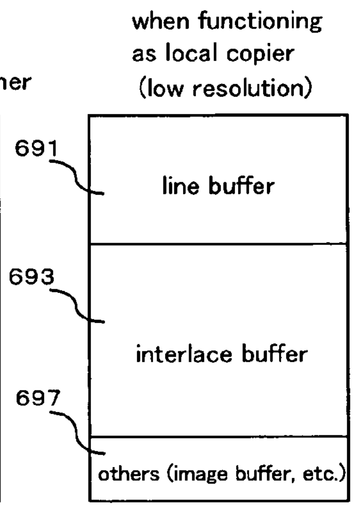
FIG. 17B
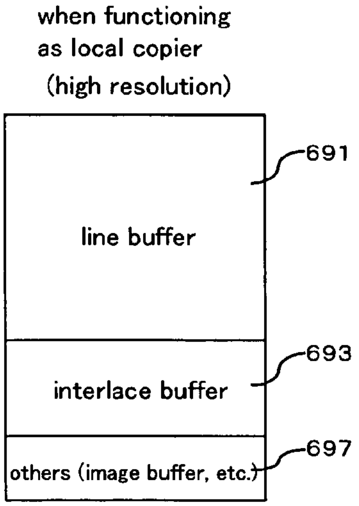
FIG. 17C
| operation | | allocated addresses | | |
|---|---|---|---|---|
| | | line buffer | interlace buffer | others |
| when functioning as scanner | | 0000h～CFFFh | none | D000h～FFFFh |
| when functioning as local copier | low resolution | 0000h～4FFFh | 5000h～CFFFh | D000h～FFFFh |
| | high resolution | 0000h～7FFFh | 8000h～CFFFh | D000h～FFFFh |
FIG. 18

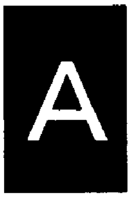
FIG. 24
FIG. 25A
FIG. 25B
FIG. 25C
FIG. 25D
FIG. 25E
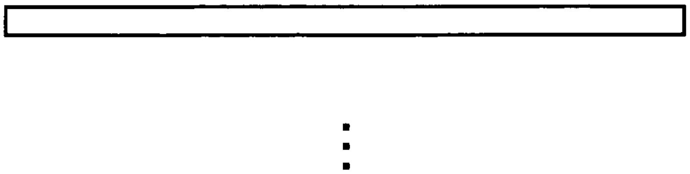

RECORDING APPARATUS

CROSS-REFERENCE TO RELATED APPLICATIONS

The present application claims priority upon Japanese Patent Application No. 2002-290404 filed Oct. 2, 2002, Japanese Patent Application No. 2002-290405 filed Oct. 2, 2002, Japanese Patent Application No. 2003-111331 filed Apr. 16, 2003, Japanese Patent Application No. 2003-329167 filed Sep. 19, 2003, and Japanese Patent Application No. 2002-288977 filed Oct. 1, 2002, which are herein incorporated by reference.

BACKGROUND OF THE INVENTION

1. Field of the Invention

The present invention relates to recording apparatuses for recording according to recording data.

2. Description of the Related Art

Scanner-equipped printers that have scanner sections for taking in original images and printer sections for performing printing according to the supplied print data are known as an example of recording apparatuses that perform recording according to recording data. In scanner-equipped printers, a CPU that takes control over the entire apparatus and an external memory that is directly accessible from the CPU are connected via a bus. The RGB image data taken in from the scanner section are stored in the above-mentioned external memory via the bus, and according to processing by the CPU, the data are converted on the external memory into print data for enabling printing. The converted print data are sent out to the printer section via the bus, and the printer section performs printing according to the print data.

In conventional scanner-equipped printers as described above, the RGB image data taken in from the scanner section and the converted print data are sent out via the bus. Further, conversion from the RGB image data to the print data is a process carried out by the CPU according to software, and since data are exchanged via the bus even during this process, an extremely large amount of data flows through the bus.

The bus is also connected to the CPU that takes control over the entire apparatus, and as a matter of course, control signals also flow through this bus. That is, there has been a problem that, if the traffic in the bus is heavy, then the control process speed of the apparatus drops, and therefore, the output speed of the scanner-equipped printer becomes slow.

Further, when the CPU is handling other processes, it is necessary to wait for the bus to become free, and such controls as to forcedly interrupt the use of the bus by the CPU in order to transfer print data with higher priority become necessary.

Further, other than the function of operating as a normal printer for printing on a medium according to print data that have been sent from a host computer, the scanner-equipped printer has a function as a scanner for generating image data from an image in an original read with a scanner section and sending the data to a host computer etc. and a function as a local copier for printing on the medium the original image read by the scanner section.

The image data generated from the original image read by the scanner section are temporarily stored in a predetermined data storage area (also referred to as an image data storage area below), are successively read out from the image data storage area at appropriate timings, and are sent toward the host computer etc. Further, when the original image read by the scanner section is to be printed on a medium, the image data generated from the original image read by the scanner section are successively read out from the image data storage area and are converted into print data for printing. The converted print data are temporarily stored in a predetermined data storage area (also referred to as a print data storage area below) separate from the above-mentioned image data storage area, are successively read out from the print data storage area, and are sent to the printer section.

However, in such scanner-equipped printers, conventionally, the image data storage area for storing the image data generated by the scanner section and the print data storage area for storing the print data generated by converting the image data have been provided separately and in a fixed manner, and therefore, it has been possible to use only the image data storage area for generating the image data from the original image, and use only the print data storage area for generating the print data for printing by converting the image data. This is because the process of generating the image data from the image in the original that has been read by the scanner section and the process of generating the print data for printing from the image data are performed with separate dedicated processing circuits (ASICs), and because the image data storage area and the print data storage area are each provided respectively in a data storage section that is provided in each dedicated processing circuit.

Therefore, a so-called buffering state in which the reading operation stops right in the middle of reading an image from an original with the scanner section tends to arise. Buffering is a state that occurs when all of the image data cannot be stored in the image data storage area, and this occurs when there is a delay in a process of outputting the image data stored in the image data storage area to, for example, a host computer or a process of converting the image data into print data. Particularly, when the read resolution for reading an original is set high, the data amount of the image data that are generated becomes extremely large, and therefore, the number of times buffering occurs becomes large.

Further, as for the above-mentioned scanner-equipped printer, (1) a print mode in which the same image is repeatedly printed on one sheet of paper when small documents are to be printed on paper is known. According to this print mode, a plurality of images are arranged and printed on the paper in the vertical direction and the lateral direction. In such a print mode, the user enters the number of images to be arranged in the vertical direction and the lateral direction. Therefore, the user has to enter the number of images to be arranged in one sheet of paper after estimating how many images can be arranged on the paper.

Further, when the above-mentioned scanner-equipped printer prints an image of image data on paper, the scanner-equipped printer converts the image data into print data. The conversion from the image data into the print data is processed by a CPU of the scanner-equipped printer. If the amount of data to be processed by the CPU increases, the speed of other processes of the CPU drops, and as a result, the print speed drops. Therefore, in order to reduce the amount of data processed by the CPU, it is possible to consider providing a control circuit separate from the CPU and converting the image data into the print data with this control circuit.

On the other hand, it is necessary for the scanner-equipped printer to lay out the image of the image data for printing. Since the layout processing requires complicated computations, it is not realistic to make the above-mentioned control circuit to perform even the layout processing.

Further, when the scanner reads an image from an original, or when an application software creates an image, image data in the RGB system are generated. On the other hand, when the image data in the RGB system are printed by the above-mentioned scanner-equipped printer, the image data in the RGB system are converted into image data in the CMYK system that are matched with the colors printable by the printer section. Therefore, the scanner-equipped printer has a data conversion section for converting the image data in the RGB system into image data in the CMYK system.

There are cases in which the apparatus subjects the image of the image data to layout processing and prints the laid out image onto a medium (such as paper and OHP sheets). Therefore, the scanner-equipped printer is provided with a layout section for laying out the image of the image data based on the image data. If the amount of data processed by the layout section can be made small, the amount of time necessary for the layout process can be shortened, and therefore, it would be possible to increase the print speed of the scanner-equipped printer.

SUMMARY OF THE INVENTION

The present invention has been made in view of the foregoing problems, and an object thereof is to provide a recording apparatus in which recording data can be transferred to a recording head without using a CPU bus and that can realize high-speed output by reducing occurrence of buffering as much as possible, enhancing throughput, reducing the amount of data processed by a layout section, and increasing processing speed in layout processing and recording speed.

Further, another object is to provide a recording apparatus having high operability for when a plurality of images are to be arranged on paper.

A main invention is a recording apparatus as follows.

A recording apparatus comprises:

a recording head for performing recording on a medium according to first recording data;

a controller for managing control of the recording apparatus;

a data generator that is connected to the controller via a first transfer path, the data generator being capable of generating the first recording data;

a memory that is connected to the data generator via a second transfer path; and a data obtaining section for obtaining data from an external source, wherein:

second recording data that are stored in the memory based on the data obtained by the data obtaining section are transferred to the data generator through the second transfer path; and based on the second recording data that have been transferred, the data generator generates the first recording data.

Other features of the present invention are made clear by the description below and the accompanying drawings.

BRIEF DESCRIPTION OF THE DRAWINGS

The description below and the accompanying drawings are to be referred to for complete understanding of the present invention and its advantages.

FIG. 12 is a conceptual diagram showing an image of a line buffer in which image data that have been read are stored as data for each color of RGB.

FIGS. 13A through 13D are diagrams for illustrating a method of reading out data from an interlace buffer.

FIG. 17A is an explanatory diagram showing an area allocated to a memory when the apparatus functions as a scanner.

FIG. 17B is an explanatory diagram showing an area allocated to the memory when data are stored with low resolution during local copying function.

FIG. 17C is an explanatory diagram showing an area allocated to the memory when data are stored with high resolution during local copying function.

FIG. 18 is a diagram showing an example of settings information.

FIG. 24 is a conceptual diagram of binary data sent into a first layout buffer 573A.

FIG. 25A is a conceptual diagram of layout image data sent into a second layout buffer 573B first.

FIG. 25B is a conceptual diagram of layout image data sent into the second layout buffer 573B second.

FIG. 25C is a conceptual diagram of layout image data sent into the second layout buffer 573B third.

FIG. 25D is a conceptual diagram of layout image data sent into the second layout buffer 573B fourth.

FIG. 25E is a conceptual diagram of layout image data sent into the second layout buffer 573B fifth.

DETAILED DESCRIPTION OF PREFERRED EMBODIMENTS

Figure 1:
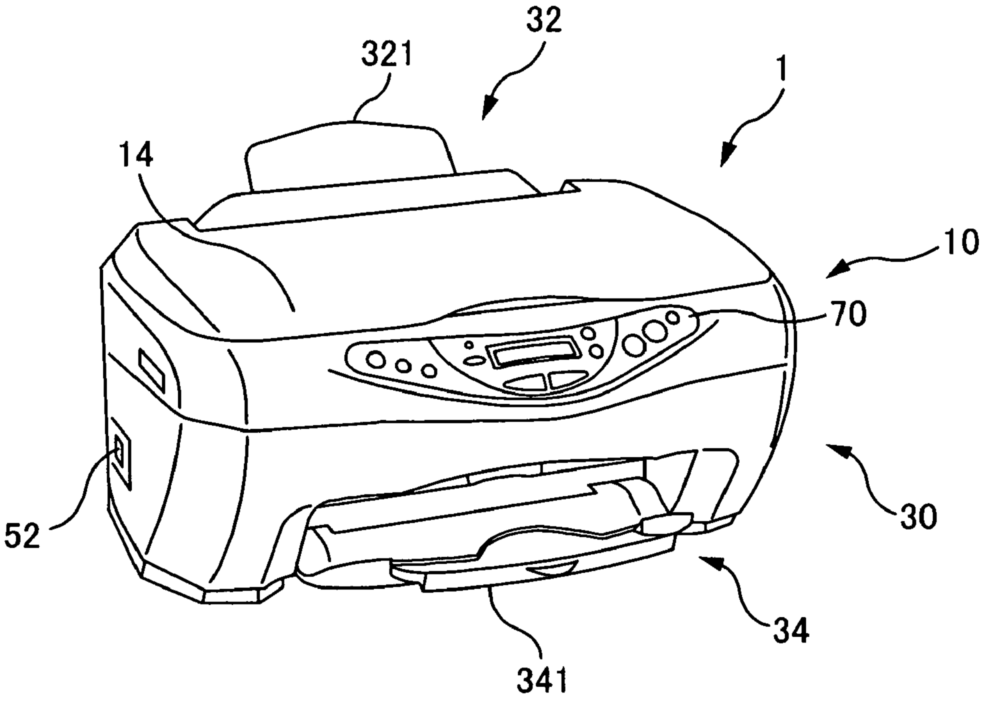
FIG. 1 is a perspective view showing a schematic configuration of a recording apparatus according to a present embodiment.

At least the following matters are made clear by the description of the present specification and the accompanying drawings.

A recording apparatus comprises:

- a recording head for performing recording on a medium according to first recording data;
- a controller for managing control of the recording apparatus;
- a data generator that is connected to the controller via a first transfer path, the data generator being capable of generating the first recording data;
- a memory that is connected to the data generator via a second transfer path; and
- a data obtaining section for obtaining data from an external source, wherein:

- second recording data that are stored in the memory based on the data obtained by the data obtaining section are transferred to the data generator through the second transfer path; and
- based on the second recording data that have been transferred, the data generator generates the first recording data.

According to this recording apparatus, the first and second recording data are transferred between the memory and the data generator via the second transfer path and does not pass through the first transfer path through which the control signals of the controller flow. Therefore, the traffic of the first transfer path does not get heavy because of the recording data, and the process speed of the controller becomes fast because the control signals can flow smoothly through the first transfer path. Therefore, output at high speed is possible.

It is preferable that the data generator has a plurality of processing units;

- the memory is capable of storing unprocessed data that are to be processed by each of the processing units and processed data that have been processed by each of the processing units; and
- each of the processing units
  - obtains the unprocessed data from the memory via the second transfer path,
  - processes the obtained unprocessed data, and
  - transfers the processed data that have been processed to the memory via the second transfer path.

According to this recording apparatus, the plurality of processing units of the data generator obtain the unprocessed data from the memory via the second transfer path and transfer the processed data, which have been obtained by processing the obtained unprocessed data, to the memory via the second transfer path, and in this way, the memory is accessed through the second transfer path when data are to be read from the memory or written into the memory before and after each process. Therefore, since the unprocessed and processed data do not pass through the first transfer path, the traffic of the first transfer path does not get heavy, and therefore, output at high speed is possible because the process speed of the controller does not drop.

It is preferable that the recording head has a plurality of dot forming sections;

- the data generator has at least
  - a color conversion processing unit for performing color conversion processing with respect to the second recording data that have been obtained by the data obtaining section and that are stored in the memory, and
  - a rearrangement unit for rearranging the second recording data that have been subjected to the color conversion processing by the color conversion processing unit into data corresponding to each of the dot forming sections as the plurality of processing units.

According to this recording apparatus, it is possible to perform each process without making the processed and unprocessed data in the color conversion processing with respect to the second recording data that have been obtained by the data obtaining section and that are stored in the memory and the process of rearranging the second recording data that have been subjected to the color conversion processing into data corresponding to each of the dot forming sections pass through the first transfer path. Therefore, the traffic of the first transfer path does not get heavy, and therefore, output at high speed is possible because the process speed of the controller does not drop.

It is preferable that the recording apparatus performs recording on the medium by repeating an operation of carrying the medium in a carrying direction, and an operation of forming dots on the medium with the plurality of dot forming sections while making the recording head move in a direction that intersects the carrying direction; and the data that have been rearranged by the rearrangement unit are used every time the dots are formed on the medium with the plurality of dot forming sections while the recording head is moved in the direction that intersects the carrying direction.

By using the data that have been rearranged by the rearrangement unit every time the dots are formed on the medium with the plurality of dot forming sections while the recording head is moved, each process will be executed every time the operation of carrying the medium and the operation of forming dots on the medium with the plurality of dot forming sections while making the recording head move are repeated. According to the above-mentioned recording apparatus, the traffic of the first transfer path will not become heavy even when data are frequently transferred in each of the processes that are repeated, and output at high speed is possible because the process speed of the controller does not drop.

It is preferable that the data generator has a head control unit for controlling the recording head;

the first recording data stored in the memory are transferred to the head control unit via the second transfer path without passing through the first transfer path; and the head control unit controls the recording head according to the first recording data that have been transferred via the second transfer path.

According to this recording apparatus, since the first recording data stored in the memory are transferred to the head control unit via the second transfer path, the first transfer path is not used for transferring the first recording data. Therefore, it is possible to transfer the first recording data without restricting the usage status of the first transfer path.

Further, it is preferable that the data obtaining section is a scanner for reading an image in an original to obtain data;

the data generator has at least a color conversion processing unit for performing color conversion processing with respect to the second recording data that have been stored in the memory based on the data obtained by the scanner;

the memory has an image data storage area for storing the second recording data that are based on the data obtained by the scanner, and a converted data storage area for storing the data that have been subjected to the color conversion processing by the color conversion unit; and when the second recording data are output to an external source, the second recording data are also stored in the converted data storage area.

According to this recording apparatus, since the second recording data that are based on the data obtained by the scanner are also stored in the converted data storage area, the data storage area for storing the second recording data increases, and therefore it is possible to smoothly perform the processes of reading the image and obtaining data with the scanner. As a result, it is possible to reduce occurrence of buffering.

Further, it is preferable that the data obtaining section is a scanner for reading an image in an original to obtain data;

the data generator has at least a color conversion processing unit for performing color conversion processing with respect to the second recording data that have been stored in the memory based on the data obtained by the scanner;

the memory has an image data storage area for storing the second recording data that are based on the data obtained by the scanner, and a converted data storage area for storing the data that have been subjected to the color conversion processing by the color conversion unit; and a ratio between a size of the image data storage area and a size of the converted data storage area is set according to a read resolution with which the image is read.

By setting the ratio between the area size of the image data storage area and the area size of the converted data storage area according to the read resolution with which the image is read as above, it is possible to appropriately set each of the area size of the image data storage area and the area size of the converted data storage area. For example, if the read resolution is high, the image data storage area is set to be large because the data amount of the second recording data becomes large, whereas if the read resolution is low, the image data storage area is set to be small because the data amount of the second recording data becomes small. In this way, it is possible to use the memory effectively. Therefore, it is possible to smoothly perform the processes of reading the image and obtaining data with the scanner and each of the processes executed by the data generator.

It is preferable that the ratio between the size of the image data storage area and the size of the converted data storage area is set in levels according to a read resolution with which the image is read, and it is further preferable that the setting information about the ratio between the size of the image data storage area and the size of the converted data storage area be stored.

According to this recording apparatus, it is possible to obtain the setting information that has been stored and set the ratio between the area size of the image data storage area and the area size of the converted data storage area easily.

Further, it is preferable that the data obtaining section is a scanner for obtaining data by reading an image in an original;

the controller is capable of generating layout data in which an image of the second recording data that are based on the data obtained by the scanner is laid out;

when an image that has been laid out is to be recorded on the medium, the controller generates layout data in which the image is laid out, and the data generator converts the layout data that have been transferred from the controller via the first transfer path into the first recording data; and when an image that has not been laid out is to be recorded on the medium, the controller does not generate data in which the image is laid out, and the data generator converts the second recording data that have not passed through the first transfer path into the first recording data.

According to this printing apparatus, when an image that has not been laid out is to be recorded on the medium, the controller does not generate data in which the image is laid out. Therefore, the recording data do not have to be transferred via the first transfer path and it is possible to increase the process speed.

It is preferable that the resolution of the second recording data that are based on the data obtained by the scanner differs according to whether the image is to be laid out or not. Further, when the image is to be laid out, the resolution of the second recording data may be at a lower resolution compared to when the image is not to be laid out. In this way, since the amount of data to be processed by the controller becomes small, the process speed increases.

It is preferable that the recording head has a plurality of dot forming sections for forming dots on the medium; and the data generator has a rearrangement unit for rearranging the second recording data to make the data correspond to each of the dot forming sections. In this way, the process speed increases.

It is preferable that the data generator has a color conversion processing unit for performing color conversion processing with respect to the second recording data in the RGB system that have been obtained by the scanner and that are stored in the memory to convert them into recording data in the CMYK system. In this way, the process speed increases. Further, based on the second recording data in the RGB system, the controller generates layout data in the RGB system in which the image of the second recording data is laid out. In this way, since the amount of data to be processed by the layout section becomes small, the process speed increases.

It is preferable that the resolution of the image of the layout data generated by the controller is at a lower resolution than the resolution of the image of the first recording data. In this way, since the amount of data to be processed becomes small, the process speed increases.

Further, it is possible that the data generator has a color conversion processing unit for performing color conversion processing with respect to the second recording data that have been obtained by the data obtaining section and that are stored in the memory, wherein the color conversion processing unit is capable of converting the second recording data in the RGB system into recording data in the CMYK system;

based on the second recording data in the RGB system, the controller generates layout data in the RGB system in which the image of the second recording data is laid out;

the color conversion processing unit converts the layout data in the RGB system that have been generated by the controller into layout data in the CMYK system;

the first recording data are generated from the layout data in the CMYK system that have been converted; and based on the generated first recording data, the recording head records on the medium the image that has been laid out.

In this way, it is possible to reduce the amount of data to be processed by the controller and increase the recording speed of the recording apparatus.

It is preferable that the resolution of the image of the second recording data in the RGB system for when the controller performs layout is lower than the resolution of the image of the layout data in the CMYK system. Since the resolution of the image of the second recording data in the RGB system does not have to be adjusted to match the recording resolution, it is possible to set its resolution at a lower resolution than the resolution of the image of the layout data in the CMYK system.

It is preferable that the recording apparatus further comprises a scanner for obtaining data by reading an image in an original, wherein the data generator generates the second recording data in the RGB system based on the data received from the scanner. In this way, it is possible to generate the second recording data in the RGB system in the data generator.

Schematic Configuration of Recording Apparatus

Figure 2:
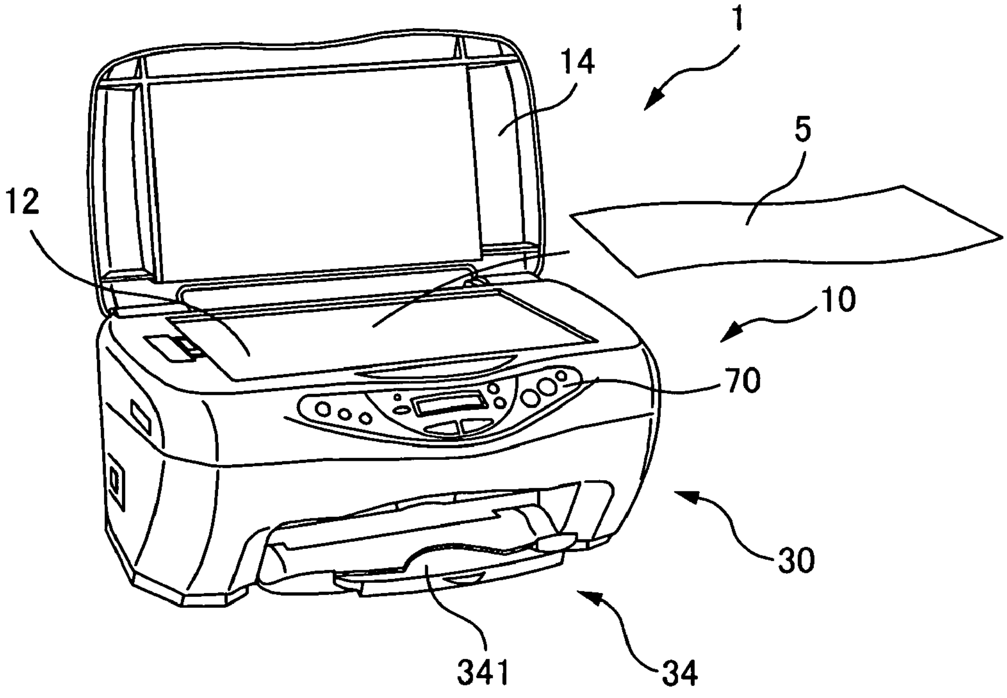
FIG. 2 is a perspective view showing a state in which a cover of a scanner section 10 is opened.
Figure 3:
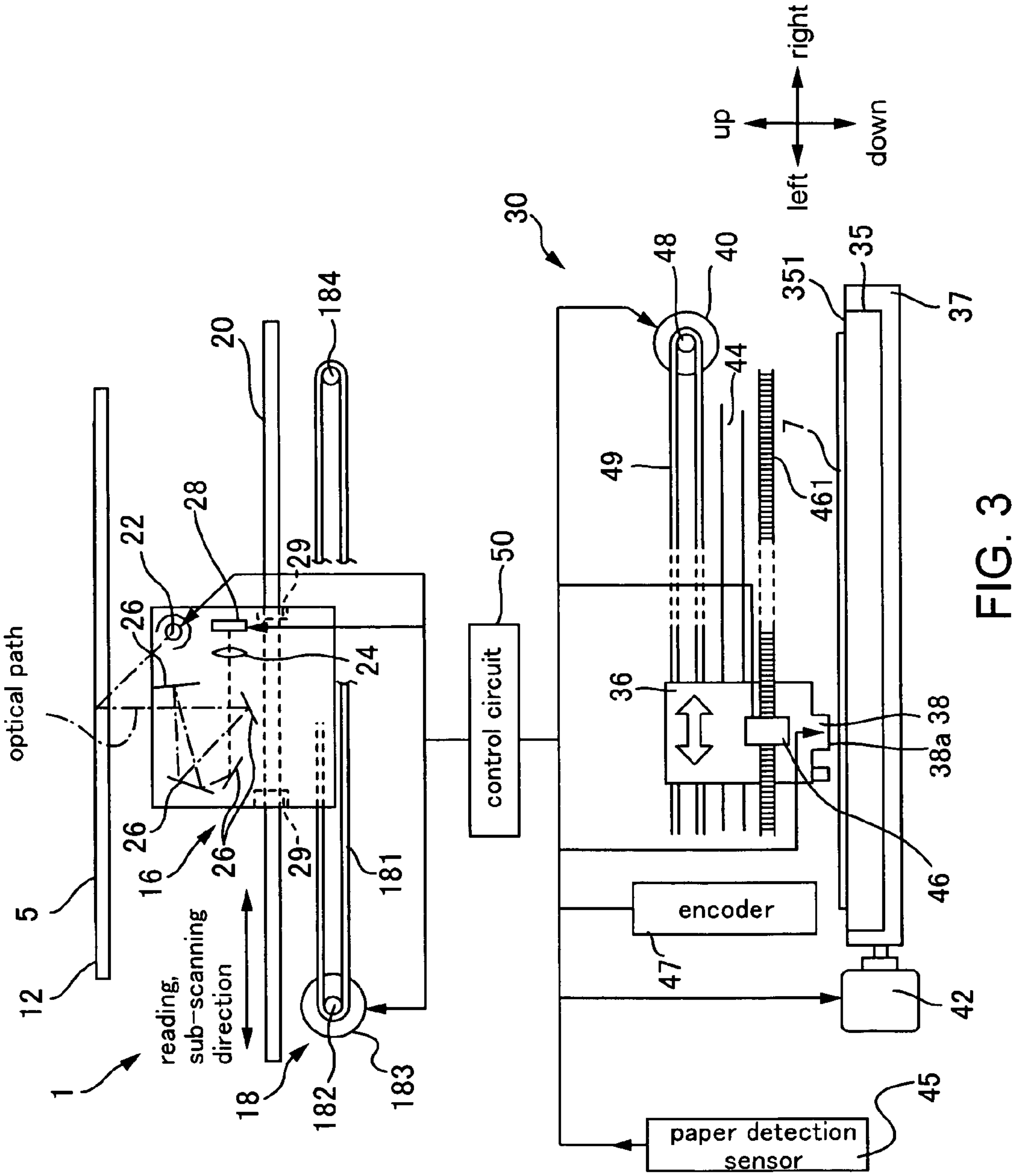
FIG. 3 is an explanatory diagram showing an internal configuration of the recording apparatus.
Figure 4:
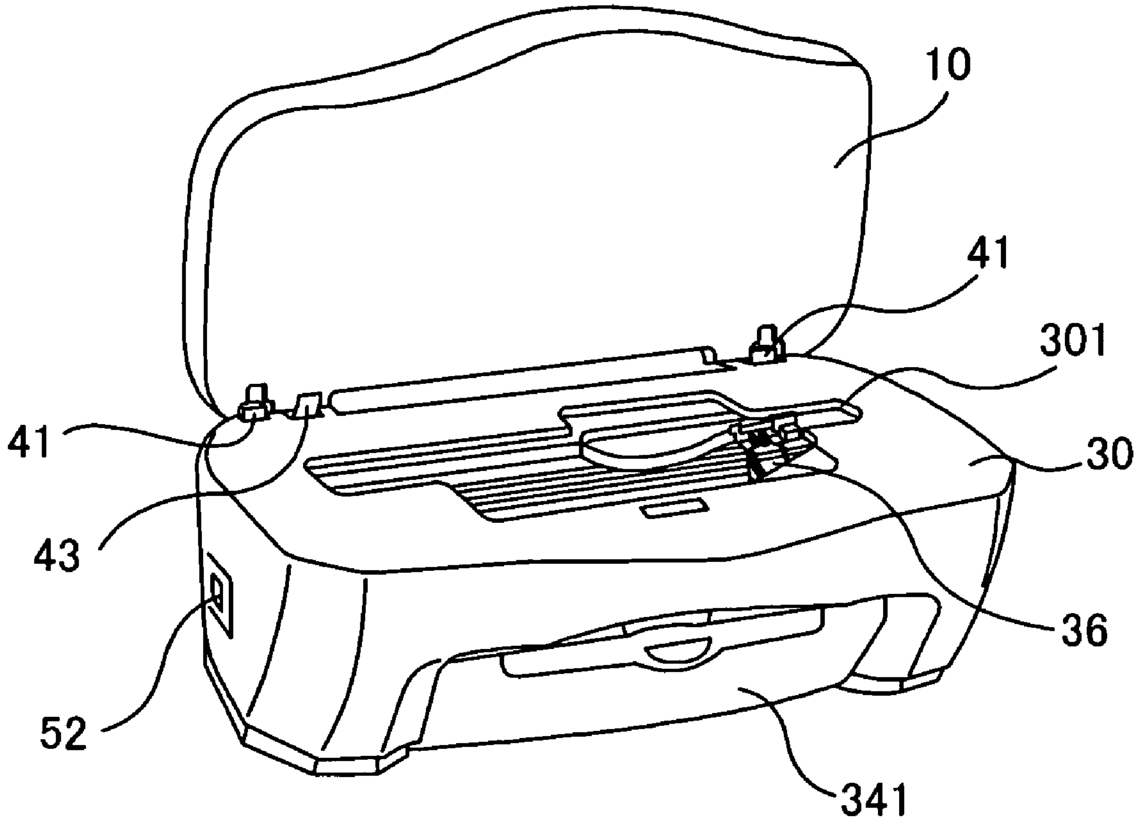
FIG. 4 is a perspective view showing a state in which the inside of a printer section is exposed externally.
Figure 5:
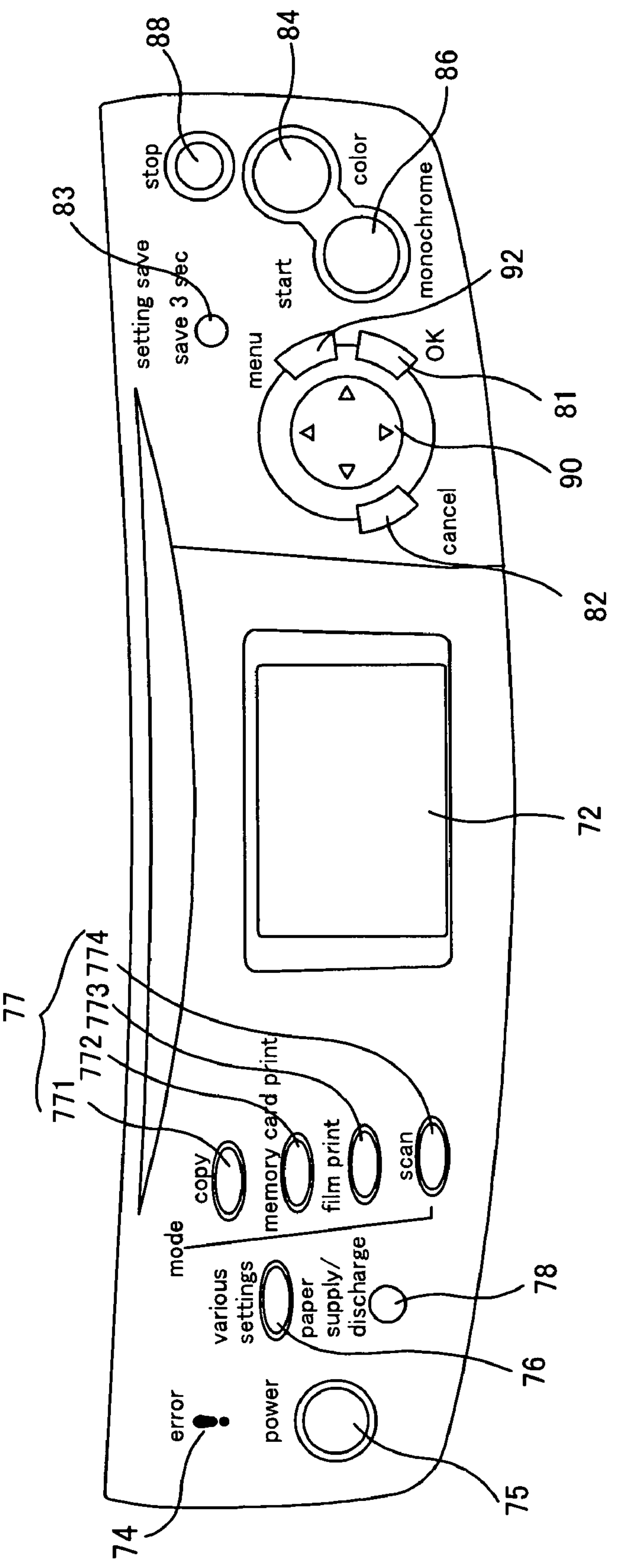
FIG. 5 is a diagram showing an example of a control panel section.

A schematic configuration of a recording apparatus according to the present embodiment is described with reference to FIG. 1 through FIG. 5. FIG. 1 is a perspective view showing a schematic configuration of a recording apparatus according to the present embodiment, FIG. 2 is a perspective view showing a state in which a cover of a scanner section 10 is opened, FIG. 3 is an explanatory diagram showing an internal configuration of the recording apparatus, FIG. 4 is a perspective view showing a state in which the inside of a printer section is exposed externally, and FIG. 5 is a diagram showing an example of a control panel section. The recording apparatus of the present embodiment is a scanner/printer/copier multifunction apparatus (referred to as an SPC multifunction apparatus below) that has the function as a scanner for inputting an original image, the function as a printer that prints an image on a medium such as paper according to image data, and the function as a local copier that prints, on paper and so forth, the image input by the scanner function.

The SPC multifunction apparatus 1 has a scanner section 10 that serves as a data obtaining section for reading an image of an original 5 to obtain image data, a printer section 30 that prints an image on a medium, such as paper, according to the image data, a control circuit 50 that manages control over the entire SPC multifunction apparatus 1, and a control panel section 70 serving as input means. Under control of the control circuit 50, the scanner function, the printer function, and the local-copier function for printing the data input from the scanner section 10 with the printer section 30 are achieved.

The scanner section 10 is arranged above the printer section 30, and on the upper portion of the scanner section 10 are provided an original bed glass 12 for placing the original 5 to be read, and an original bed cover 14 that covers the original bed glass 12 when the sheet-like original 5 is being read or when the apparatus is not in use. The original bed cover 14 is formed to be openable and closable and also has the function of pressing the original placed on the original bed glass 12 toward the original bed glass 12 when the cover is closed. Further, on the rear side of the SPC multifunction apparatus 1 is provided a paper supply section 32 for supplying paper 7 to the printer section 30. On the front side, a paper discharge section 34 where the printed paper 7 is discharged is provided on the lower side, and the control panel section 70, serving as the input means, is provided on the upper side. The control circuit 50 is built into the printer section 30.

The paper discharge section 34 is provided with a paper discharge tray 341 that is capable of closing the paper discharge opening when the apparatus is not in use. The paper supply section 32 is provided with a paper supply tray 321 that holds cut paper (not shown). The medium used for printing is not limited to single-sheet print paper such as cut paper, but it may be continuous print paper such as roll paper, and the SPC multifunction apparatus 1 may have a paper supply structure that enables it to print on roll paper.

As shown in FIG. 4, the printer section 30 and the scanner section 10 are coupled by hinge mechanisms 41 at the rear side, and the unitized scanner section 10 is raised from the front side about the turning section of the hinge mechanisms 41. In a state in which the scanner section 10 is raised, the configuration is such that the inside of the printer section 30 is exposed externally from an opening 301 provided on the upper portion of a cover that covers the printer section 30. By making the inside of the printer section 30 be exposed externally in this way, the configuration enables, for example, easy exchange of ink cartridges and so forth and easy handling of a paper jam.

Further, a power source section for the present SPC multifunction apparatus 1 is provided on the side of the printer section 30, and a power supply cable 43 for supplying power to the scanner section 10 is provided close to the above-mentioned hinge mechanism 41. Furthermore, the SPC multifunction apparatus 1 is provided with a USB interface 52 for enabling images to be output to a host computer 3 by the scanner function as well as the image data sent from the host computer 3 to be output by the printer function.

Configuration of Control Panel Section 70

As shown in FIG. 5, the control panel section 70 has a liquid crystal display 72 at approximately the center thereof. The liquid crystal display 72 is capable of displaying full size characters in seven lines by sixteen columns, and is also capable of displaying images. What is displayed on the liquid crystal display 72 changes according to, for example, setting items, setting states, or operation states.

On the left of the liquid crystal display 72 are provided a notification lamp 74, a power button 75, a various settings button 76, mode buttons 77, and a paper supply/paper discharge button 76. The notification lamp 74 is a red LED and notifies the user of occurrence of errors by lighting up when an error occurs. The power button 75 is the button for turning the power of the present SPC multifunction apparatus 1 ON and OFF. When the various settings button 76 is pressed, a screen for enabling various settings of the SPC multifunction apparatus 1 is displayed on the liquid crystal display 72. A copy mode button 771, a memory card print mode button 772, a film print mode button 773, and a scan mode button 774 are provided as the mode buttons 77. When these buttons are pressed, screens for enabling settings for each mode are displayed on the liquid crystal display 72. For example, when the copy mode button 771 is pressed, a screen for entering settings conditions, such as the number of copies to make, scale, paper type, paper size, copy quality, and copy mode, is displayed on the liquid crystal display 72. The paper supply/paper discharge button 78 is pressed when paper is to be supplied to the SPC multifunction apparatus or when paper is to be discharged from the SPC multifunction apparatus.

On the right of the liquid crystal display 72 are provided an OK button 81, a cancel button 82, a save button 83, a color copy button 84, a monochrome copy button 86, a stop button 88, a cross button 90, and a menu button 92. When the OK button 81 is pressed, the settings conditions are confirmed according to the descriptions displayed on the liquid crystal display 72. When the cancel button 82 is pressed, the settings conditions are cleared, and each setting item is changed to the default value. When the save button 83 is pressed for three seconds or more, the setting values are saved. When the save button 83 is pressed for three seconds or less, the setting values that have been saved are read out and those settings conditions are displayed on the liquid crystal display 72. The color copy button 84 is the button for starting color copying, and the monochrome button 86 is the button for starting monochrome copying. Therefore, these copy buttons 84, 86 serve both as to instruct the copy operation to start and as selecting means for selecting whether the image to be output is in color or monochrome. The stop button 88 is the button for stopping the copying operation that has once started. As for the cross button 90, it is possible to selectively press four sections in the up, down, left, and right thereof, and four functions (the functions of an UP button, a DOWN button, a LEFT button, and a RIGHT button) are achieved with one button. When the menu button 92 is pressed, the setting items displayed on the liquid crystal display 72 are changed.

Configuration of Scanner Section 10

The scanner section 10 includes the original bed glass 12 on which the original 5 is placed, the original bed cover 14 for pressing the surface to be read of the original 5, which is placed on the original bed glass 12, toward the original bed glass 12, a reading carriage 16 that is opposed to the original across the original bed glass 12 and that scans along the original 5 while maintaining a constant distance from the original 5, drive means 18 for making the reading carriage 16 scan, and a restriction guide 20 for making the reading carriage 16 scan in a stable state.

The reading carriage 16 includes an exposure lamp 22 serving as a light source for illuminating the original 5 across the original bed glass 12, a lens 24 for concentrating the light reflected from the original 5, four mirrors 26 for guiding the light reflected from the original 5 to the lens 24, a CCD sensor 28 for receiving the reflected light that has passed through the lens, and guide receiving sections 29 that engage with the above-mentioned restriction guide 20.

The CCD sensor 28 includes three linear sensors in which photodiodes for converting light signals into electric signals are arranged in rows, and these three linear sensors are arranged parallel to each other. The CCD sensor 28 includes three, not-shown filters for R (red), G (green), and B (blue); a filter for a different color is provided for each linear sensor. Each linear sensor detects the light component corresponding to the color of the filter. For example, the linear sensor with the R filter detects the intensity of the red light component. The three linear sensors are arranged in a direction (referred to as the main-scanning direction below) that is approximately orthogonal to the moving direction of the reading carriage 16 (referred to as the sub-scanning direction below).

The length of the CCD sensor 28 is sufficiently shorter than the width of the original 5 (the length in the main-scanning direction) that is readable. Therefore, the image made by the reflected light from the original 5 is reduced in size by the lens 24 and then formed on the CCD sensor 28. That is, the lens 24 placed between the original 5 and the CCD sensor 28 is arranged close to the CCD sensor 28. Further, the distance between the original 5 and the lens 24 needs to be long, and a long optical path length is required. Therefore, in order to secure the distance between the original 5 and the lens 24 in the limited space of the reading carriage 16 that scans, the light is reflected on the four mirrors 26 to secure the long optical path length.

The reflected light from the original 5 is reflected by the four mirrors 26, passes through the lens 24, and reaches the CCD sensor 28; however, since the three linear sensors are arranged in parallel, the positions on the original from which the reflected light that forms an image on each linear sensor at the same time was reflected are misaligned, in the sub-scanning direction, by an amount equal to the width of each linear sensor. Therefore, a scanner control unit 58 (FIG. 10) of the control circuit 50 performs interline correction processing for correcting this misalignment. The interline correction processing is described later.

The above-mentioned restriction guide 20 is provided in the sub-scanning direction and is formed of a cylindrical material made of stainless steel. The restriction guide 20 passes through the two guide receiving sections 29 that are provided on the reading carriage 16 and that are formed of thrust bearings. By widening the distance, in the sub-scanning direction, between the two guide receiving sections 29 provided on the reading carriage 16, it becomes possible to cause the reading carriage 16 to scan stably.

The drive means 18 includes an annular timing belt 181 fixed to the reading carriage 16, a pulse motor 183 that has a pulley 182 engaging with the timing belt 181 and that is arranged on one end in the sub-scanning direction, and an idler pulley 184 that is arranged on the other end and that applies tension force to the timing belt 181. The pulse motor 183 is driven by the scanner control unit 58 (FIG. 10) of the control circuit 50; according to the scan speed of the reading carriage 16 which is changed according to the speed of the pulse motor 183, it becomes possible to enlarge or reduce, in the sub-scanning direction, the image that has been read.

The scanner section 10 causes the reading carriage 16 to move along the original 5 while illuminating the original 5 with the light of the exposure lamp 22 and forming an image on the CCD sensor 28 with the reflected light. At this time, by reading-in, according to a predetermined cycle, the amounts of light received by the CCD sensor 28 as values in voltage, the image for the distance for which the reading carriage 16 moved during one cycle is taken in as data for one line of an image to be output. At this time, three kinds of data —the R component, the G component, and the B component— are taken in as data for one line.

Configuration of Printer Section 30

The printer section 30 has a structure that is capable of outputting color images, and adopts the inkjet method in which colored inks of, for example, four colors —cyan (C), magenta (M), yellow (Y), and black (K)— are ejected onto a medium such as print paper to form dots and thereby form images. It should be noted that, other than the above-mentioned four colors, light cyan (pale cyan, LC), light magenta (pale magenta, LM), and dark yellow (dim yellow, DY) may be used as the colored inks.

Figure 6:
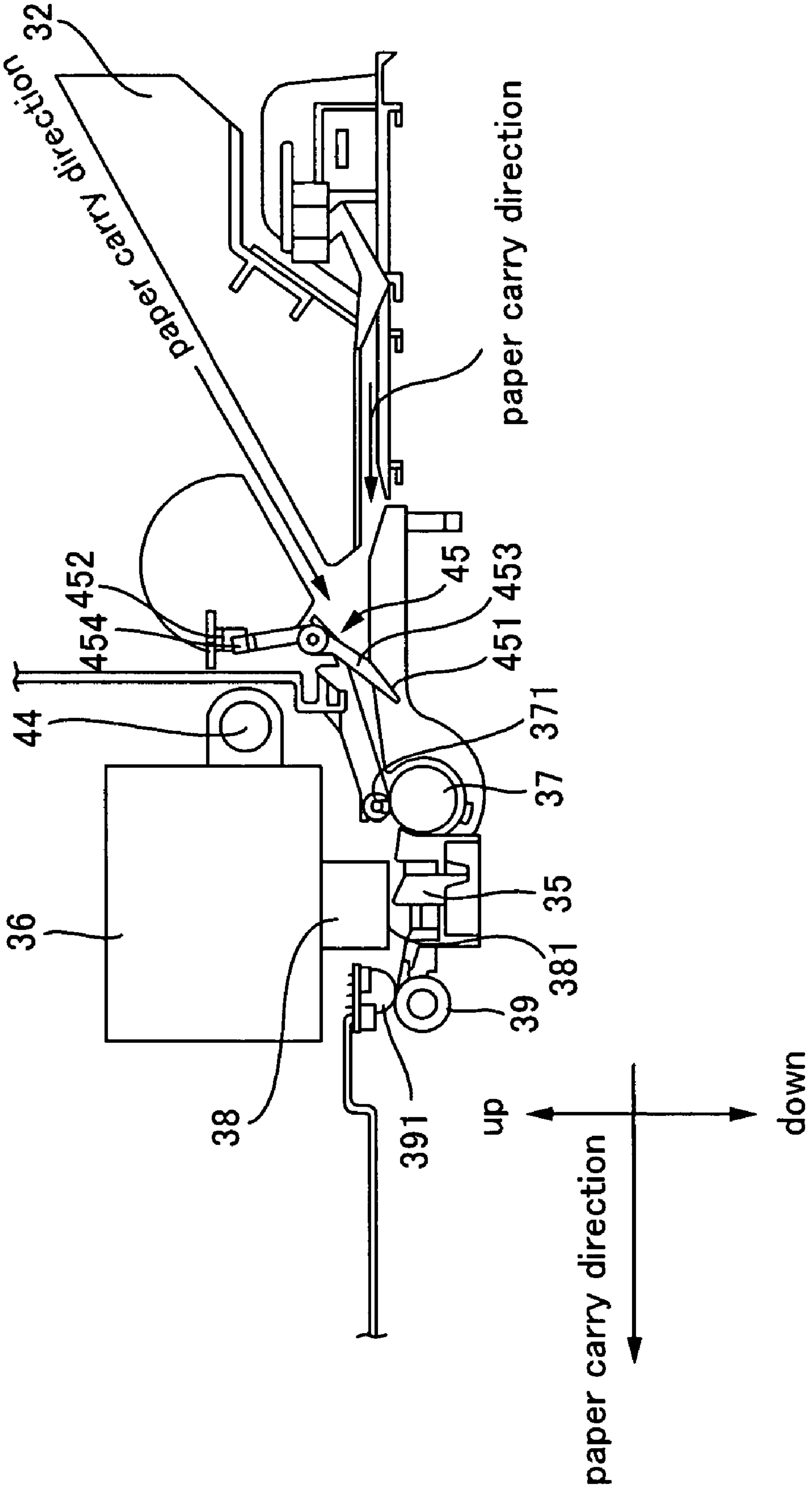
FIG. 6 is an explanatory diagram showing an arrangement of the surroundings of a print head.
Figure 7:
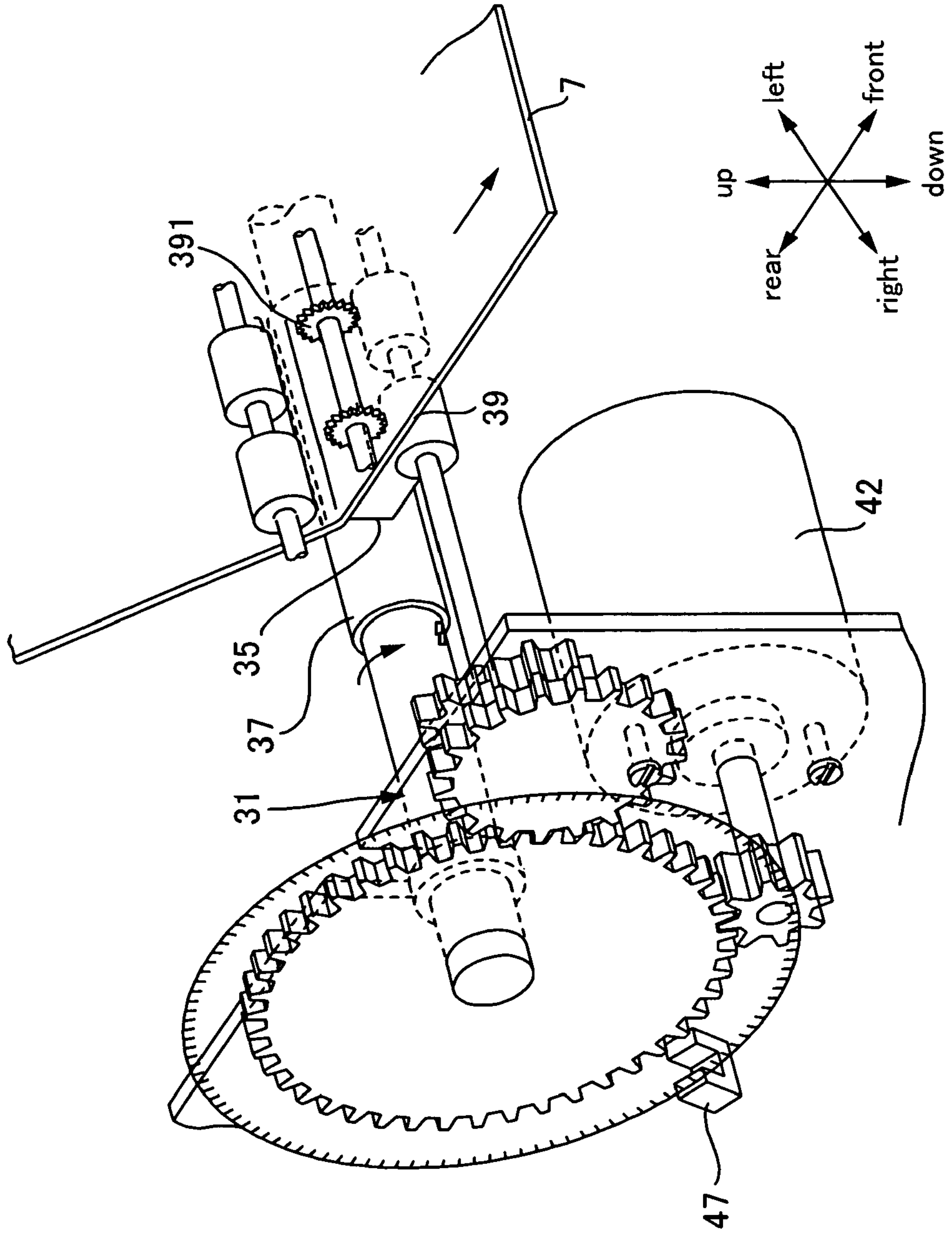
FIG. 7 is an explanatory diagram for illustrating a drive section of a print paper carry mechanism.

Next, with reference to FIG. 3, FIG. 6, and FIG. 7, the printer section 30 is described. FIG. 6 is an explanatory diagram showing the arrangement of the surroundings of the print head, and FIG. 7 is an explanatory diagram for illustrating a drive section of a print paper carry mechanism.

As shown in the figures, the printer section 30 has a mechanism for ejecting ink and forming dots by driving a print head 38, which serves as a recording head, mounted on a writing carriage 36, a mechanism for causing the writing carriage 36 to move back and forth in a direction orthogonal to the direction in which the paper 7 is carried by a carriage motor 40, and a mechanism for carrying the paper 7 supplied from the paper supply tray 321 (see FIG. 1) by the paper feed motor (referred to also as a PF motor below) 42.

The mechanism for ejecting ink and forming dots includes the print head 38 that has a plurality of nozzles serving as dot forming sections, and causes predetermined nozzles to eject ink according to print command signals. The plurality of nozzles form rows in the bottom surface 381 of the print head 38 in the carry direction of the paper 7, and the plurality of rows are arranged in the direction orthogonal to the carry direction of the paper 7. Details on the print head 38 and the nozzle arrangement will be described later. The print head 38 includes a 16-bit memory associated with each of the nozzles; data is transferred from a head control unit 68 (FIG. 10), which is described later, to each nozzle in 16-bit units.

The mechanism for causing the writing carriage 36 to move back and forth includes the carriage motor (referred to also as a CR motor below) 40 for driving the writing carriage 36, a slide shaft 44 that is provided in the direction orthogonal to the carry direction of the paper 7 and that slidably holds the writing carriage 36, a linear encoder 46 fixed to the writing carriage 36, a linear encoder code plate 461 in which slits are formed at predetermined intervals, a pulley 48 that is attached to a rotating shaft of the carriage motor 40, and a timing belt 49 that is driven by the pulley 48.

The print head 38 and a cartridge mounting section integrally provided with the print head 38 are fixed to the writing carriage 36, and ink cartridges containing inks of black (K), cyan (C), magenta (M), yellow (Y), and so forth are mounted on the cartridge mounting section.

The mechanism that carries the paper 7 supplied from the paper supply tray 321 has a platen 35 that is arranged opposed to the above-mentioned print head 38 and that serves as a guiding member for guiding the paper 7 so that distance between the paper 7 and the print head 38 is appropriate, a carry roller 37 that is provided upstream from the platen 35 in the carry direction of the paper 7 and that carries the supplied paper 7 to the platen 35 so that the paper comes into contact with the platen at a predetermined angle, a paper discharge roller 39 that is provided downstream from the platen 35 in the carry direction of the paper 7 and that is for carrying and discharging the paper 7 that has disengaged from the carry roller 37, the PF motor 42 for driving the carry roller 37 and the paper discharge roller 39, a rotary encoder 47 for detecting the amount for which the paper 7 has been carried, and a paper detection sensor 45 for detecting the presence of the paper 7 and the front end and the rear end of the paper 7.

The carry roller 37 is provided underneath the carry path of the paper 7, and a driven roller 371 for holding the paper 7 is provided above and in opposition to the carry roller 37. The paper discharge roller 39 is also provided underneath the carry path of the paper 7, and a driven roller 391 for holding the paper 7 is provided above and in opposition to the paper discharge roller 39. However, the driven roller 391 arranged in opposition to the paper discharge roller 39 is a roller that is made of a thin plate and that has fine teeth on its periphery, and thus, the roller 391 is structured so that ink is not scraped even when the roller comes into contact with the surface of the printed paper 7.

Further, the position at which the carry roller 37 and the paper 7 contact each other is arranged so that it is higher than the position at which the platen 35 and the paper 7 contact each other. That is, the paper 7 carried from the carry roller 37 comes into contact with the platen 35 at a predetermined angle and is further carried. In this way, the paper 7 is carried along a later-described guide surface 351 of the platen 35 in such a manner that it is pressed against the guide surface 351. Therefore, the platen 35 maintains the paper 7 in a suitable position from the nozzles, and thus it is possible to obtain a satisfactory image.

Further, the carry roller 37 and the paper discharge roller 39 are linked through a gear train 31, and are made to rotate through transmission of the rotation of the PF motor 42; the speed at which both rollers 37, 39 carry the paper 7 is the same.

In opposition to the bottom surface 381 of the print head 38, that is, the surface with the nozzles, the platen 35 has the guide surface 351 that guides the paper 7 through contact therewith. This guide surface 351 is formed to be narrower than the area of the bottom surface 381 of the print head 38 in which the nozzles are provided, and therefore, some of the nozzles positioned furthest upstream and furthest downstream in the carry direction of the paper 7 are not placed in opposition to the platen 35. In this way, the ink ejected outside the paper 7 is prevented from adhering to the platen 35 when the front end and the rear end of the paper 7 are printed, and the back surface of paper 7 that is carried later on is prevented from getting smeared. More specifically, the platen 35 is not arranged in the positions opposing the nozzles at the upstream end and the downstream end, but rather, there is a space in those positions. Those space portions are provided with ink receivers at a position lower than the guide surface 351 of the platen 35 to collect the unnecessary ink and keep the inside of the printer from getting smeared.

The paper detection sensor 45 is arranged upstream from the carry roller 37 in the carry direction, and has a lever 451 that has an axis of swinging in a position higher than the carry path of the paper 7, and a transmission type optical sensor 452 that is provided above the lever and that has a light emitting section and a light receiving section. The lever 451 is arranged so that it hangs down into the carry path under its own weight, and includes an actuating section 453 that is made to swing by the paper 7 supplied from the paper supply tray 321 and a light-blocking section 454 that is located on the opposite side of the actuating section 453 across the axis of swinging and that is arranged to pass between the light emitting section and the light receiving section. In the paper detection sensor 45, when the lever 451 is pushed by the supplied paper 7 and the paper 7 reaches a predetermined position, the light-blocking section 454 blocks the light that has been emitted from the light emitting section, and thereby, it is detected that the paper 7 has reached the predetermined position. Then, when the paper 7 is carried by the carry roller 7 and the rear end of the paper 7 passes by, the lever 451 hangs down under its own weight, the light-blocking section 454 comes out from between the light emitting section and the light receiving section so that the light from the light emitting section is received by the light receiving section, and it is detected that the rear end of the paper 7 reached the predetermined position. In this way, it is detected that the paper 7 is present at least in the carry path while the light-blocking section 454 is blocking the light from the light emitting section.

About the Configuration of the Nozzles

Figure 8:
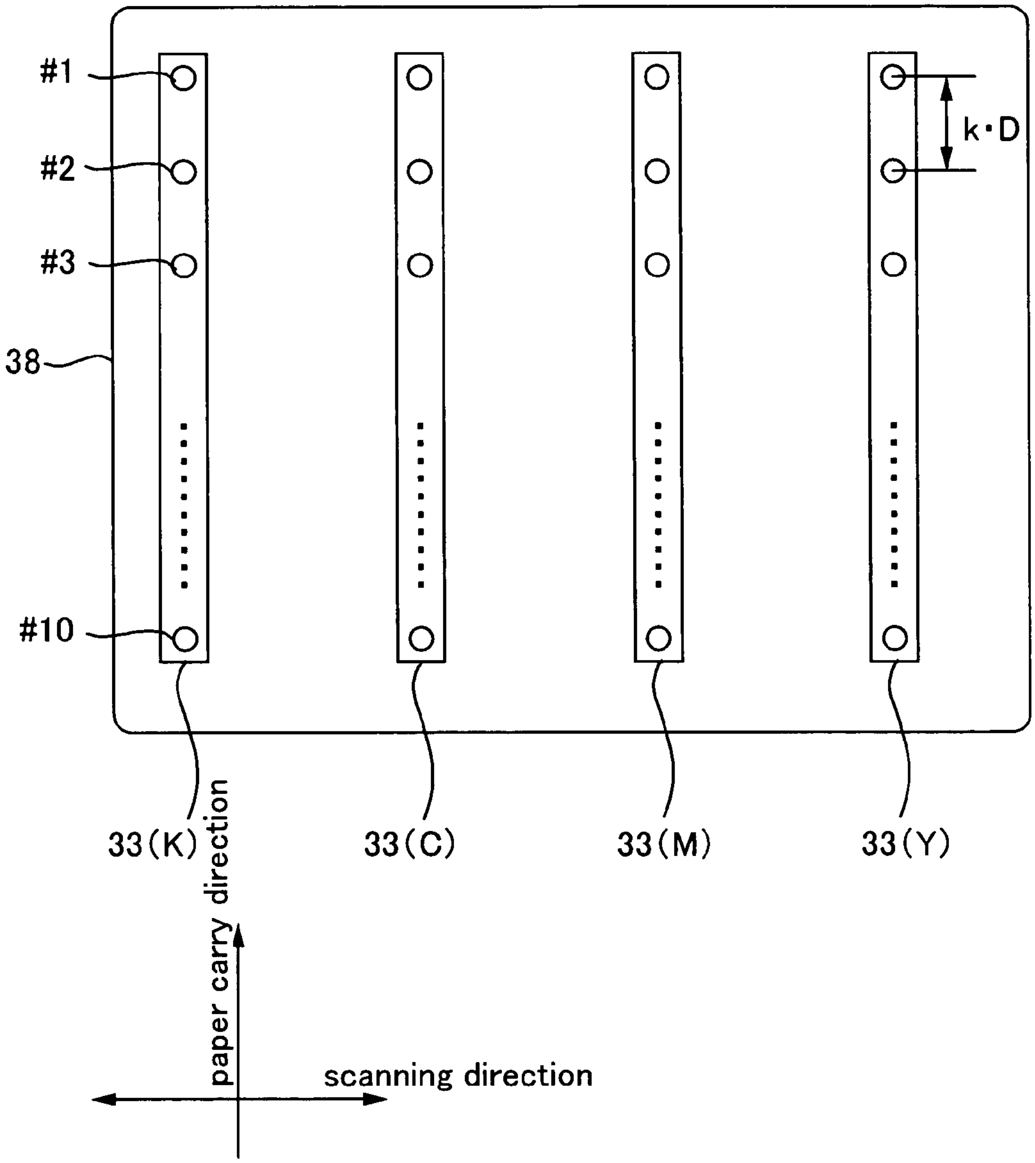
FIG. 8 is an explanatory diagram showing an arrangement of nozzles in a bottom surface 381 of a print head 38.

FIG. 8 is an explanatory diagram showing the arrangement of nozzles in the bottom surface 381 of the print head 38.

In the bottom surface 381 of the print head 38 are formed a black ink nozzle row 33(K), a cyan ink nozzle row 33(C), armament ink nozzle row 33(M), and a yellow ink nozzle row 33(Y). Each nozzle row 33 has a plurality of nozzles (ten in the present embodiment) that are the ejection openings for ejecting ink of each color.

The plurality of nozzles in each nozzle row 33 are aligned in the paper carry direction at regular intervals (nozzle pitch: k·D). Here, D is the minimum dot pitch in the paper carry direction (that is, it is the distance between dots formed on the paper 32 with the highest resolution), and for example, when the resolution is 720 dpi, D is 1/720 inch (approximately 35.3 μm). Further, k is an integer of 1 or more.

Further, as for the nozzles in each nozzle row 33, nozzles located further downstream have smaller numbers attached to them, and each of the nozzles is referred to as the first nozzle N1 through the tenth nozzle N10. Each nozzle is provided with a piezo element (not shown) as an actuation element for actuating each nozzle to make it eject ink droplets.

It should be noted that, during printing, the paper 7 is intermittently carried by the carry roller 37 and the paper discharge roller 39 by a predetermined carry amount F, and during this intermittent carrying, the writing carriage 36 is moved in the scanning direction and ink droplets are ejected from each of the nozzles.

Actuating the Print Head

Figure 9:
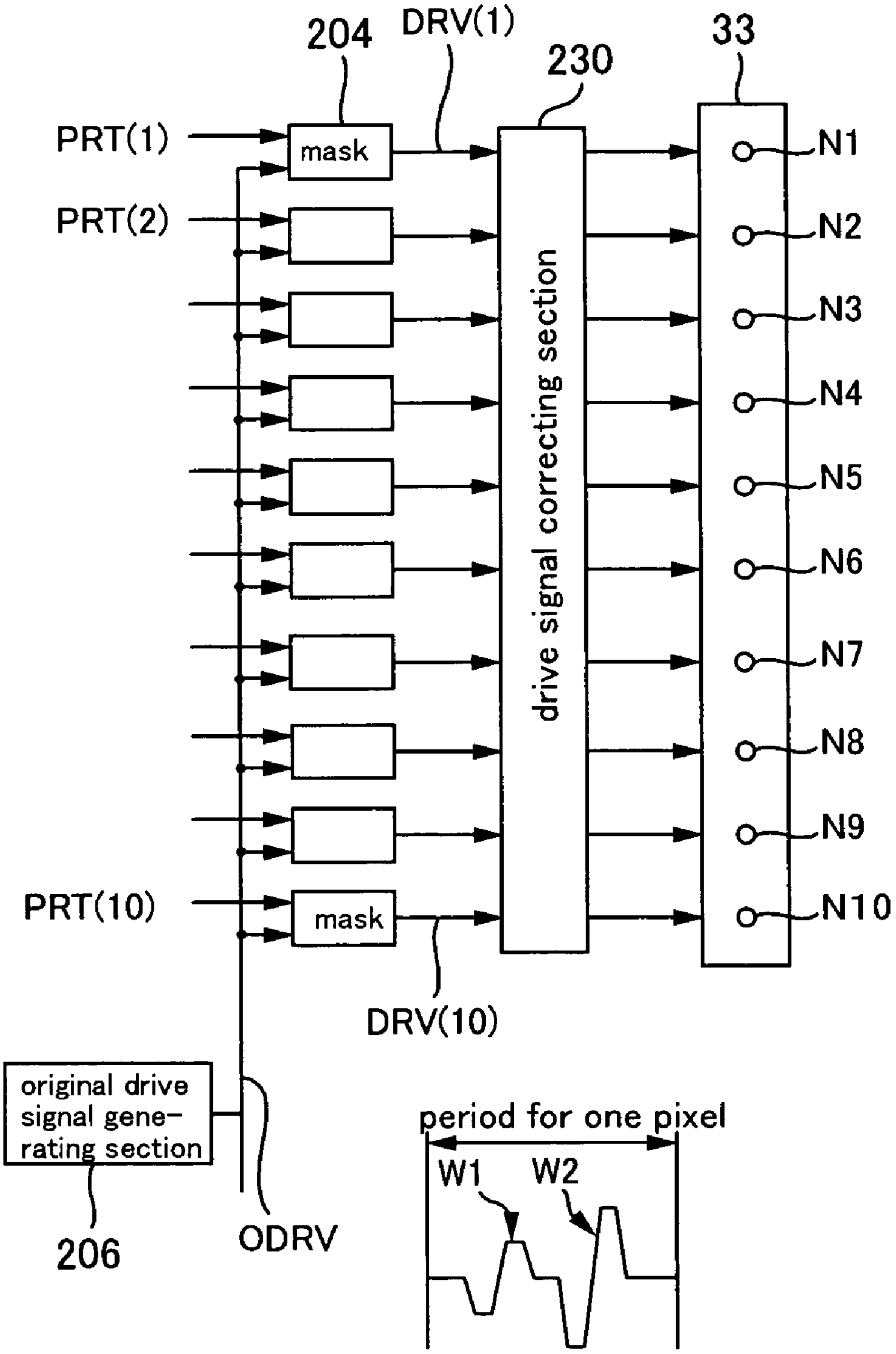
FIG. 9 is a block diagram showing a configuration of a drive signal generating section provided in a head control unit 68 (FIG. 10).
Figure 10:
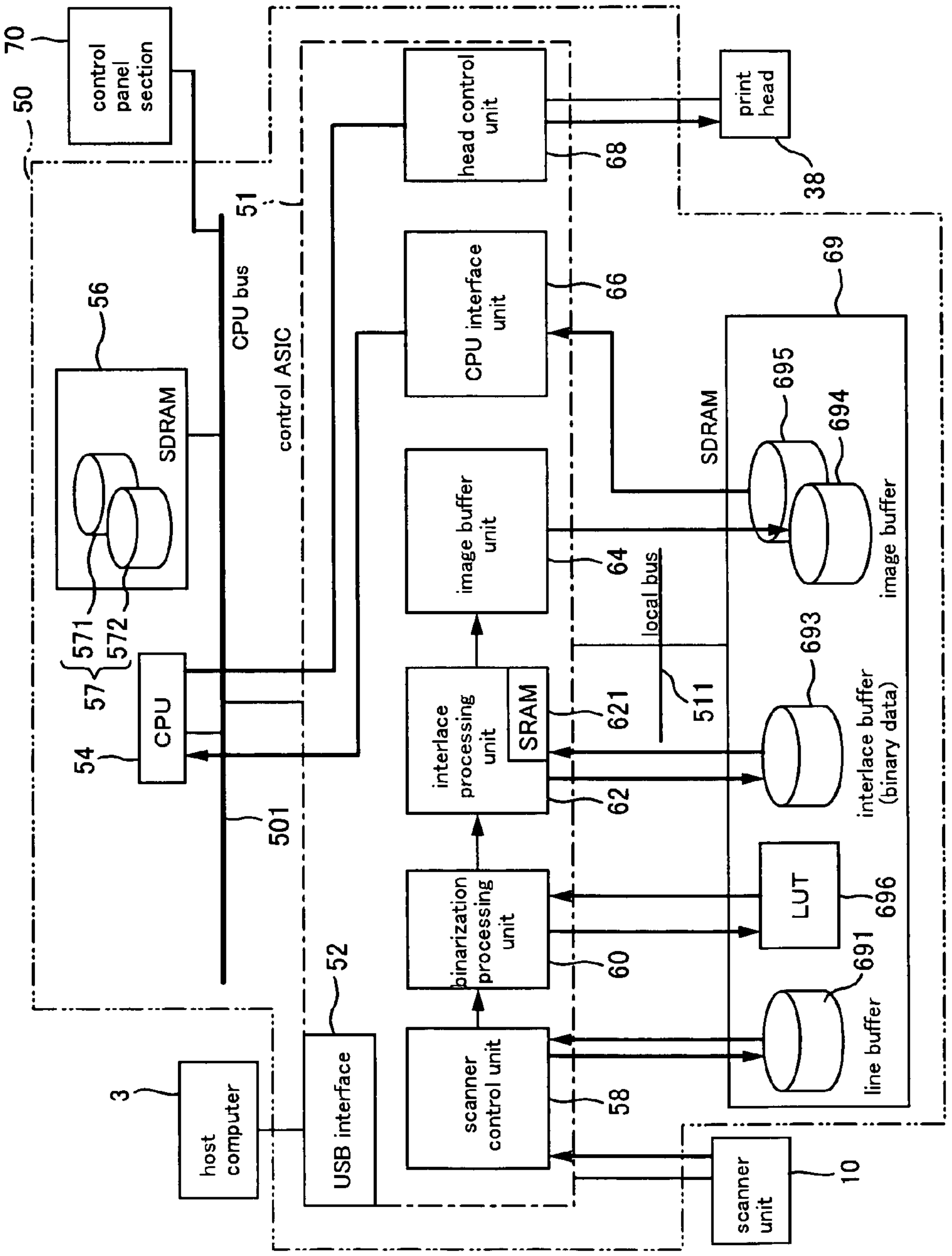
FIG. 10 is a block diagram showing an example of a control circuit 50.

Next, the actuation of the print head 38 is described below with reference to FIG. 9. FIG. 9 is a block diagram showing the configuration of a drive signal generating section provided in the head control unit 68 (FIG. 10).

In FIG. 9, the drive signal generating section includes a plurality of mask circuits 204, an original drive signal generating section 266, and a drive signal correcting section 230. The mask circuits 204 are provided corresponding to each of the plurality of piezo elements for actuating each of the nozzles N1 through N10 of the print head 38. Note that in FIG. 9, the number in parentheses attached to the end of each signal name indicates the number of the nozzle to which the signal is supplied. The original drive signal generating section 206 generates original drive signals ODRV used in common among the nozzles N1 through N10. The original drive signal ODRV is a signal that includes two pulses—a first pulse W1 and a second pulse W2—during the main scan period for one pixel. The drive signal correcting section 230 performs correction by shifting, either forward or backward for the whole return pass, the timing of the drive signal waveform that has been shaped by each mask circuit 204. By correcting the timing of the drive signal waveform, the misalignment between the positions at which the ink droplets land during the forward pass and the return pass is corrected; that is, the misalignment between the positions at which the dots are formed during the forward pass and the return pass is corrected.

As shown in FIG. 9, input serial print signals PRT(i) are input to the mask circuits 204 along with the original drive signal ODRV that is output from the original drive signal generating section 206. The serial print signal PRT(i) is a serial signal made of two bits per pixel, and each bit corresponds to the first pulse W1 and the second pulse W2, respectively.

Each mask circuit 204 is a gate for masking the original drive signal ODRV according to the level of the serial print signal PRT(i). That is, if the serial print signal PRT(i) is at level 1, the mask circuit 204 lets the corresponding pulse of the original drive signal ODRV pass right through so that the pulse is supplied to the piezo element as a drive signal DRV, whereas if the serial print signal PRT(i) is at level 0, the mask circuit 204 cuts off the corresponding pulse of the original drive signal ODRV.

Internal Structure of the Control Circuit 50

FIG. 10 is a block diagram showing an example of a control circuit 50.

In the control circuit 50 of the SPC multifunction apparatus 1, the CPU 54 that serves as a controller for managing the overall control over the SPC multifunction apparatus 1, the control ASIC 51 that serves as a data generator for managing the control over the scanner function, the printer function, and the local copier function, an SDRAM 56 that serves a memory in which data is directly readable and writable from the CPU 54, and the control panel section 70 serving as the input operation means are connected via a CPU bus 501 which serves as a first transfer path. The scanner unit 10 and the print head 38 are connected to the control ASIC 51, and the ASIC-SDRAM 69 that serves as a memory in which data is directly readable and writable from the control ASIC 51 is connected to the control ASIC 51 via the local bus 511.

The control ASIC 51 includes the scanner control unit 58, a binarization processing unit 60 which serves as a color conversion processing unit, an interlace processing unit 62 which serves as a rearrangement unit for rearranging data so that they correspond to the nozzles, an image buffer unit 64, a CPU interface unit (referred to as a CPUIF unit below) 66, the head control unit 68, the USB interface (referred to as a USBIF below) 52 serving as input/output means for the external host computer 3, and drivers for each of the motors, lamps, and so forth, that the scanner unit 10 and the printer section 30 comprise. The scanner control unit 58, the binarization processing unit 60, the interlace processing unit 62, and the image buffer unit 64 are connected via a local bus 511 which serves as a second transfer path. Further, a line buffer 691, an interlace buffer 692, and image buffers 693, 694 are allocated to the control-ASIC-SDRAM 69. In order to achieve increased data transfer rate, so-called burst transmission, in which the data transfer unit is 64 bit, is employed between the control ASIC 51 and the ASIC-SDRAM 69 via the local bus 511. Burst transmission is a transfer method in which, when one address is set, data having subsequent addresses are continuously transferred. In the present embodiment, data transfer between the control ASIC 51 and the ASIC-SDRAM 69 is set so that unit data of 16 bits are continuously transferred four times to transfer 64-bit data at once with one address designation.

The scanner control unit 58 has the function of executing control over the exposure lamp 22, the CCD sensor 28, the pulse motor 183 serving as a reading carriage drive motor, and so forth, of the scanner unit 10, and the function of sending the image data in the RGB system that serve as second recording data and that have been read in via the CCD sensor 28 to the binarization processing unit 60 via the line buffer 691.

The binarization processing unit 60 has the function of converting the multi-gradation RGB data, which has been sent, into binary data in CMYK and sending the data to the interlace processing unit 62.

The interlace processing unit 62 has the function of generating overlap-printing-compliant data (referred to as OL-compliant data below) by dividing the CMYK data for one raster line into data for printing per each scan movement of the writing carriage 36, when so-called overlapped printing is performed in which one raster line (a line in the main-scanning direction in a print image) is printed with several number of times of scan movements of the writing carriage 36. The generated OL-compliant data is stored in the interlace buffer 692 of the ASIC-SDRAM 69.

Further, the interlace processing unit 62 has the function of reading out the data stored in the interlace buffer 692 onto an SRAM 621 in the interlace processing unit 62 in units of predetermined size, rearranging the data on the SRAM 621 so as to associate the data with the nozzle arrangement, and sending the data to the image buffer unit 64.

The image buffer unit 64 has the function of generating, from the data sent from the interlace processing unit 62, head-drive data that serves as first recording data for causing each nozzle to eject ink per each scan movement of the writing carriage 36.

The CPUIF unit 66 has the function of enabling data transfer between the CPU 54 and the control-ASIC-SDRAM 69 connected to the control ASIC 51. In the present control circuit 50, the unit 66 is used when the head control unit 68 is actuated according to the head-drive data generated by the image buffer unit 64.

The head control unit 68 has the function of actuating the print head 38 according to the head-drive data under control of the CPU 54 to make the nozzles eject ink.

Data Flow in Control Circuit 50

<About when the Apparatus Functions as a Scanner>

A command signal instructing to read an image with the scanner unit 10 and read-information data, such as the read resolution and the read area, are sent from the host computer 3 connected to the USBIF 52 of the control ASIC 51 to the control circuit 50. In the control circuit 50, the scanner control unit 58 is controlled by the CPU 54 according to the image-read command signal and the read-information data, and reading of the original 5 with the scanner unit 10 is started. At this time, in the scanner control unit 58, a lamp drive unit, a CCD drive unit, a reading carriage scan drive unit, and so forth, are actuated, and the second recording data in the RGB system are read from the CCD sensor 28 according to a predetermined cycle. The RGB data having been read in is temporarily stored in the line buffer 691 allocated to the ASIC-SDRAM 69, subjected to interline correction processing for each R, G, and B data, and sent to the host computer 3 via the USBIF 52. Interline correction processing is a process for correcting the misalignment among the reading positions for the R, G, and B linear sensors, which occurs due to the structure of the scanner section 10. Describing in detail, the CCD sensor 28 that the scanner unit 10 has is a color sensor and has one line of linear sensor each for the three colors, R (red), G (green), and B (blue). Since these three linear sensors are arranged parallel to each other in the scanning direction of the reading carriage 16, the reflected light, which was illuminated on the same line in the original 5, cannot be received at the same time. That is, when the reflected light, which was illuminated on the same line in the original 5, is received by each of the linear sensors, there will be a time lag. Therefore, the process is for synchronizing the pieces of data that are sent delayed by a delay time that occurs due to the arrangement of the linear sensors.

<About when the Apparatus Functions as a Printer>

When the apparatus functions as a printer, the image data to be printed is input through the USBIF 52 after being converted, in a printer driver of the host computer 3 connected to the USBIF 52 of the control ASIC 51, into head-drive data that can be printed by the printer section 30 of the SPC multifunction apparatus 1. The head-drive data are the first recording data in the CMYK system that provide signals for actuating the print head 38; for example, when printing is performed according to the interlace mode, the head-drive data are made by extracting raster data that correspond to the resolution of an image to be printed and the pitch and number of nozzles of each nozzle row 33 in the writing carriage 36, and rearranging the raster data in the order to be printed per each scan movement of the writing carriage 36.

The head-drive data is stored in an image buffer 57 that is allocated to the SDRAM 56 which is directly readable from the CPU 54. The image buffer 57 has two memory areas each having a capacity capable of storing head-drive data for printing with one scan movement of the writing carriage 36. When data for one scan movement is written into one image buffer 571, the data is transferred to the head control unit 68. When the image data in one image buffer 571 is transferred to the head control unit 68, head-drive data to be used for printing during the next scan movement is stored in the other image buffer 572. Then, when the data for one scan movement is written into the other image buffer 572, the data is transferred to the head control unit 68, and image data is written into the above-mentioned first image buffer 571. In this way, printing is performed by writing and reading the head-drive data alternately using two image buffers 571, 572 and actuating the print head 38 with the head control unit 68.

<About when the Apparatus Functions as a Copier>

Next, the data flow for when the apparatus functions as a copier is described. Here, only the data flow for the normal copying operation is described, and modes that require layout processing, such as the repeat printing mode, will be described later.

The data having been read in by the scanner unit 10 is taken into the line buffer 691 via the scanner control unit 58. The second recording data in the RGB system taken into the line buffer 691 is successively subjected to the above-mentioned RGB interline correction processing, and the RGB data corresponding to the same line are sent from the scanner control unit 58 to the binarization processing unit 60. Further, when the scanner control unit 58 sends the RGB data out to the binarization processing unit 60, it makes the resolution of the image data match the resolution of the printer section. For example, if printing is to be performed at 1440 dpi, then the scanner control unit 58 sends the image data (RGB data) with a resolution of 1440 dpi out to the binarization processing unit 60. Therefore, during normal copying, the re-sizing unit 59 does not operate.

After the RGB data sent into the binarization processing unit 60 are subjected to halftone processing, the data are converted into binary data for each color in CMYK with reference to a lookup table (LUT) 696 stored in the control-ASIC-SDRAM 69, and then the data are sent into the interlace processing unit 62.

As for the CMYK binary data sent into the interlace processing unit 62, the whole data for each raster line are divided into pieces of data to be printed per every scan movement of the writing carriage 36 according to the designated interlace mode. For example, when one raster line is formed with two scan movements of the writing carriage 36, the whole data for each raster line is divided into data for forming the odd-numbered dots, counted from the end of the raster line, and data for forming the even-numbered dots to generate the OL-compliant data. The OL-compliant data (the first recording data) are burst transmitted to the interlace buffer 693 in units of 64 bits and stored there.

Further, the interlace processing unit 62 reads out the data stored in the interlace buffer 693 in units of predetermined size, and burst transmits the data to the SRAM 621 in the interlace processing unit 62. At this time, the OL-compliant data are read out from the interlace buffer 692 in correspondence with the nozzle arrangement of the print head 38 according to the resolution of the image to be printed and the nozzle pitch. For example, when the resolution of the image to be printed is 720 dpi and the nozzle pitch is 1/180 inch, three raster lines will exist between two raster lines that have been printed with adjacent nozzles. Therefore, data for every four raster lines is read out from the OL-compliant data as data corresponding to a scan movement of the writing carriage 36.

The transferred data is rearranged on the SRAM 621 so that it corresponds to the nozzle arrangement, and is sent to the image buffer unit 64.

The image buffer unit 64 burst transmits, to the image buffer 694, the image data that have been blocked into small pieces according to the capacity of the SRAM 621, and stores the data in proper orientation so that they become the head-drive data for making each of the nozzles eject ink per every scan movement of the writing carriage 36. Memory areas for storing head-drive data for two scan movements of the writing carriage 36 are allocated to the image buffers 694, 695. Every time head-drive data for one scan movement are stored, the CPU 54 sends them out to the head control unit 68, and head-drive data corresponding to the next scan movement start to be written into the memory area provided for another scan movement. This process is the same as the process of the image buffers described above in the description of the printer function.

Under control of the CPU 54, the head-drive data for each scan movement stored in the image buffers 694, 695 are read into the CPU 54 via the CPUIF unit 66 and transferred to the head control unit 68 by the CPU 54. That is, the head-drive data that have gone through data rearrangement by the interlace processing unit 62 and that are stored in the image buffers 694, 695 are used every time dots are to be formed on the medium while the print head 36 is being moved and are transferred to the head control unit 68 every time they are to be used, and an image is printed by the print head 38 being driven by the head control unit 68 according to the head-drive data.

In cases of normal copying operation, during a period from when the RGB image data are read in by the scanner control unit 58 until when the CMYK head-drive data are written into the image buffers 694, 695, layout processing that requires calculation by the CPU 54 is not performed. That is, the CPU 54 is not necessary for the process of converting the RGB image data into the CMYK head-drive data, but instead, the plurality of processing units (the binarization processing unit 60, the interlace processing unit 62, and the image buffer unit 64) of the control ASIC 51 obtain the unprocessed data, which are to be processed, from the ASIC-SDRAM 69 via the local bus 511 and, after they subject the data to predetermined processing, they store the processed data in the ASIC-SDRAM 69 via the local bus 511. Therefore, during these processes, it is not necessary to exchange data between the SDRAM for the ASIC and the SDRAM for the CPU. That is, since only the local bus 511 is used to send data between the control ASIC 51 and the ASIC-SDRAM 69, the CPU bus 501 is hardly used. Therefore, processing is accelerated, and it is possible to increase copying speed.

Generating Head-Drive Data

Figure 11:
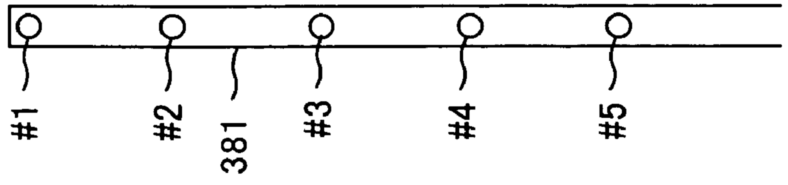
FIG. 11 is a conceptual diagram showing, as an image of pixels, an original to be read.
Figure 14:
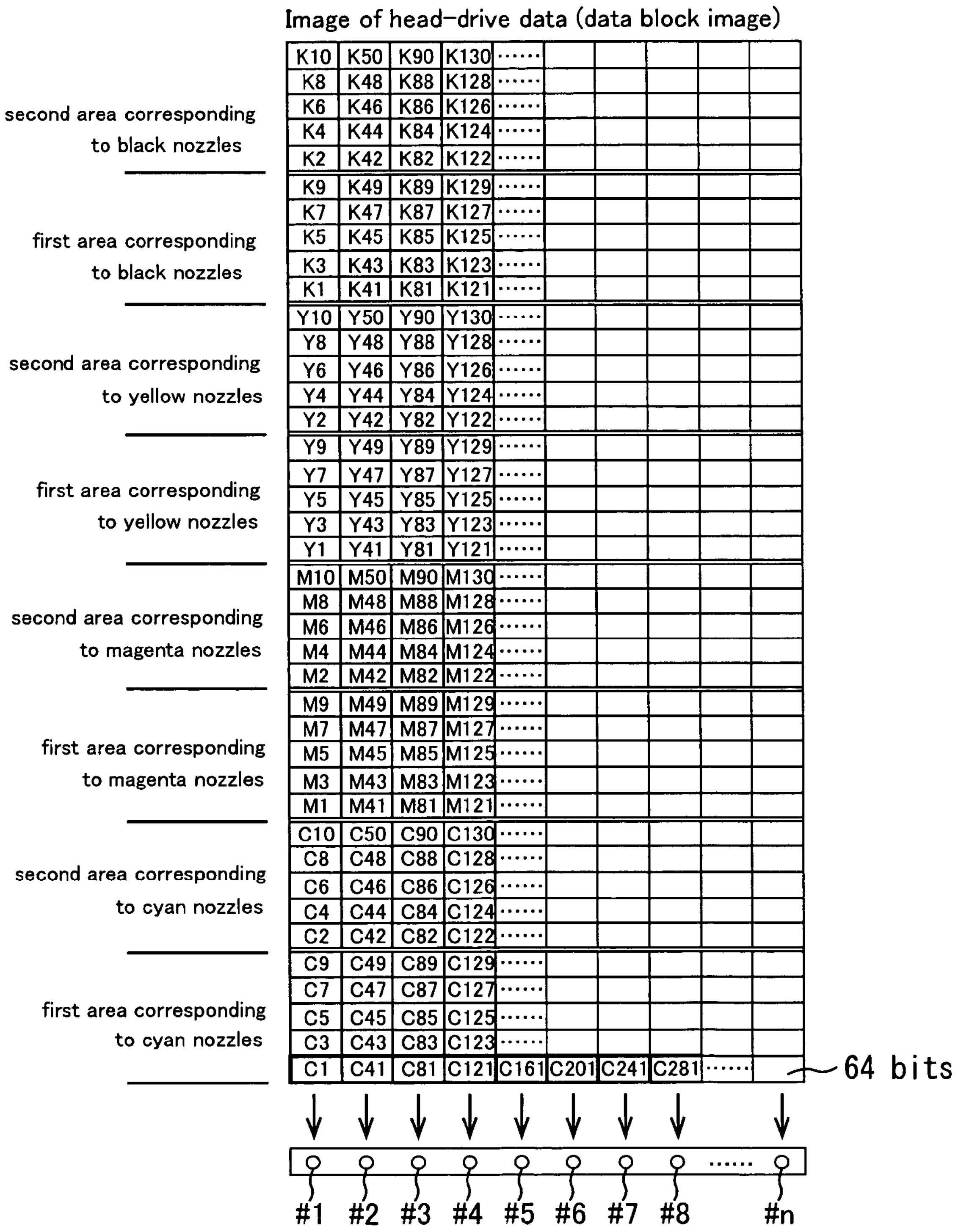
FIG. 14 is a conceptual diagram showing head-drive data stored in an image buffer.

With reference to FIG. 11 through FIG. 14, the process of generating head-drive data, which are to be stored in the image buffers 694, 695, in the copying function from the image data read by the scanner unit 10 by way of the binarization processing unit 60, the interlace processing unit 62, and the image buffer unit 64 is described. FIG. 11 is a conceptual diagram showing, as an image of pixels, an original to be read, FIG. 12 is a conceptual diagram showing an image of a line buffer in which image data that have been read are stored as data for each color of RGB, FIG. 13 is a diagram for illustrating a method of reading out data from an interlace buffer, and FIG. 14 is a conceptual diagram showing head-drive data stored in an image buffer.

Here, an example where RGB data whose read resolution corresponds to 600 dpi in both the main-scanning direction and the sub-scanning direction are sent to the binarization processing unit and a printer section 30 prints an image whose output resolution is 600 dpi in both the main-scanning direction and the sub-scanning direction. In this case, it is assumed that the printer section 30 prints one raster line with two scan movements of the writing carriage 36. Further, it is assumed that the nozzle pitch of the print head 38 is 1/150 inch, and printing is to be performed according to an interlace mode in which three raster lines are printed between two raster lines that have been printed with adjacent nozzles.

Line image data that have been read by each of the linear sensors, corresponding to each RGB component, of the CCD sensor 28 of the scanner unit 10 are successively stored in the line buffer 691 of the ASIC-SDRAM 69. In this case, the line buffer 691 comprises storage areas for several lines for each of R, G, and B. Here, it is assumed that storage areas for five lines are provided per each color.

For example, when the reading carriage 16 of the scanner unit 10 performs scanning and an image having eighty pieces of pixel data in the main-scanning direction, as shown in FIG. 11, is read in, the line buffer 691 of the ASIC-SDRAM 69 successively stores five lines of data for each color, as shown in FIG. 12. In this case, there is a difference, in the reading position of the original, in the data stored for each color due to the arrangement of the linear sensors of the CCD sensor 28, as described above. That is, for example, the data for the first line stored in the R-component area, the data for the first line stored in the G-component area, and the data for the first line stored in the B-component area are not data that have been obtained by reading the same line in the original. Therefore, after the line data read from the same line in the original are stored in the area for each color component, these line data (second recording data) are burst transmitted to the scanner control unit 58 via the local bus 511, and are sent to the binarization processing unit 60. For example, it is assumed that data that correspond to the data stored in the first line of the R-component area and that have been obtained by reading the same portion as a linear portion in original 5 are stored in the third line of the G-component area and the fifth line of the B-component area. These data that correspond to the same portion in the original 5 are divided into units of 64 bits, are burst transmitted to the scanner control unit 58 via the local bus 511, and are then transferred to the binarization processing unit 60.

In the binarization processing unit 60, based on the transferred data for the three lines in R, G, and B, binary data in C, M, Y, and K corresponding to each pixel are successively generated starting from the first pixel. For example, as regards the first pixel, binary data for each of C, M, Y, and K for printing this pixel are generated from the head data R1 in the first line of the R-component area, the head data G161 in the third line of the G-component area, and the head data B321 in the fifth line of the B-component area. The binary data are made up of two bits per pixel.

The generated binary data for each of the four colors CMYK are sent to the interlace processing unit 62 in units of two pixels (four bits) from the pixels starting from the head of the line.

In the interlace processing unit 62, the data for the two pixels in each color are divided up pixel by pixel, and the data for each pixel are stored in their respective storage areas. These storage areas are provided in the interlace buffer 693, and two storage areas are provided for each color. This is done in order to generate head-drive data (the first recording data) for each scan movement because one raster line is printed by two scan movements of the writing carriage 36 in the printer section 30 and thus, adjacent dots are printed in different scan movements. Therefore, in the interlace buffer 693 are provided, for each of C, M, Y, and K, for example, an odd-number dots area for storing odd-number pixel data used for printing with the former scan movement, and an even-number dots area for storing even-number pixel data used for printing with the latter scan movement. The odd-number image data and the even-number image data for each color are successively stored, as shown in FIG. 13A. In this case, data for each color and each scan, that is, data amounting to 16 bits —two pixels in the four colors— are temporarily stored in the SRAM 621 in the interlace processing unit 62, and when data amounting to 64 bits are stored, the data are burst transmitted to the interlace buffer 693 via the local bus 511. Here, the area shown by one box (for example, in which C1, C3, and so forth, are shown; this box is referred to as a cell below) in FIG. 13A stores data for eight pixels, and thus, data for 40 pixels are stored in an area made up of five cells. That is, for example, when data in the lowermost row in both the odd-number dot area and the even-number dot area for cyan binary data are taken out alternately and arranged in a row, data for printing a cyan component in one line in the main-scanning direction of the original will be gathered.

Further, while changing the arrangement of the data stored in the interlace buffer 693, the interlace processing unit 62 sends out data to the image buffer unit 64 per every odd-number- and even-number dot areas for each color in CMYK. This process is executed for each color, but since the processing method is the same for each color, only an example about the odd-number dot area for the cyan binary data is described.

The interlace processing unit 62 takes the data, which have been transferred to the odd-number dot area for the cyan binary data, into the SRAM 621 of the interlace processing unit 62. In this case, data (64 bits) for four cells on the left (on the head side of the data) in the lowermost row in the odd-number dot area for the cyan binary data, and data for four cells in every four rows positioned above the lowermost row, that is, data for four cells from each of a total of four rows, are taken out, and they are burst transmitted via the local bus 511 in units of four cells. As regards the transferred data, the data that have been burst transmitted repeatedly in units of four cells are successively taken out, for example, cell by cell from the head side of the data of each unit of four cells and stored in the SRAM 621. In this case, as shown in FIG. 13B for example, unit data amounting to sixteen cells arranged in a matrix of 4 cells×4 rows are mapped on the SRAM 621. Here, data are transferred per every four rows in order to take out data corresponding to the head nozzle arrangement, because the data stored in the image buffer 694, 695 are head-drive data for making each nozzle eject ink in one scan movement of the writing carriage 36. That is, this is done in order to take out data per every four rows and correlate the data to the nozzle arrangement, because the interlace mode in the present printing operation prints three raster lines between two raster lines that have been printed by adjacent nozzles.

Next, as shown in FIG. 13C, the first unit data from each row, that is, data (64 bits) for four cells arranged in the vertical direction are taken, from the SRAM 621, temporarily into the register of the interlace processing unit 62, and the data in the register are stored in a separate area of the SRAM 621. At this time, as shown in FIG. 13D, the data for four cells in the vertical direction, which have been read out from an original area in the SRAM 621, are mapped into four cells in the lateral direction in the other area. That is, as for the data that have been taken into the SRAM 621, data rearrangement is performed so that the vertical direction and the lateral direction are interchanged. In the present embodiment, an example in which data transmitted by four times of burst transmissions are arranged in the SRAM 621 in a matrix was described; however, it is not always necessary to arrange the data in a matrix.

The data in the SRAM 621 whose arrangement has been converted are transferred to the image buffer unit 64. In the image buffer unit 64, the data of the SRAM 621 are read in units of four cells in the lateral direction, and they are burst transmitted to the image buffers 694, 695 via the local bus 511.

FIG. 14 is a conceptual diagram showing data transferred to the image buffers 694, 695. Cells in a number that is the same as the number of nozzles in the nozzle row are arranged in the lateral direction in FIG. 14. Eight areas, each of which having cells of a number in which data for the image to be printed for one scan movement in the scanning direction of the writing carriage 36 are to be stored, are allocated to the vertical direction. That is, each of the areas has a data capacity for storing data for driving each nozzle in one scan movement of the writing carriage 36, and each of the cells lined up in the lateral direction corresponds to each nozzle in the nozzle row. Here, as regards the eight areas, two areas are allocated to each CMYK nozzle. The two areas become the first area 693 and the second area 694 for storing data for driving the head in one scan movement, respectively. Data for each scan are alternately stored in the two areas.

In the image buffers 694, 695, data for four cells that have been burst transmitted are successively stored in the S lateral-direction cells, and when data for four cells are stored, data are stored in the cells of the second row. Then, when data for one scan movement is stored, data are stored in the fifth through eighth cells in the lowermost row, and data are written in units of four cells. When data for the number of nozzles have been written into one of either the first area 693 or the second area 694, data corresponding to the next scan are stored in the other area.

When data are written into the first or second area for each color in CMYK and head-drive data are generated, the CPU 54 controls the carriage motor 40, the PF motor 42, and so forth, to carry the paper and move the writing carriage 36 to a predetermined position. In this case, the head-drive data stored in the lowermost row in the first area 694 corresponding to each color in CMYK of the image buffers 694, 695, that is, data in the cells that are arranged in the lateral direction and that have continuous addresses are successively read out. The read-out data are sent to a memory, in the head control unit 68, corresponding to each nozzle, and according to the head-drive data, the print head 38 is driven by the head control unit 68 controlled by the CPU 54.

In the present embodiment, an example in which printing is performed according to the overlap mode was described. However, the printing method may be of any mode such as an interlace mode in which one raster line is printed by one dot, a mode of successively performing printing from the leading edge of the print paper on a raster line basis, and the so-called band-feed mode in which printing is performed while the paper is intermittently carried by an amount equal to the length of the nozzle row, and it becomes possible to efficiently rearrange the data so that the continuous data in the lateral direction can be read out in the vertical direction.

Figure 15:
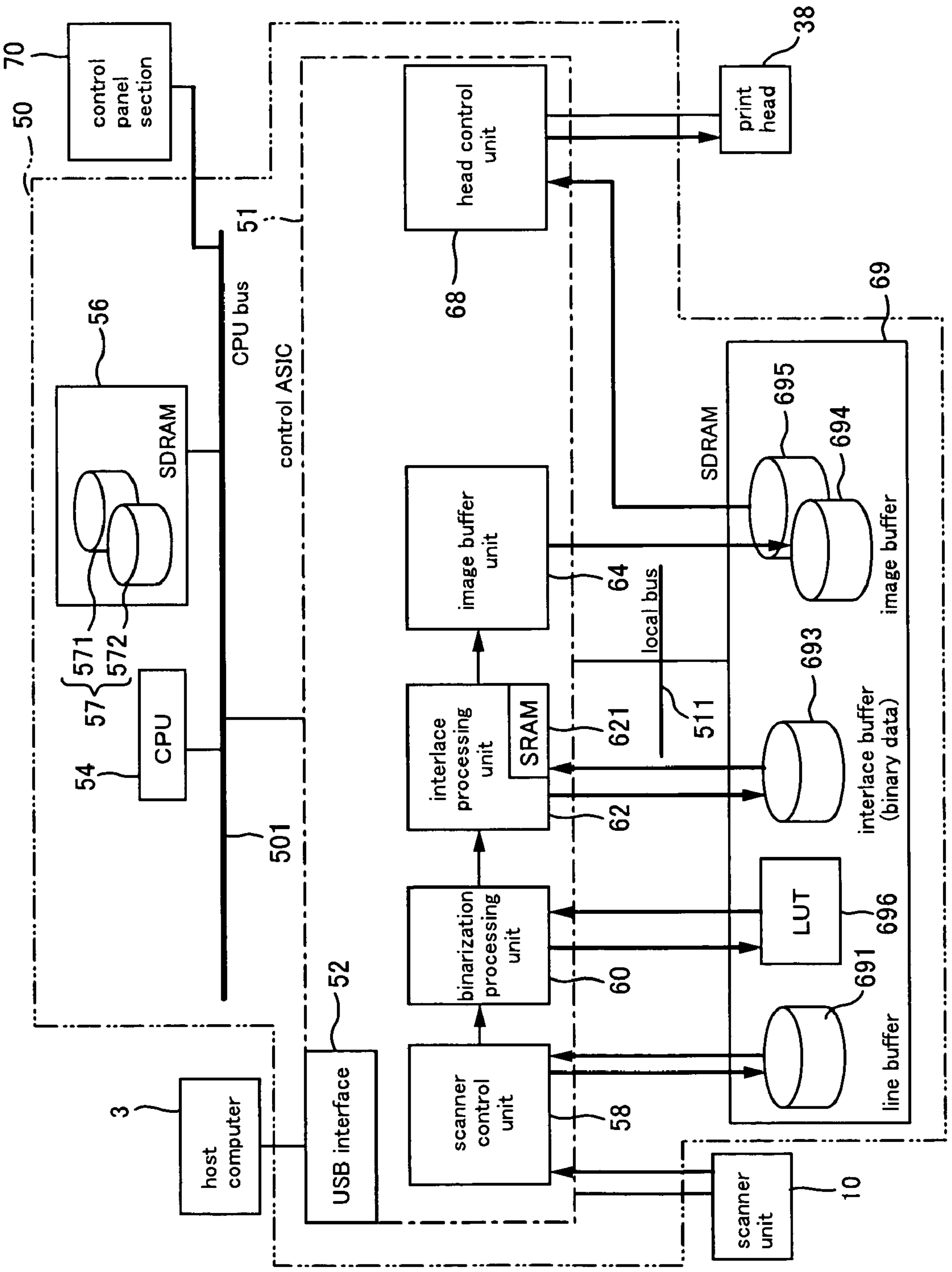
FIG. 15 is a block diagram for illustrating another transferring method of head-drive data in the image buffer.
Figure 16:
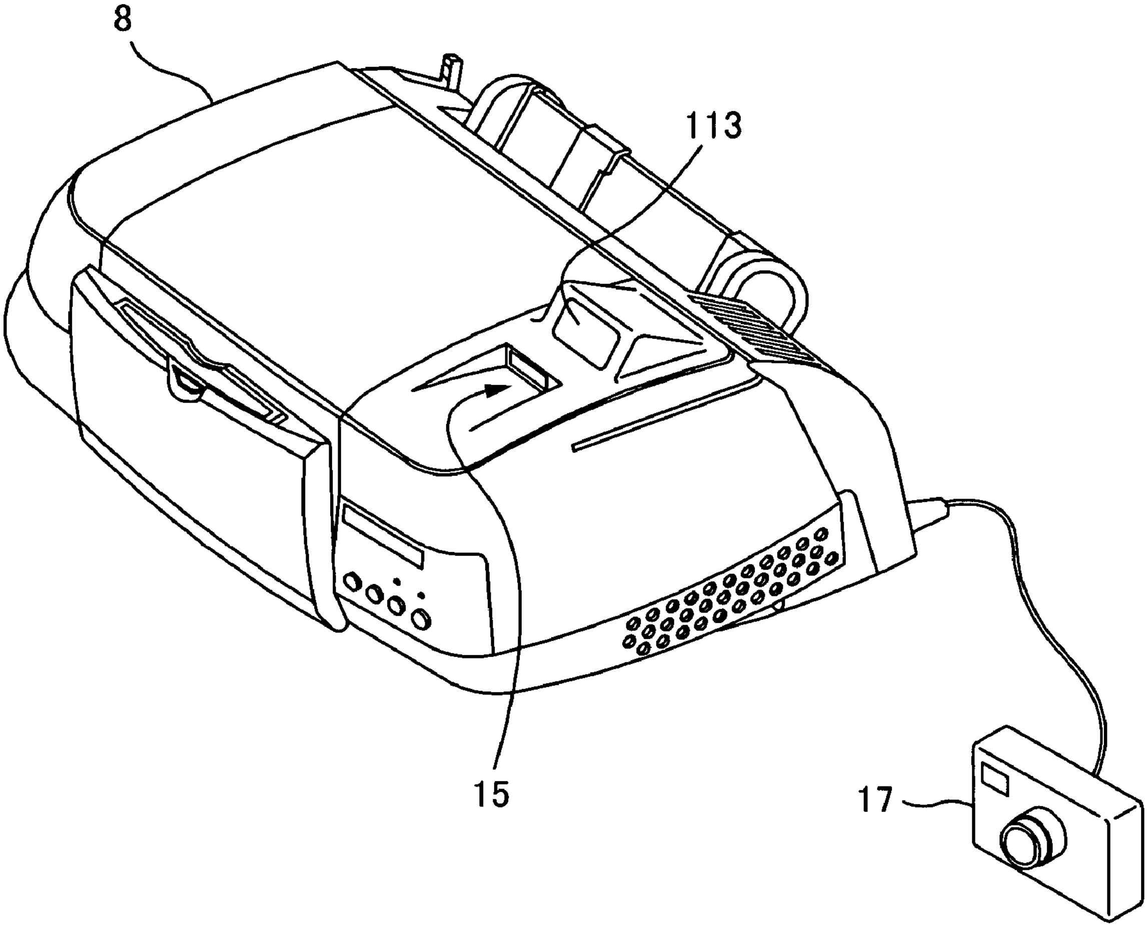
FIG. 16 is a diagram for illustrating another example of a data obtaining section.

FIG. 15 is a block diagram for illustrating another transferring method of head-drive data in the image buffer, and FIG. 16 is a diagram for illustrating another example of a data obtaining section.

In the above-mentioned embodiment, an example in which the head-drive data, which have been transferred to the image buffers 694, 695, are transferred to the head control unit 68 under control of the CPU 54 via the CPU interface unit 66 and the CPU bus 501 was described. However, the data may be transferred to the head control unit 68 from the image buffers 694, 695 via the local bus 511, without passing the CPU bus 501, as shown in FIG. 15. In this case, since the head-drive data for driving the print head 38 are transferred to the head control unit 68 without passing through the CPU bus 501, the transferring of the head-drive data does not restrict the usage status of the CPU bus 501, and it is possible to transfer the data efficiently without causing any interruption processing in the CPU 54 process.

Further, in the above-mentioned embodiment, the data obtaining section was configured as the scanner section for obtaining image data by reading an original. However, as shown in FIG. 16, the data obtaining section may be, for example, a data read-in section 15 such as a hard disk drive in which image data are stored, a CD-ROM drive, a reading unit for reading data in various kinds of memory cards that are inserted into a slot, or a digital camera 17 connected via an interface. The recording apparatus may be a printer 8 comprising the data read-in section 15 or the interface. In this case, for example, it is possible to provide a liquid crystal display section 113 for displaying the image of the data that have been read from the digital camera etc. Further, instead of the scanner unit 10 shown in FIG. 15, the data read-in section 15 such as the reading unit for reading the various kinds of memory cards inserted into the slot may be used; instead of the scanner control unit 58, a JPEG decompressing unit for decompressing JPEG data read from the various kinds of memory cards may be used; further, instead of the line buffer 691, a JPEG buffer for decompressing the decompressed JPEG data may be used.

Memory Management Function

The SPC multifunction apparatus 1 according to the present embodiment possesses a memory management function as follows in order to reduce, as much as possible, occurrence of so-called buffering in which the reading operation stops right in the middle of reading an image from an original 5 with the scanner section 10.

The memory management function is a function for setting the size of the area of the line buffer 691 and the interlace buffer 693, which are set in the ASIC-SDRAM 69, according to the operations of the SPC multifunction apparatus 1. That is, when the present SPC multifunction apparatus 1 operates as a scanner, the second recording data that are based on the data obtained by the scanner section 10 are output to the outside as they are. Here, "output to the outside" not only means to send the second recording data out to a host computer, but also means to write the second recording data into an attachable/detachable memory (for example, the memory card inserted into the slot serving as the data read-in section 15). At this time, since binary data are not generated by binarizing the second recording data, the second recording data are also stored in the interlace buffer. That is, the interlace buffer 693, which serves as the converted-data storage area for storing data having been color converted by the binarization processing unit 60, is used as the line buffer 691, which serves as the image data storage area for storing the second recording data that are based on the data obtained by the scanner section 10.

Further, the SPC multifunction apparatus 1 of the present embodiment appropriately sets the ratio between the memory size of the line buffer 691 and the memory size of the interlace buffer 693 according to the resolution of the image read from the original 5 when it performs local copying. Specifically, if the image is to be read from the original with low resolution, then a minimum area necessary is allocated to the line buffer 691 because it is not necessary to allocate an excessively large memory area to the line buffer 691, and instead, the rest of the memory area is allocated to the interlace buffer 693. In this way, it is possible to perform processing as fast and as smooth as possible when an image is to be read with low resolution.

On the other hand, if the image is to be read from the original with high resolution, then the memory area to be allocated as the line buffer 691 is reserved to be as large as possible. It should be noted that as for the interlace buffer 693, the memory area to be allotted becomes smaller compared to when the resolution is low. In this way, it becomes possible to execute local copying while reducing, as much as possible, occurrence of buffering. In the present embodiment, the ratio between the memory areas to be allocated to each buffer 691, 693 is set in two levels according to the resolution of the image to be read from the original, that is, it is set separately for the case in which the image is to be read with low resolution and for the case in which the image is to be read with high resolution.

FIG. 17 shows an allocation status of the memory when the apparatus functions as a scanner and as a local copier (low resolution and high resolution). When the apparatus functions as a scanner, there is no memory area allocated as the interlace buffer 693 as shown in A of the figure, but instead, the memory area is allocated as the line buffer 691. It should be noted that in the area indicated as "others" in the figure, a data storage area 697 such as the image buffers 694, 695 for storing the head-drive data is provided. In the present embodiment, the others data storage area 697 is provided in a fixed manner without its allocation being changed according to the operations of the SPC multifunction apparatus 1 as in the case of the line buffer 691 and the interlace buffer 693.

When the apparatus functions as a local copier, if reading is performed with low resolution, then the minimum necessary memory area is allocated to the line buffer 691, and a large area is reserved for the memory area allocated to the interlace buffer 693, as shown in B of that figure. On the other hand, if reading is performed with high resolution, then the memory area allocated to the interlace buffer 693 is conversely made small in order to reserve a large as possible area for the memory area allocated to the line buffer 691, as shown in C of that figure.

The ASIC 51 performs the memory allocation management of the line buffer 691 and the image buffer 693. The ASIC 51 obtains settings information about the memory allocation for each operation from the CPU 54 when the power of the SPC multifunction apparatus 1 is turned ON. The CPU 54 stores, in advance, the settings information about the memory allocation in, for example, a ROM, and when the power of the SPC multifunction apparatus 1 is turned ON, the CPU reads in the settings information from the ROM and sends it to the ASIC 51.

The ASIC 51 stores the obtained settings information in an appropriate storage section. Then, when there are various operation commands from the CPU 54, the ASIC obtains from the storage section the memory allocation settings information that corresponds to the operation command, and based on the settings information, the ASIC 51 sets the area allocation of the ASIC-SDRAM 69.

FIG. 18 shows an example of the settings information. The settings information indicates the allocation addresses for each of the buffers 691 and 693 for each mode of operation of the SPC multifunction apparatus 1. That is, when the apparatus functions as a scanner, the ASIC 51 sets the ASIC-SDRAM 69 so that the addresses "0000h through CFFFh" are allocated to the line buffer 691 and that no address is allocated to the interlace buffer 693. On the other hand, if the read resolution is at low resolution when local copying is performed, then the addresses "0000h through 4FFFh" are allocated to the line buffer 691 and the addresses "5000h through CFFFh" are allocated to the interlace buffer 693 with respect to the ASIC-SDRAM 69. Further, if the read resolution is at high resolution when local copying is performed, then the addresses "0000h through 7FFFh" are allocated to the line buffer 691 and the addresses "8000h through CFFFh" are allocated to the interlace buffer 693 as regards the ASIC-SDRAM 69. It should be noted that in the present embodiment, the addresses "D000h through FFFFh are allocated to the "others" data storage area 697 in which the image buffers 694, 695 etc. are provided.

Figure 19:
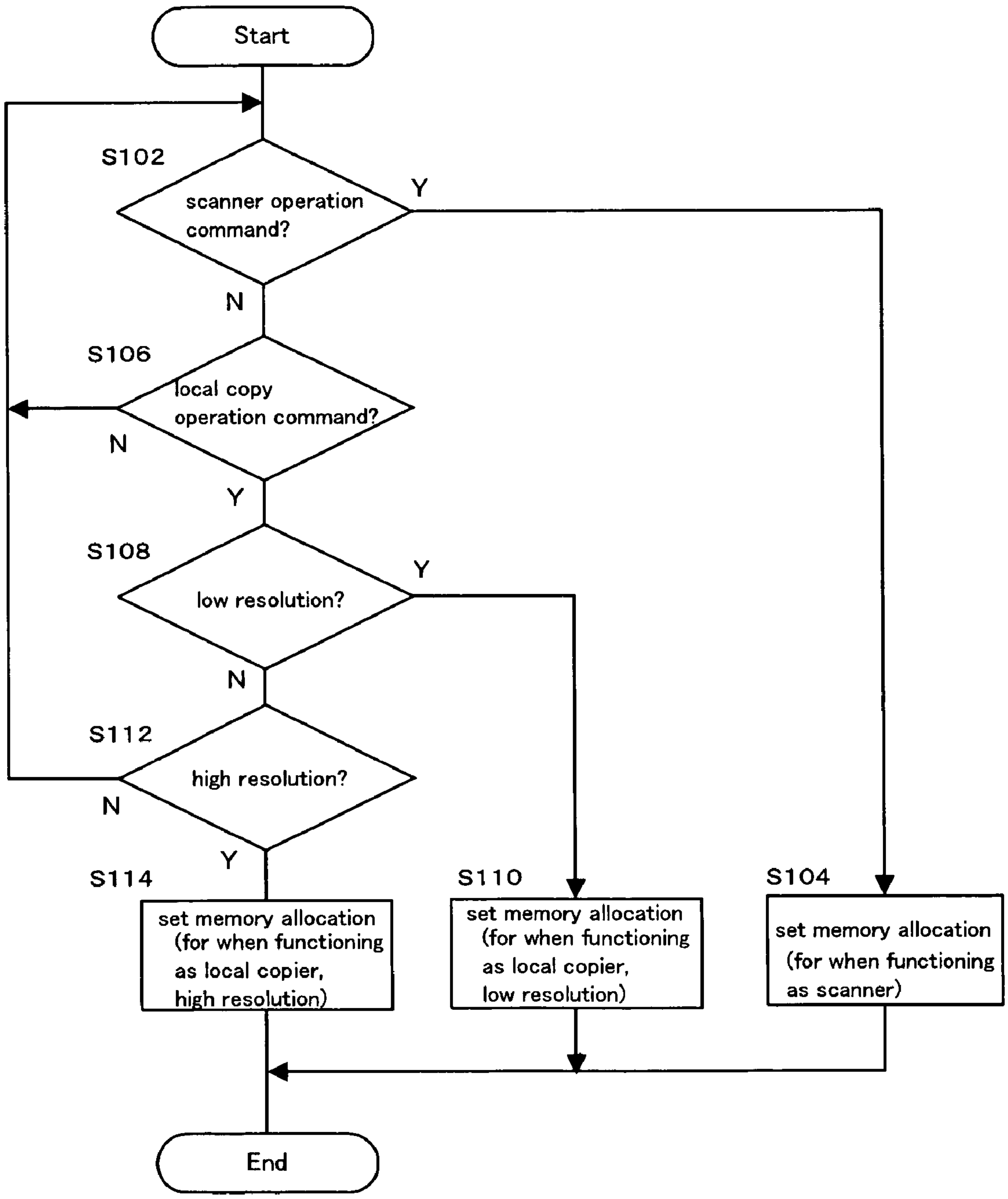
FIG. 19 shows a memory allocation setting flow of an ASIC.

FIG. 19 shows a memory allocation setting flow of the ASIC. When there is an operation command from the CPU, the ASIC 51 determines whether or not the operation command is a "scanner operation command" (S102). If the operation command is a "scanner operation command", then the process proceeds to step S104, and the ASIC 51 sets the ASIC-SDRAM 69 to have an allocation for scanner operation. On the other hand, if the operation command is not a "scanner operation command", the process proceeds to step S106, and here, the ASIC determines whether or not the command is a "local copy command". If the command is not a "local copy command", then the ASIC makes a confirmation about the command with the CPU 54 and the process again returns to step S102. On the other hand, if the operation command is a "local copy command", then the process proceeds to step S108, and the ASIC determines whether the image read resolution is at low resolution or not. If the image read resolution is at low resolution, then the process proceeds to step S110, and the ASIC sets the ASIC-SDRAM 69 to have the allocation for when local copying is performed with low resolution. On the other hand, if the image read resolution is not at low resolution, then the process proceeds to step S112, and the ASIC determines whether the resolution is at high resolution or not. Here, if the image read resolution is at high resolution, the process proceeds to step S110, and the ASIC sets the ASIC-SDRAM 6969 to have the allocation for when local copying is performed with high resolution. On the other hand, if the image read resolution is not at high resolution, then the ASIC makes a confirmation about the command with the CPU 54 and the process again returns to step S102.

In the SPC multifunction apparatus 1 as above, when the apparatus operates as a scanner, it is possible to reserve a large memory area for the line buffer 691 because the memory area that is to be allocated to the interlace buffer 693 is instead allocated to the line buffer 691. Therefore, it is possible to perform the process of reading images from originals smoothly and it is possible to reduce, as much as possible, occurrence of buffering.

Further, when local copying is performed, the ratio between the memory area allocated to the line buffer 691 and the memory area allocated to the interlace buffer 693 is changed according to the resolution of the image to be read from the original, that is, according to low resolution or high resolution. Therefore, it is possible to set appropriate memory areas according to each resolution, and in this way, it is possible to perform the process of reading images from originals and the process of printing those images smoothly and it is possible to reduce, as much as possible, occurrence of buffering.

It should be noted that in the present embodiment, the settings information about the memory allocation for each operation was stored as allocation addresses with respect to the ASIC-SDRAM 69. The present invention, however, is not limited to this, and for example, the ratio between the area sizes of the line buffer 691 and the interlace buffer 693 may be stored in forms such as "1:0", "8:3", and "3:8".

About the Repeat Printing Mode

Figure 20:
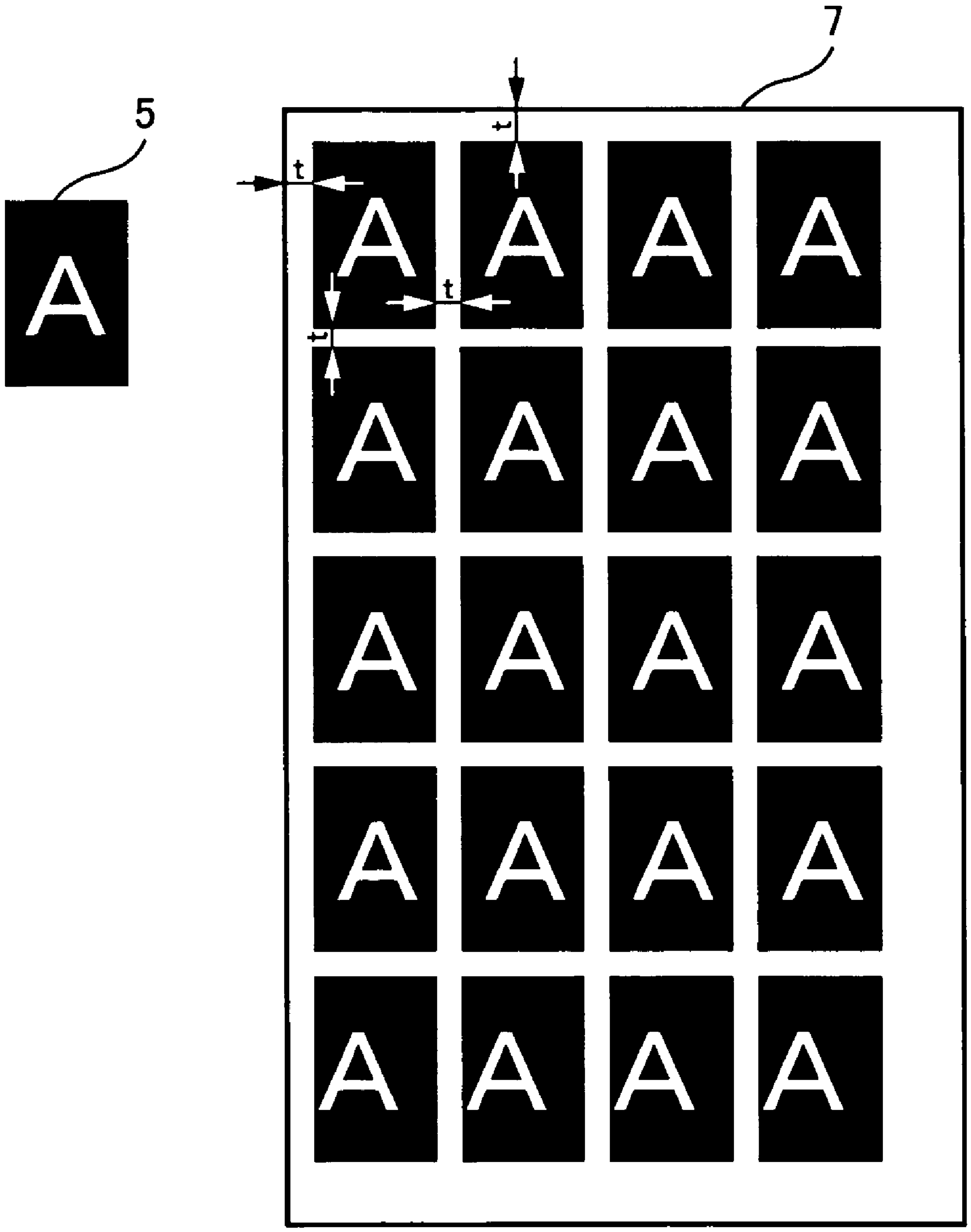
FIG. 20 is a diagram for illustrating a print mode (copy mode) of the present embodiment.

FIG. 20 is a diagram for illustrating a print mode (copy mode) of the present embodiment. In the figure, 5 indicates the original, and an image "A" is described on its surface. 7 is the paper that has been printed by the SPC multifunction apparatus 1. According to the print mode of the present embodiment, the number of images "A" to be printed on the paper 7 is automatically calculated, and a print image in which a plurality of images "A" are arranged is printed on the paper 7. Below, such a print mode is called "repeat printing" or "repeat copying".

<About the Repeat Printing Processing Operation>

Figure 21:
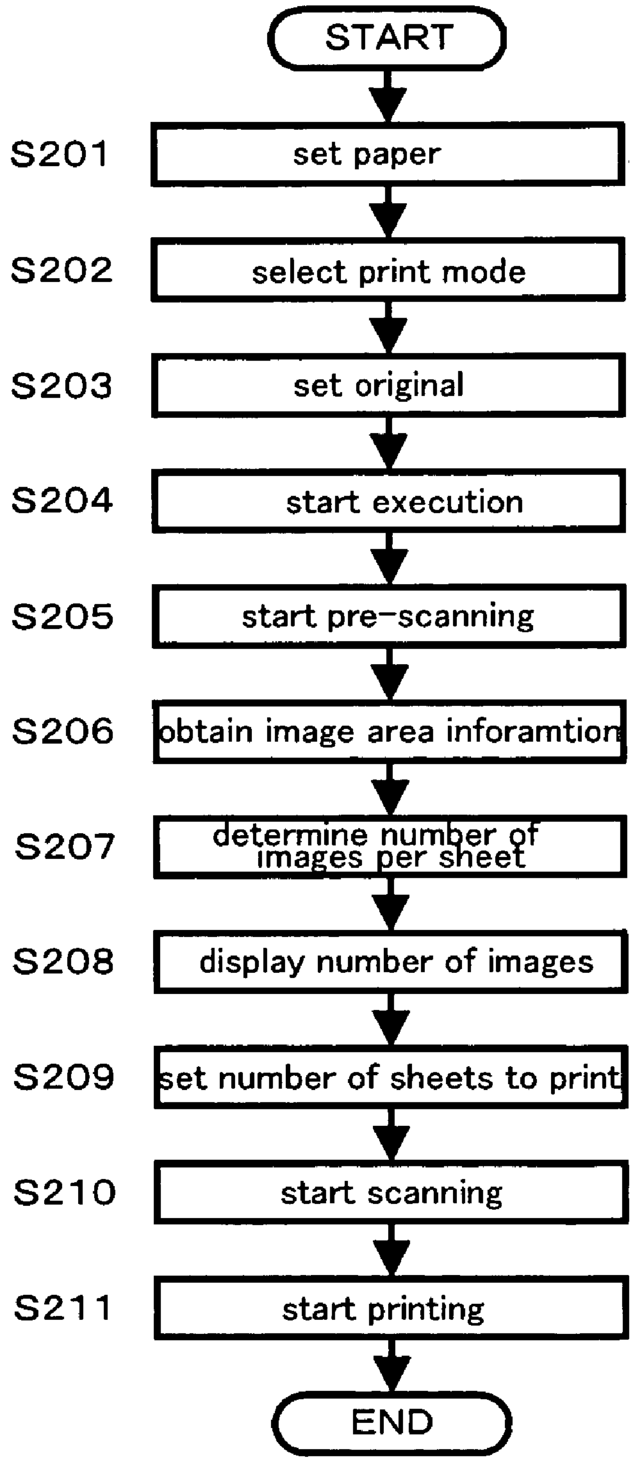
FIG. 21 is a flowchart for illustrating a procedure of a repeat printing processing operation of the present embodiment.
Figure 23:
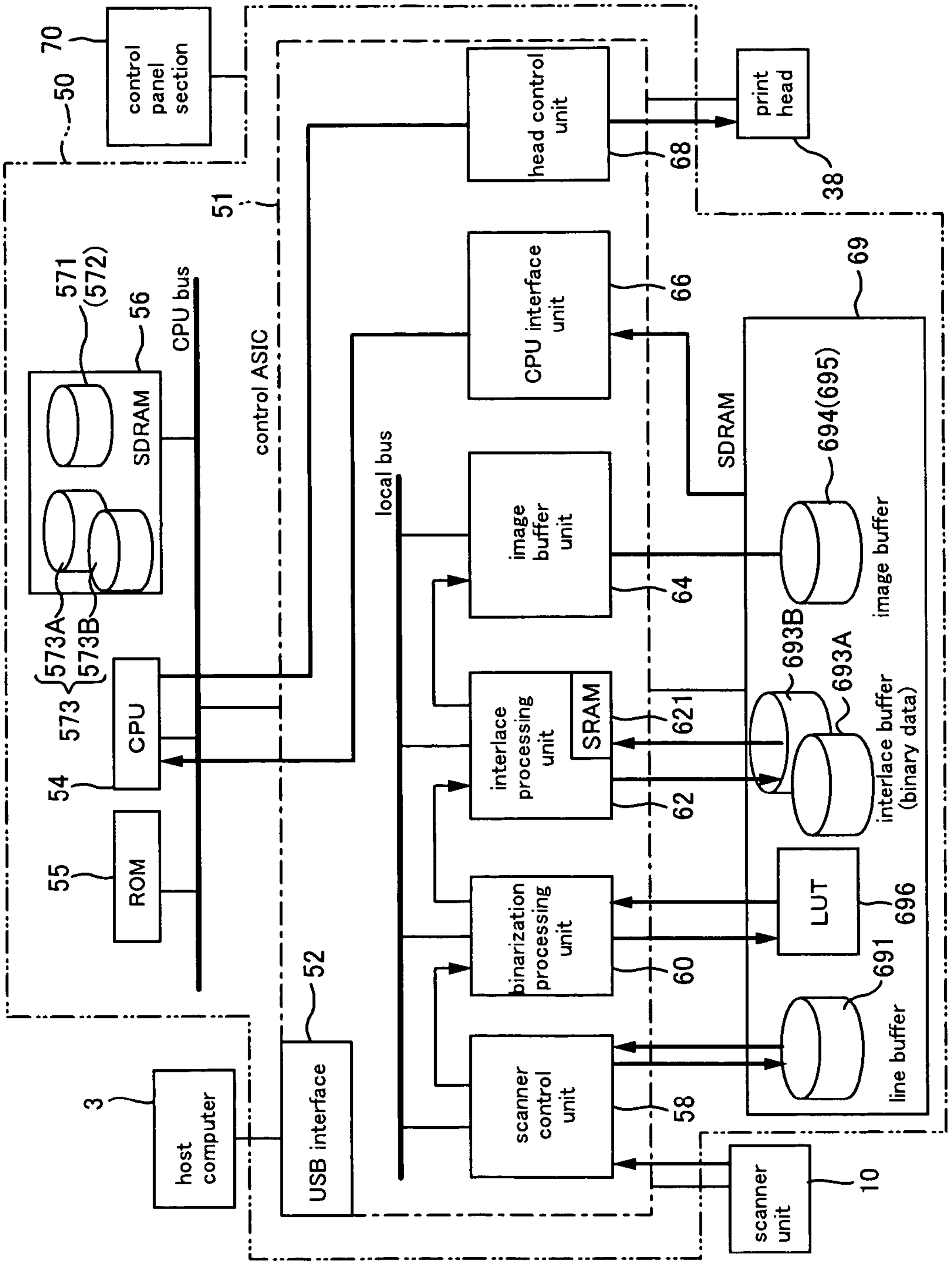
FIG. 23 is a block diagram showing an example of a control circuit 50 when repeat printing is performed.

FIG. 21 is a flowchart for illustrating a procedure of a repeat printing processing operation of the present embodiment. Below, the repeat printing mode of the present embodiment is described using FIG. 20 and FIG. 21. It should be noted that programs relating to the procedure of the repeat printing processing operation are stored in the ROM 55 (FIG. 23).

First, the user sets paper 7 in the paper supply tray of the SPC multifunction apparatus 1 (S201). Further, the user operates the various buttons on the control panel section 70 to enter information about the paper 7. That is, first, using the menu button 83, the user successively changes the setting items that are displayed and goes to the display screen of the "print paper" which is the setting item to be set. Then, the user operates the button 90 to set the setting value to "A4 paper". In this way, the SPC multifunction apparatus 1 obtains information about the paper (paper information). However, when the user does not set the size of the paper using the control panel section 70, a default value that has been set in advance is used as the setting value about the paper. In the description below, it is assumed that a plurality of sheets of A4-size single-sheet print paper are set.

A table (a reference chart) that correlates the type of print paper and the print area for the certain type of paper is stored in the SDRAM 56 of the SPC multifunction apparatus 1. The SPC multifunction apparatus 1 then refers to the table taking the obtained paper information as the key, and obtains information about the print area for that type of paper. In the present embodiment, it is assumed that the print area information for A4-size paper indicates that the length in the vertical and lateral directions are X1 (mm) and Y1 (mm).

Next, the user operates the various buttons on the control panel section 70 to select the "repeat printing" of the present embodiment from among the plurality of print modes (S202). That is, first, the user successively changes the displayed setting items using the menu button 83 and goes to the display screen of the "copy mode" which is the setting item to be set. Then, the user operates the button 90 to set the setting value to "repeat printing". In this way, the print mode of the SPC multifunction apparatus 1 is selected to be "repeat printing". Further, in the same way, the user operates the various buttons on the control panel section 70 to set the length of the width t of the margin. In this way, the SPC multifunction apparatus 1 obtains information about the margins (margin information). However, if the width t of the margin is not set through the control panel section 70, a default value that has been set in advance is used as the setting value for the margin width. In the present embodiment, it is assumed that the margin information indicates that the width is t (mm).

Figure 22A:
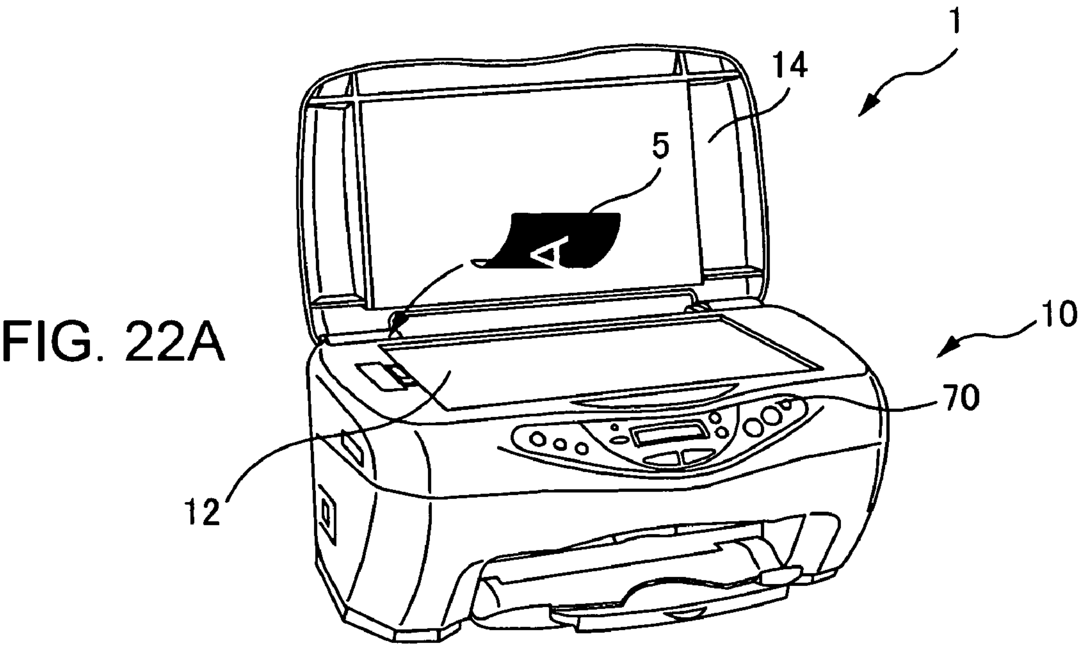
FIG. 22A is a diagram showing how an original is set.
Figure 22B:
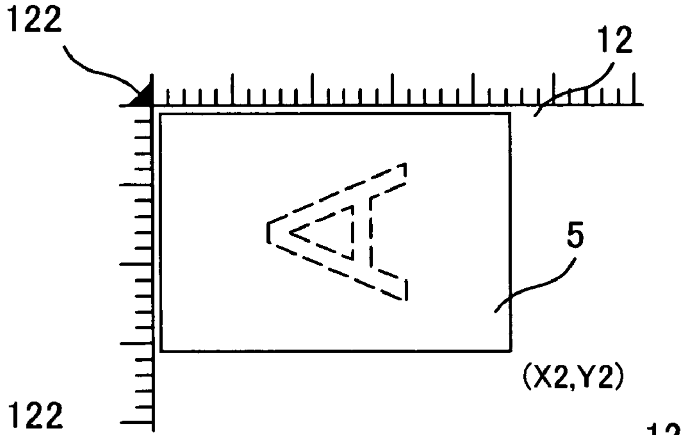
FIG. 22B is a diagram showing a state in which the original is set without being slanted.
Figure 22C:
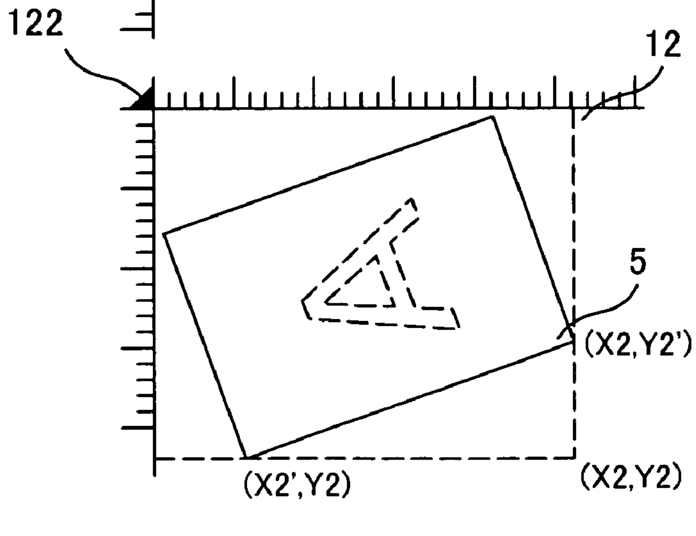
FIG. 22C is a diagram showing a state in which the original is set slanted.

Next, the user sets the original 5 on the scanner section 10 of the SPC multifunction apparatus 1 (S203). The way in which the original 5 is set is described using FIG. 22A through FIG. 22C. First, the user opens the original bed cover 14 and places the original 5 on the original bed glass 12 (FIG. 22A). When the original 5 is placed on the original bed glass 12, the user faces the side on which the image "A" is written downwards and places a corner of the original 5 against the origin mark 122 at the left-back corner of the original bed glass 12 (FIG. 22B). Then, the user closes the original bed cover 14 to make the original bed cover 14 press the original 5 on the original bed glass 12 against the original bed glass 12. In this way, the original 5 is set on the scanner section 10.

Next, the user instructs execution of the repeat printing. Since the apparatus is already set to perform the repeat printing, execution of repeat printing starts when the user presses the color copy button 84 or the monochrome button 86 of the control panel section 70 (S204).

Next, the scanner section 10 of the SPC multifunction apparatus 1 starts pre-scanning (S205). Pre-scanning is an operation that is performed before the scan operation for performing printing. During pre-scanning, the image is read with lower resolution compared to the resolution of the scan operation for when printing is performed. Further, during pre-scanning, data only from the G (green) linear sensor, among the RGB linear sensors, are obtained. During pre-scanning, since the resolution for image reading is low (the resolution is rough) and only data of one color are obtained, the data amount of the image that has been read is small, and therefore, it is possible to read the image faster compared to the scan operation for when printing is performed.

Next, the SPC multifunction apparatus 1 determines the image area (S206). The image area is expressed as the largest coordinate in the X direction (X2) of the area occupied by the image and the largest coordinate in the Y direction (Y2) of the area occupied by the image. That is, if the original is set straight as in FIG. 22B, then the coordinates of the corner opposite to the corner of the original that has been placed against the origin mark become (X2, Y2). However, if the original 5 is set in a slanted manner as in FIG. 22C, then the area of the rectangle shown by the dotted lines becomes the image area. It should be noted that since the X direction is the scan-moving direction of the reading carriage 16, the coordinate of the image area in the X direction relates to the driving of the reading carriage 16. On the other hand, since the Y direction is the scanning direction of the CCD sensor, the coordinate of the image area in the Y direction relates to the device arrays of the CCD sensor. In the description below, it is assumed that image area information indicates that the size of the image in the vertical and lateral directions is X2 (mm) and Y2 (mm).

Next, the SPC multifunction apparatus 1 determines the number of images that can be arranged per sheet of paper (S207). The number of images is determined as a maximum number that can be arranged on the paper 7. The maximum number that can be arranged on the paper 7 is calculated as a product (m×n) of a maximum number m of images that can be arranged in the vertical direction of the paper and a maximum number n of images that can be arranged in the lateral direction of the paper. The maximum number m of images that can be arranged in the vertical direction of the paper is calculated as a quotient of (X1−t)÷(X2+t) based on the print area information in the vertical direction (X1), the image area information in the vertical direction (X2), and the margin information (t). In the same way, the maximum number n of images that can be arranged laterally is calculated as a quotient of (Y1−t)÷(Y2+t). That is, the number of images arranged on the paper is determined based on the print area information (X1, Y1), the image area information (X2, Y2), and the margin information (t). In the present embodiment, as shown in FIG. 20, the maximum number m of images that can be arranged in the vertical direction of the paper is five, and the maximum number n of images that can be arranged in the lateral direction of the paper is four. Therefore, the number of images that can be arranged per sheet of paper becomes twenty.

Next, the SPC multifunction apparatus 1 displays the determined number of images on the display section (S208). In this way, the user can know the number of images "A" that will be printed per sheet of paper. Then, by pressing the button 90 on the control panel section 70, the user can set the number of sheets to print when "repeat printing" is performed (S209). In this case, since the user knows the number of images that will be printed per sheet, the user sets, for example, five sheets as the number of sheets to print if he/she needs a hundred pieces of images "A". That is, the displaying, on the display section, of the number of images that will be printed per sheet of paper by the SPC multifunction apparatus 1 makes it possible for the user to set a necessary number of sheets, and it is possible to prevent waste of paper.

Next, the scanner section 10 of the SPC multifunction apparatus 1 reads the image from the original. The reading operation is started when the user presses either the color copy button 84 or the monochrome button 86 on the control panel section 70 (S210). The image reading area at this time becomes the area designated by the image area information (X2, Y2). It should be noted that the resolution for this reading operation is higher than the resolution for the above-described pre-scanning. Further, data of only a single color were obtained in the above-described pre-scanning, but in this reading operation, data in each of RGB are obtained.

Next, based on the image data of the original having been read (the second recording data), the printer section 30 of the SPC multifunction apparatus 1 arranges a plurality of images on a sheet of paper and prints them on paper (S211). A total of m×n images -m in the vertical direction and n in the lateral direction-are printed on the paper. Further, margins of width t are provided between the edges of the paper and the images. Furthermore, margins of width t are also provided between images. That is, the width t of the margins provided between the images and the edges of the paper and the width t of the margins provided between the images are equal (refer to FIG. 20).

It should be noted that, how the SPC multifunction apparatus 1 arranges the images during the repeat printing of the present embodiment will be made clear by later descriptions.

First Embodiment of Repeat Printing

<About the Data Flow in Control Circuit 50 when Repeat Printing is Performed>

FIG. 23 is a block diagram showing an example of the control circuit 50 when repeat printing is performed. In FIG. 10 described above, two buffers —the image buffers 571, 572 (or the image buffers 694, 695)— were depicted for alternately performing writing and reading. In FIG. 23, however, in order to simplify the description, the two buffers for alternately performing writing and reading are not depicted.

Although the hardware configuration is the same as the control circuit 50 in FIG. 10 described above, the allocation of the memory area in the SDRAM 56, which is directly readable from the CPU 54, is different, for example. Further, in FIG. 10 described above, the CPU 54 accessed only the image buffers 694, 695. In FIG. 23, however, the CPU 54 also accesses the line buffer 691 and the interlace buffer 693. Further, the memory area allocation of the interlace buffer 693 is divided into two, and therefore, the buffer is logically made of two buffers.

Below, using FIG. 23, the data flow in the control circuit 50 when repeat printing is performed is described. It should be noted that programs for controlling the data flow in the control circuit 50 when the repeat printing is performed are stored in the ROM 55.

(1) First, the data flow in the control circuit 50 from the start of pre-scanning up to displaying of the number of images is described.

Receiving an input signal of the color copy button 84 or the monochrome button 86 from the control panel section 70 after the "repeat printing" is set, the CPU 54 sends control signals to the scanner control unit 58. The scanner control unit 58 controls the scanner section 10 according to the control signals from the CPU 54 to start reading the image in the original 5 according to the pre-scanning operation.

In the pre-scanning operation, data only from the G linear sensor, among the RGB linear sensors, are taken into the line buffer 691 via the scanner control unit 58. As described above, in the pre-scanning operation, the resolution for image reading is low (the resolution is rough) and only data of one color are obtained. In this way, it is possible to make the data amount that is taken into the line buffer 691 during the pre-scanning operation small, and therefore, it is possible to reduce data processing loads and to perform the reading operation of the image faster in pre-scanning.

Then, in order to obtain the image area information, the data in the line buffer 691 that have been taken in by the pre-scanning operation are sent into the SDRAM 56, which can be directly read from the CPU 54, before being converted into binary data.

The CPU 54 determines the image area by analyzing the data sent into the SDRAM 56. In the present embodiment, the moving direction of the reading carriage 16 (the sub-scanning direction) is assumed as the X direction, the direction parallel to the linear sensors forming the CCD sensor 28 (the main-scanning direction) is assumed as the Y direction, and the largest values (X2, Y2) in the X direction and the Y direction of the image area are analyzed. As a result, the CPU 54 obtains the image area information (X2, Y2).

In the present embodiment, the CPU 54 determines the rectangle whose diagonal is from the origin (0, 0) to (X2, Y2) as the image area. Therefore, as shown in FIG. 22B, if a corner of the rectangular original 5 is at the origin mark and the original is set straight, then the coordinates of the corner opposite to the corner of the original that has been placed against the origin mark become (X2, Y2). However, if the original 5 is set in a slanted manner as in FIG. 22C, then even areas in which the original 5 does not exist will be determined as the image area.

After obtaining the image area information, the CPU 54 determines the number of images per sheet of paper. It should be noted that the information necessary for determining the number of images, such as the print area information (X1, Y1) and the margin information (t) of the paper, is already taken in before the pre-scanning operation (S201, S202). Therefore, the maximum number m of images that can be arranged in the vertical direction of the paper and the maximum number n of images that can be arranged in the lateral direction of the paper can be calculated, as already described above.

(2) Next, the data flow in the control circuit 50 from the start of scanning up to the end of repeat printing is described. It should be noted that in the description above, one raster line was formed by two scan movements of the writing carriage 36. However, in order to simplify the description, it is assumed that one raster line is formed by one scan movement of the writing carriage 36. (That is, description is made below in a state in which the dot data of the raster line is not divided into the odd-numbered data and the even-numbered data.)

Receiving an input signal of the color copy button 84 or the monochrome button 86 from the control panel section 70 after the number of sheets to print is set, the CPU 54 sends control signals to the scanner control unit 58. These control signals include information about the image area information (X2, Y2) as information about the reading area. Then, the scanner control unit 58 controls the scanner section 10 according to the control signals from the CPU 54 to start reading the image in the area designated by the image area information.

The scanner control unit 58 controls the scanner section 10 to take the second recording data in the RGB system, which is output from the CCD sensor at a predetermined cycle, into the line buffer 691. Then, the scanner control unit 58 subjects the RGB data, which has been temporarily taken into the line buffer 691, to the RGB interline correction processing (described above), and then sends the second recording data in the RGB system for the same line into the binarization processing unit 60.

The binarization processing unit 60 subjects the second recording data in the RGB system, which have been sent, to color conversion processing to convert the data into recording data in the CMYK system and also the so-called halftone processing. Then, the binarization processing unit 60 refers to the lookup table (LUT) 696 stored in the control-ASIC-SDRAM 69 to convert the halftone-processed data into binary data for each color in CMYK. The binarization unit 60 sends the binary data for each color in CMYK into the interlace processing unit 62.

The interlace processing unit 62 takes the binary data for each color in CMYK, which has been sent in from the binarization processing unit 60, into one interlace buffer (referred to as the first interlace buffer 693A) of the interlace buffers that have been divided into two. Then, the binary data taken into the first interlace buffer 693A is sent, via the CPU interface unit 66, into a layout buffer 573 in the SDRAM 56 that is directly readable from the CPU 54.

The layout buffer 573 is a buffer allocated to the SDRAM 56, and is logically divided into two areas. The binary data that has been sent from the first interlace buffer 693A is taken into one layout buffer (the first layout buffer) 573A of the two areas. The other layout buffer (the second layout buffer (also called the intermediate buffer)) 573B stores layout image data, which serve as layout data, generated based on the binary data in the first layout buffer 573A, as described later.

FIG. 24 is a conceptual diagram of the binary data sent into the first layout buffer 573A. The binary data are stored in a continuous memory area, but when they are wrapped around according to the width of the image area (described above), they become the image information as shown in the figure. (In this description, a single piece of image information is obtained because it is assumed that one raster line is formed by one scan movement of the writing carriage 36, in order to simplify the description.)

The CPU 54 generates layout image data in which the image of the second recording data is laid out, based on the binary data taken into the first layout buffer 573A. However, only an area capable of storing only several lines of line data for the lateral width of paper is allocated to the second layout buffer 573B for storing the generated layout image data. Therefore, the CPU 54 generates linear layout image data and sends the generated layout image data into the second layout buffer 573B. The layout image data for several lines having been sent into the second layout buffer 573B are then successively sent into the second interlace buffer 693B in the control-ASIC-SRAM 69.

FIG. 25A through FIG. 25E are conceptual diagrams of the layout image data sent into the second layout buffer 573B. The layout image data are stored in a continuous memory area, but when they are wrapped around according to the width of the image and rearranged, they become the layout image (a portion of the print image) for several lines in the vertical direction as shown in the figure.

The layout image data are generated as follows. First, the CPU 54 generates null data for the margin to generate image data corresponding to the margin from the upper end of the paper up to the image (FIG. 25A). After the null data amounting to the width t of the margin have been generated, the CPU 54 generates a layout image in which n pieces of the binary data taken into the first layout buffer 573A are arranged in the lateral direction (the width direction of the paper) (FIG. 25B). When the binary data are being arranged, the CPU 54 inserts null data amounting to the width t from the side end of the paper up to the image. In this way, margins in the lateral direction with width t are generated in the layout image. When the binary data are repeatedly arranged in line, the CPU 54 uses the same binary data (the binary data taken into the first layout buffer 573A). Therefore, the same image is repeatedly aligned in the lateral direction (the width direction of the paper) in the layout image. This operation of generating the layout image in which the images are repeatedly aligned in the lateral direction is performed for the area in the vertical direction of the image (FIG. 25B through FIG. 25D). After finishing generating the layout image for the area in the vertical direction of the image, the CPU 54 again generates null data for the margin to generate image data for the margin between the images (FIG. 25E). In this way, a margin in the vertical direction with width t is generated in the layout image. The same operations are repeated until m pieces of images are arranged in the vertical direction of the paper (FIG. 25B through FIG. 25E). It should be noted that the layout image data that are generated as above whenever necessary are successively sent into the second interlace buffer 693B in the control-ASIC-SRAM 69. It should be noted that the layout image data that are sent into the second interlace buffer 693B are the above-mentioned binary data for each color in CMYK.

As regards the layout image generated as above, n pieces of images are arranged in the lateral direction, and no more images than n are arranged. This is because, if it were to arrange n+1 pieces of images in the lateral direction, then an uncompleted image will be printed on the paper because there is not enough length in the lateral direction of the paper. Due to the same reason, as regards the layout image generated as above, m pieces of images are arranged in the vertical direction, and no more images than mare arranged. This is because, if it were to arrange m+1 pieces of images in the vertical direction, then an uncompleted image will be printed on the paper because there is not enough length in the vertical direction of the paper. Accordingly, with the present embodiment, images broken in the middle of printing are not printed on the paper, and therefore, a more than necessary amount of ink does not have to be used. Further, according to the present embodiment, it is possible to arrange a maximum number of images in the print area.

The processes that are performed after the binary data (the layout image data) have been sent from the second layout buffer 573B into the second interlace buffer 693B are almost the same as the processes for when the apparatus functions as a copier as described above. That is, the following processes are performed. (However, to simplify the description, description on the process of alternately performing writing and reading is omitted.)

The interlace processing unit 62 reads out the data stored in the second interlace buffer 693B in units of predetermined size, and burst transmits the data to the SRAM 621 in the interlace processing unit 62. At this time, the binary data is read out from the interlace buffer 693 in correspondence with the nozzle arrangement of the print head 38 according to the resolution of the image to be printed and the nozzle pitch. For example, when the resolution of the image to be printed is 720 dpi and the nozzle pitch is 1/180 inch, three raster lines will be printed between two raster lines that have been printed with adjacent nozzles. Therefore, data for every four raster lines are read out from the binary data as data corresponding to a scan movement of the writing carriage 36.

The transferred data are rearranged on the SRAM 621 so that they correspond to the nozzle arrangement, and are sent to the image buffer unit 64.

The image buffer unit 64 burst transmits, to the image buffers 694, 695, the image data that have been blocked into small pieces according to the capacity of the SRAM 621, and stores the data in proper orientation so that they become the head-drive data, as the recording data in the CMYK system, for making each of the nozzles eject ink per every scan movement of the writing carriage 36.

Under control of the CPU 54, the head-drive data for each scan movement stored in the image buffers 694, 695 are read into the CPU 54 via the CPUIF unit 66 and transferred to the head control unit 68 by the CPU 54. The head control unit 68 actuates the print head 38 according to the head-drive data, and the image is printed.

In this way, according to the present embodiment, it is possible to print a print image in which a plurality of images "A" are repeatedly arranged on the paper 7, as shown in FIG. 20.

(3) Next, the data flow for when printing is performed for a second sheet of paper and thereafter is described.

When monochrome repeat printing is performed, the monochrome image information is small compared to color image information, and therefore, it is possible to store the layout image data for one sheet of paper in the second interlace buffer 693B of the control-ASIC-SDRAM 69. That is, when printing is performed for the second sheet and thereafter, it is possible to perform printing using the layout image data stored in the second interlace buffer 693B of the control-ASIC-SDRAM 69. Therefore, when monochrome repeat printing is performed, the layout image data are sent out to the image buffer 64 so that they correspond to the nozzle arrangement, the head-drive data arranged in proper order in the image buffer are transferred to the head control unit 68 via the CPU 54, and the image is printed.

When color repeat printing is performed, the image data amount is large, so it is not possible to store the layout image data for one sheet of paper in the second interlace buffer 693B of the control-ASIC-SDRAM 69. On the other hand, an area that can store the data for one image (for example, image "A") is available in the first layout buffer 573A of the SDRAM 56 that is directly readable from the CPU 54. Therefore, when color repeat printing is performed, the layout image data are generated in the second layout buffer 573B using the data stored in the first layout buffer 573A, those layout image data are sent out to the second interlace buffer 693B, the layout image data are then sent out to the image buffer 64 so that they correspond to the nozzle arrangement, the head-drive data arranged in proper order in the image buffer are transferred to the head control unit 68 via the CPU 54, and the image is printed.

In the present embodiment, by performing printing for the second sheet and thereafter according to the processes described above, it is possible to reduce the operation of reading the image in the original by the scanner section 10, and therefore, it is possible to increase printing speed.

However, it is necessary that enough area capable of storing the data for one image is available in the SDRAM 56, which is directly readable from the CPU 54. On the other hand, because repeat printing is performed (because printing of two or more images on a piece of paper is performed), the size of the image area for one image is equal to or less than half of the print area of the paper. Therefore, it is necessary for the SDRAM 56, which is directly readable from the CPU 54, to have an area capable of storing binary data for an image that is in a predetermined resolution and whose size is half the print area.

Second Embodiment in Repeat Printing

<Internal Structure of the Control Circuit 50 in the Second Embodiment>

Figure 26:
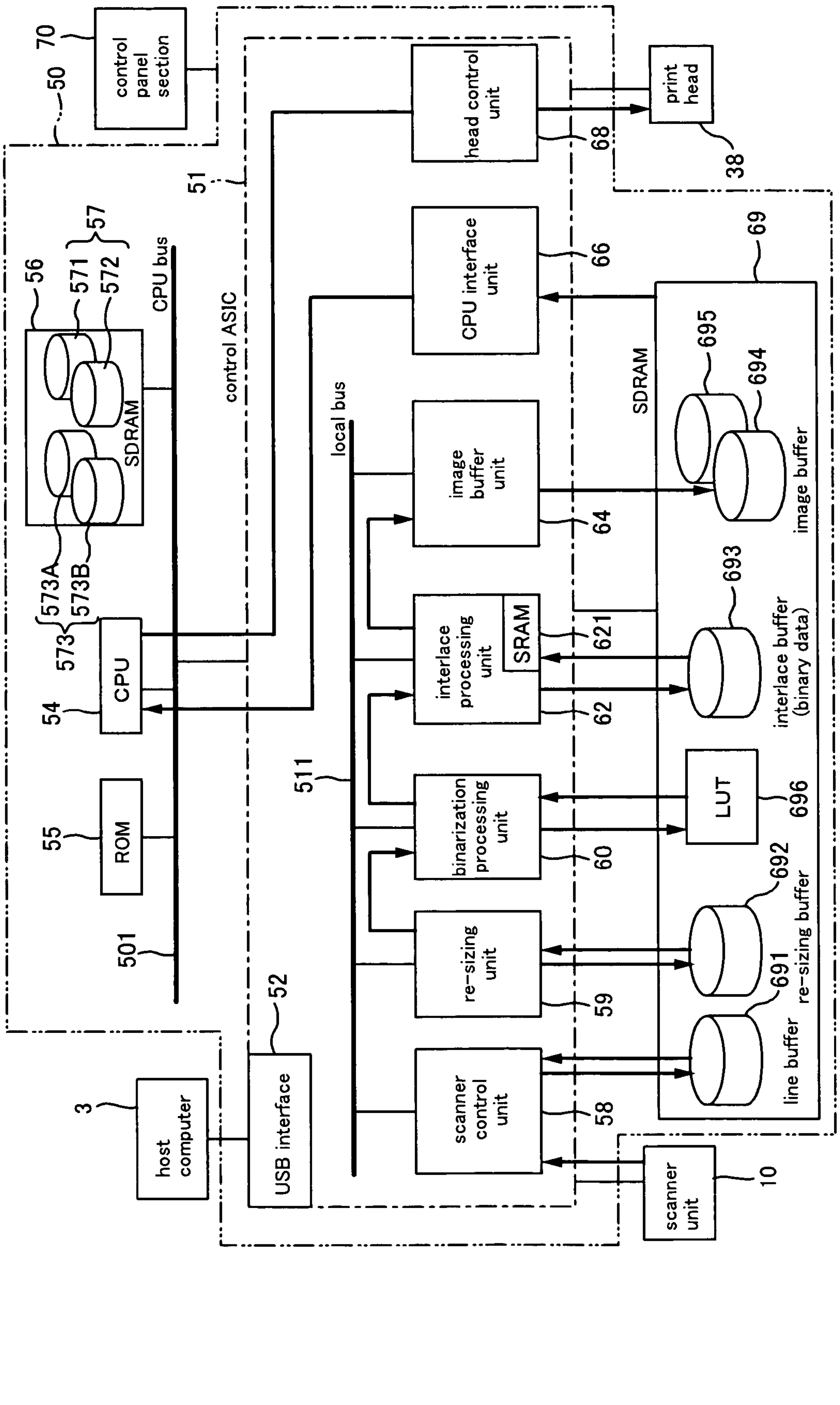
FIG. 26 is a block diagram showing an example of a control circuit 50 of the second embodiment.

FIG. 26 is a block diagram showing an example of a control circuit 50 of the second embodiment.

In the control circuit 50 of the SPC multifunction apparatus 1 of the second embodiment, the CPU 54 that manages the control over the entire SPC multifunction apparatus 1, a ROM 55 that stores a program for executing the control, the control ASIC 51 that manages the control over the scanner function, the printer function, and the local copier function, an SDRAM 56 in which data is directly readable and writable from the CPU 54, and the control panel section 70 serving as the input means are connected via the CPU bus 501. The scanner unit 10, the print head 38, the ASIC-SDRAM 69 in which data are directly readable and writable from the control ASIC 51, and so forth, are connected to the control ASIC 51.

The control ASIC 51 includes the scanner control unit 58, a re-sizing unit 59, the binarization processing unit 60, the interlace processing unit 62, the image buffer unit 64, the CPU interface unit (referred to as a CPUIF unit below) 66, the head control unit 68, the USB interface (referred to as a USBIF below) 52 serving as input/output means for the external host computer 3, and drivers for each of the motors, lamps, and so forth, that the scanner section 10 and the printer section 30 comprise. Further, the line buffer 691, a re-sizing buffer 692, the interlace buffer 693, and the image buffers 694, 695 are allocated to the control-ASIC-SDRAM 69. In order to achieve increased data transfer rate, so-called burst transmission, in which the data transfer unit is 64 bit, is adopted between the control ASIC 51 and the ASIC-SDRAM 69. Each of the units in the control ASIC 51 are connected via a local bus that is separate from the CPU bus 501.

That is, the second embodiment is different compared to the first embodiment described above in terms that the control ASIC 51 includes the re-sizing unit 59 and that the re-sizing buffer 692 is allocated to the ASIC-SDRAM 69.

The functions of each unit in the control ASIC are almost the same as those in the above-described embodiment, so only the different points are described below.

As with the embodiment described above, the scanner control unit 58 controls the exposure lamp 22, the CCD sensor 28, the pulse motor 183 serving as a reading carriage drive motor, and so forth, of the scanner section 10. The scanner control unit 58 has the function of sending out the image data read in via the CCD sensor 28.

Further, the scanner control unit 58 of the present embodiment can send out image data with predetermined resolution by performing interpolation between pixels after reading an image from an original. For example, it is possible to send out image data with a resolution at the resolution of the printer section (for example, 1440 dpi×720 dpi) during normal copying and send out image data with a resolution of 200 dpi×200 dpi during repeat printing (described later). The image data at the time they are sent out from the scanner control unit 58 are multi-gradation RGB data (multi-level RGB data).

The re-sizing unit 59 has the functions of receiving the image data of a predetermined size, changing the size of the image data, and sending out the image data whose size has been changed. Here, the size of image data means the number of pixels in the vertical and lateral directions of that image. If the number of pixels in the vertical and lateral directions is large, then the image is large, and conversely, if the number of pixels in the vertical and lateral directions is small, then the image is small. However, the actually printed image differs in size according to the print resolution, even if the number of pixels is large. For example, if the number of pixels in a piece of image data is the same, an image obtained by image data of 200 dpi×200 dpi will be larger than an image obtained by image data of 1440 dpi×720 dpi. That is, changing the size of the image data also means to change the resolution.

<Data Flow in the Control Circuit 50 in the Second Embodiment>

In the present embodiment, the data flow for when the apparatus functions as a scanner and the data flow for when the apparatus functions as a printer are the same as those in the above-described embodiment, and so description thereof is omitted.

<About when the Apparatus Functions as a Copier>

Next, the data flow for when the apparatus functions as a copier is described. Here, only the data flow for the normal copying operation is described, and print modes that require layout processing, such as the repeat printing mode, will be described later.

The second recording data in the RGB system having been read in by the scanner unit 10 are taken into the line buffer 691 via the scanner control unit 58. The second recording data in the RGB system taken into the line buffer 691 are successively subjected to the above-mentioned RGB interline correction processing, and the second recording data in RGB corresponding to the same line are sent from the scanner control unit 58 to the binarization processing unit 60. Further, when the scanner control unit 58 sends the second recording data in the RGB system to the binarization processing unit 60, it makes the resolution of the image data match the resolution of the printer section. For example, if printing is to be performed at 1440 dpi, then the scanner control unit 58 sends the image data (RGB data) with a resolution of 1440 dpi out to the binarization processing unit 60. Therefore, during normal copying, the re-sizing unit 59 does not operate.

After the second recording data in the RGB system sent into the binarization processing unit 60 are subjected to halftone processing, the data are converted into binary data for each color in CMYK with reference to a lookup table (LUT) 696 stored in the control-ASIC-SDRAM 69, and then the data are sent into the interlace processing unit 62.

As for the CMYK binary data sent into the interlace processing unit 62, the whole data for each raster line are divided into pieces of data to be printed per every scan movement of the writing carriage 36 according to the designated interlace mode. For example, when one raster line is formed with two scan movements of the writing carriage 36, the whole data for each raster line are divided into data for forming the odd-numbered dots, counted from the end of the raster line, and data for forming the even-numbered dots to generate the OL-compliant data. The OL-compliant data are burst transmitted to the interlace buffer 693 in units of 64 bits and stored there.

Further, the interlace processing unit 62 reads out the data stored in the interlace buffer 693 in units of predetermined size, and burst transmits the data to the SRAM 621 in the interlace processing unit 62. At this time, the OL-compliant data are read out from the interlace buffer 693 in correspondence with the nozzle arrangement of the print head 38 according to the resolution of the image to be printed and the nozzle pitch. For example, when the resolution of the image to be printed is 720 dpi and the nozzle pitch is 1/180 inch, three raster lines will exist between two raster lines that have been printed with adjacent nozzles. Therefore, data for every four raster lines are read out from the OL-compliant data as data corresponding to a scan movement of the writing carriage 36.

The transferred data are rearranged on the SRAM 621 so that they correspond to the nozzle arrangement, and are sent to the image buffer unit 64.

The image buffer unit 64 burst transmits, to the image buffer 694, the image data that have been blocked into small pieces according to the capacity of the SRAM 621, and stores the data in proper orientation so that they become the head-drive data for making each of the nozzles eject ink per every scan movement of the writing carriage 36. Memory areas for storing head-drive data that serve as recording data in the CMYK system and that are for two scan movements of the writing carriage 36 are allocated to the image buffers 694, 695. Every time head-drive data for one scan movement are stored, the CPU 54 sends them out to the head control unit 68, and head-drive data corresponding to the next scan movement start to be written into the memory area provided for another scan movement. This process is the same as the process of the image buffers described above in the description of the printer function.

Under control of the CPU 54, the head-drive data for each scan movement stored in the image buffers 694, 695 are read into the CPU 54 via the CPUIF unit 66 and transferred to the head control unit 68 by the CPU 54. The head control unit 68 drives the print head 38 according to the head-drive data to print an image.

In cases of normal copying operation, during a period from when the RGB image data are read in by the scanner control unit 58 until when the CMYK head-drive data are written into the image buffers 694, 695, layout processing that requires calculation by the CPU 54 is not performed. That is, the CPU 54 is not necessary for the process of converting the RGB image data into the CMYK head-drive data, but instead, the process is performed mainly with the control ASIC. Therefore, during these processes, it is not necessary to exchange data between the SDRAM 69 for the ASIC and the SDRAM 56 for the CPU. That is, since only the local bus 511 is used to send data between the control ASIC 51 and the ASIC-SDRAM 69, the CPU bus 501 is hardly used. Therefore, processing is accelerated, and it is possible to increase copying speed.

<Print Mode in which Layout Processing is Performed in the Second Embodiment>

As print modes that require layout processing, the SPC multifunction apparatus 1 can perform “repeat printing”, “4-piece repeat copying”, and “2-up printing”. “Repeat printing” is a print mode in which a plurality of the same image is printed on print paper, as in the above-described embodiment. In “4-piece repeat copying”, four pieces of an original image that has been reduced or enlarged in size are printed evenly on print paper. In “repeat printing”, the number of images printed on a piece of print paper is determined based on the size of the image and the size of print paper, whereas in “4-piece repeat copying”, the number of images printed on a piece of print paper is set to four pieces. “2-up printing” is a print mode in which images taken in from two originals are printed on one sheet of print paper. In “2-up printing”, the images that have been read from the originals are reduced in size, turned, and then printed. It should be noted that the process of arranging the plurality of images, the process of reducing the images in size, and the process of turning the images are included in the layout processing that requires calculation by the CPU.

These print modes are executed by pressing the copy mode button 771 on the control panel section 70, making one of the setting items that have been displayed on the liquid crystal display 72 be displayed, and selecting, for example, “repeat printing” in the “copy layout mode” setting item that has been displayed.

Below, repeat printing is described as a description of a print mode that requires layout processing. However, descriptions that overlap the descriptions for the above-mentioned embodiment are omitted.

<About the Repeat Printing Processing Operation>

The procedure of the repeat printing processing operation in the present embodiment is the same as that for the foregoing embodiment, and so description thereof is omitted. It should be noted that in the present embodiment, the “paper type” is also selected when the user enters information about paper.

<About the Data Flow in the Control Circuit 50 during Repeat Printing>

(1) Since the data flow in the control circuit 50 from when pre-scanning is started up to when the number of images is displayed is the same as that for the foregoing embodiment, description thereof is omitted.

(2) Next, the data flow in the control circuit 50 from the start of scanning up to the end of repeat printing is described. It should be noted that in the description above, one raster line was formed by two scan movements of the writing carriage 36. However, in order to simplify the description, it is assumed that one raster line is formed by one scan movement of the writing carriage 36. (That is, description is made below in a state in which the dot data of the raster line are not divided into the odd-numbered data and the even-numbered data.)

Receiving an input signal of the color copy button 84 or the monochrome button 86 from the control panel section 70 after the number of sheets to print is set, the CPU 54 sends control signals to the scanner control unit 58. These control signals include information about the image area information (X2, Y2) as information about the reading area. Then, the scanner control unit 58 controls the scanner section 10 according to the control signals from the CPU 54 to start reading the image in the area designated by the image area information.

The scanner control unit 58 controls the scanner section 10 to take the RGB data, which is output from the CCD sensor at a predetermined cycle, into the line buffer 691. Then, the scanner control unit 58 subjects the RGB data, which has been temporarily taken into the line buffer 691, to the RGB interline correction processing (described above) to perform interpolation between the pixels. In this way, the scanner control unit 58 generates multi-gradation second recording data in the RGB system (image data) with a resolution of 200 dpi×200 dpi.

The multi-gradation second recording data in the RGB system are sent from the ASIC-SDRAM 69 to the first layout buffer 573A of the CPU-SDRAM 57 via the CPUIF unit 66. The RGB image data stored in the first layout buffer 573A are accessible from the CPU 54.

Based on the second recording data in the RGB system that have been taken into the first layout buffer 573A, the CPU 54 generates layout image data that serves as layout data and in which the image of the second recording data in the RGB system is laid out. However, only an area capable of storing only several lines of line data for the lateral width of paper is allocated to the second layout buffer 573B for storing the generated layout image data. Therefore, the CPU 54 generates layout image data in lines and sends the generated layout image data into the second layout buffer 573B. The layout image data for several lines having been sent into the second layout buffer 573B are then successively sent, via the CPUIF unit 66, into the re-sizing buffer 692 in the control-ASIC-SDRAM 69. This is the same as the description for FIG. 24 and FIG. 25 described above, although there is a difference in CMYK image data and RGB image data and a difference in resolution.

It should be noted that the layout image data sent into the re-sizing buffer 692 are RGB multi-gradation image data with a resolution of 200 dpi×200 dpi. Further, when the entire layout image data gather together, they become image data laid out so that the images “A” are repeatedly arranged. However, since the layout image data for several lines are successively processed by each of the units, the data will not be stored in the buffer in a state in which the entire layout image data are gathered together.

In order to make the layout image data that have been taken into the re-sizing buffer 692 and whose resolution is 200 dpi×200 dpi match the resolution of the printer section, the re-sizing unit 59 performs linear interpolation between pixels to change the resolution. Here, the resolution of the printer section is determined according to the settings for the “paper type” and the “copy quality”. For example, if the paper type is “glossy paper” and the copy quality is “fine”, then the printer section performs printing with a resolution of 1440 dpi×720 dpi. Further, if the paper type is “plain paper” and the copy quality is “fast”, then the printer section performs printing with a resolution of 360 dpi×360 dpi. In the present embodiment, the re-sizing unit 59 converts the layout image data of 200 dpi×200 dpi into RGB image data of 1440 dpi×720 dpi. The re-sized RGB image data are sent from the re-sizing unit 59 to the binarization processing unit 60.

The process after the RGB image data have been sent into the binarization processing unit 60 is almost the same as the process performed during the above-described normal copying function. That is, the binarization processing unit 60 converts the RGB multi-gradation image data (laid-out image data) into CMYK binary data and sends the data out to the interlace processing unit 62. The interlace processing unit 62 reads out the CMYK binary data in units of predetermined size, rearranges the data, and sends them out to the image buffer unit 64. According to these data, the image buffer unit 64 generates head-drive data that serve as first recording data for making each of the nozzles eject ink. Under control of the CPU 54, the head-drive data are read into the CPU 54 via the CPUIF unit 66 and transferred to the head control unit 68 by the CPU 54. The head control unit 68 actuates the print head 38 according to the head-drive data, and the image is printed.

In this way, according to the present embodiment, it is possible to print a print image in which a plurality of images “A” are repeatedly arranged on the paper 7, as shown in FIG. 20.

(3) Next, the data flow for when printing is performed for a second sheet of paper and thereafter is described.

Only an area capable of storing only several lines of line data for the lateral width of paper is allocated to each buffer in the ASIC-SDRAM and the second layout image buffer 573B of the CPU-SDRAM 57. On the other hand, data for several lines are successively sent to each buffer in the ASIC-SDRAM. Therefore, these buffers do not have the data necessary for printing on the second sheet after printing of the first sheet has finished.

On the other hand, the first layout image buffer 573A of the CPU-SDRAM still stores the RGB image data that have not yet been subjected to layout processing, such as those shown in FIG. 24. Therefore, when a second sheet of paper or thereafter is to be printed, printing is performed using the image data that have not been laid out yet but are stored in the first layout image buffer 573A of the CPU-SDRAM, without re-reading the image from the original with the scanner unit. The process after the CPU 54 performs layout processing is the same as that for when repeat printing is performed for the first sheet, as described above.

First, the CPU 54 successively generates layout image data for several lines in the second layout buffer 573B. The layout image data in the second layout buffer 573B are successively sent into the re-sizing buffer 692 of the control-ASIC-SDRAM 69. The re-sizing unit 59 converts the layout image data with a resolution of 200 dpi×200 dpi, which have been taken into the re-sizing buffer 692, into RGB image data with a resolution of 1440 dpi×720 dpi, and sends the data out to the binarization processing unit 60. The binarization processing unit 60 converts the RGB multi-gradation image data (laid-out image data) into CMYK binary data and sends the data out to the interlace processing unit 62. The interlace processing unit 62 reads out the CMYK binary data in units of predetermined size, rearranges the data, and sends them out to the image buffer unit 64. According to these data, the image buffer unit 64 generates head-drive data for making each of the nozzles eject ink. Under control of the CPU 54, the head-drive data are read into the CPU 54 via the CPUIF unit 66 and transferred to the head control unit 68 by the CPU 54. The head control unit 68 actuates the print head 38 according to the head-drive data, and the image is printed.

About the First Embodiment and the Second Embodiment in Repeat Printing

Figure 27A:
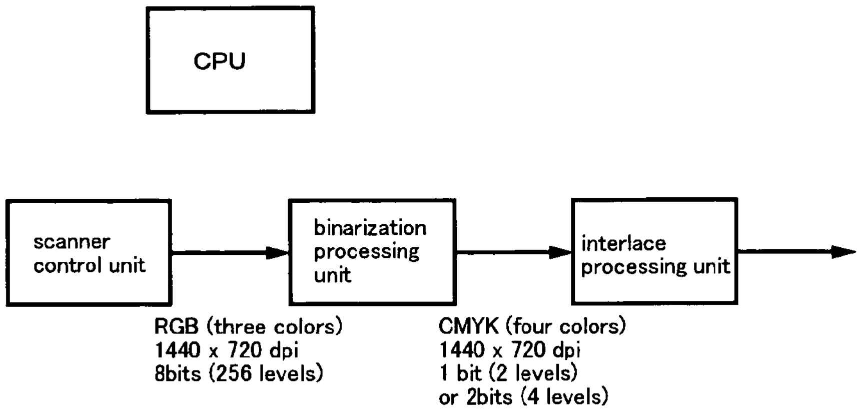
FIG. 27A is an explanatory diagram of a data flow during the normal copying function.
Figure 27B:
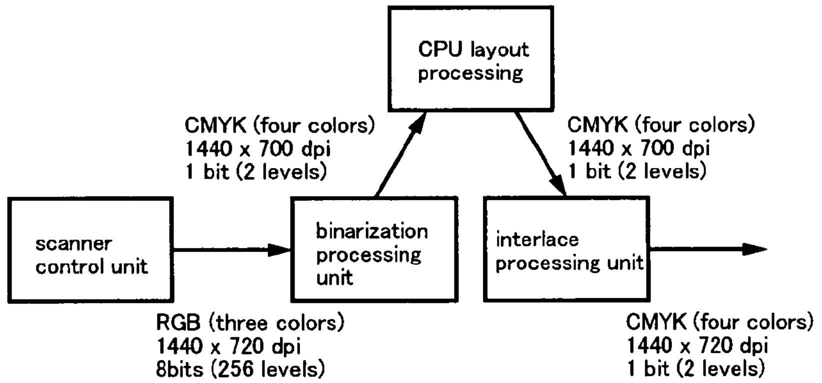
FIG. 27B is an explanatory diagram of a data flow for when the layout processing in the first embodiment is performed.
Figure 27C:
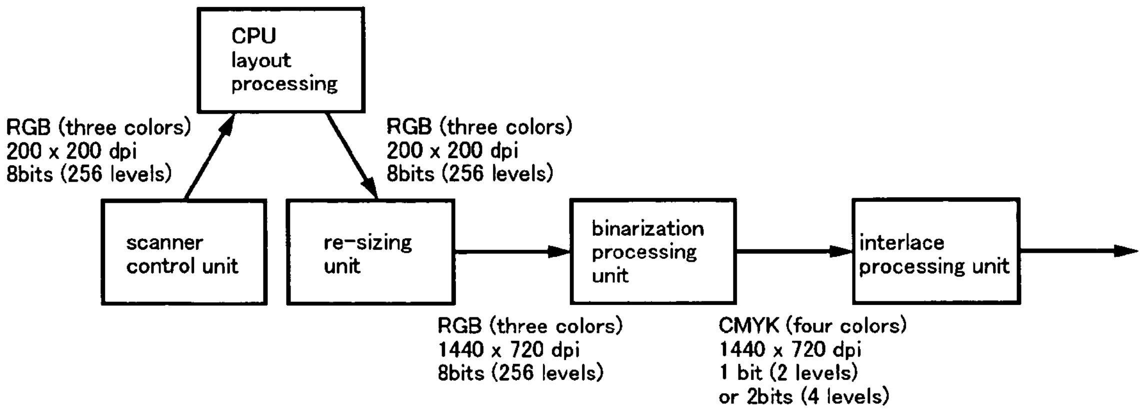
FIG. 27C is an explanatory diagram of a data flow for when the layout processing in the second embodiment is performed.

FIG. 27A is an explanatory diagram of a data flow during the normal copying function. FIG. 27B is an explanatory diagram of a data flow for when the layout processing in the first embodiment is performed. FIG. 27C is an explanatory diagram of a data flow for when the layout processing in the second embodiment is performed.

When the apparatus functions to perform normal copying, during a period from when the RGB image data are read in by the scanner control unit 58 until when the CMYK head-drive data are written into the image buffers 694, 695, it is not necessary to exchange data between the SDRAM 69 for the ASIC and the SDRAM 56 for the CPU. That is, since only the local bus 511 is used to send data between the control ASIC 51 and the ASIC-SDRAM 69, the CPU bus 501 is hardly used. If interrupt operations to/from the CPU 54 are reduced, processing will be accelerated and it will be possible to increase copying speed, because the control ASIC is manufactured as a dedicated unit for converting RGB image data into CMYK head-drive data.

On the other hand, in the first embodiment and the second embodiment, layout processing that requires computation by the CPU 54 is performed. Further, in the first embodiment and the second embodiment, the image data are sent out to the CPU-SDRAM 56 in order for the CPU 54 to lay out the image of the image data. In the first embodiment and the second embodiment, the timing for sending the image data to the CPU side differs. In the first embodiment, after the image data in the RGB system are converted into the image data in the CMYK system, the image data in the CMYK system are sent out to the CPU-SDRAM 56, and the CPU 54 performs the layout processing according to the image data in the CMYK system. On the other hand, in the second embodiment, the RGB image data are sent out to the CPU-SDRAM, and the CPU 54 performs the layout processing according to the RGB image data.

The amount of data to be processed is smaller for RGB image data because the number of colors is smaller (the number of planes is smaller) compared to CMYK image data. If the CPU 54 is to perform layout processing with respect to the CMYK image data of the binarization processing unit as in the first embodiment as shown in FIG. 27B, then since the number of colors is large, the amount of data to be processed will become large. On the other hand, in the second embodiment as shown in FIG. 27C, since the amount of data to be processed is small, the load for when the CPU 54 performs computation decreases, and also, the process speed increases.

Further, the amount of data to be processed is smaller for data with a resolution of 200×200 dpi because the number of pixels is smaller compared to data with a resolution of 1440×720 dpi. If the CPU 54 is to perform layout processing with respect to image data with a resolution of 1440×720 dpi of the binarization processing unit as in the first embodiment as shown in FIG. 27B, then since the resolution is high, the amount of data to be processed will become large. On the other hand, in the second embodiment as shown in FIG. 27C, since the amount of data to be processed is small, the load for when the CPU 54 performs computation decreases, and also, the process speed increases.

It should be noted that the amount of data to be processed becomes large for multi-gradation data compared to data in 2-level halftone (or 4-level halftone). However, in the second embodiment, the entire amount of data to be processed is smaller for the RGB image data than the CMYK image data ($3\times200\times200\times8<4\times1440\times720\times1$). Therefore, in the second embodiment, since the amount of data to be processed is smaller compared to the first embodiment, the load for when the CPU 54 performs computation decreases, and also, the process speed increases.

As apparent from the foregoing description, the SPC multifunction apparatus (recording apparatus) 1 of the first and second embodiments comprises a control ASIC (data generator) 51 for converting image data into head-drive data (first recording data), a CPU (controller) 54 for generating layout image data (layout data) in which the image of the image data is laid out, and a CPU bus (first transfer path) 501 for transmitting the image data between the CPU 54 and the control ASIC 51, and it performs printing on paper according to the head-drive data. Further, when repeat printing is performed (when a laid-out image is printed on paper), the CPU 54 generates layout image data (layout data) in which the image of the image data is laid out, and the control ASIC 51 converts the layout image data transferred from the CPU 54 via the CPU bus 501 into head-drive data. Further, when the apparatus functions to perform normal copying (when an image that has not been laid out is printed on paper), the CPU 54 does not generate the layout image data, and the control ASIC 51 converts image data that has not passed through the CPU bus into head-drive data.

In this way, when layout processing is not performed, since processing with the CPU 54 is not necessary, it is not necessary to transmit image data through the CPU bus 501, and therefore, it is possible to increase process speed.

Further, the SPC multifunction apparatus 1 of the first and second embodiments comprises a scanner section 10 for reading an image from an original, and the control ASIC (data generator) 51 generates image data based on the data received from the scanner section 10. That is, since the control ASIC 51, which is a dedicated unit, even generates image data, process speed is increased.

Further, according to the SPC multifunction apparatus 1 of the second embodiment, the resolution of the image data generated by the control ASIC (data generator) 51 based on the data received from the scanner section 10 differs according to whether the image is to be laid out or not. Particularly, when repeat printing is performed (when the image is laid out), the resolution of the image data generated by the control ASIC (data generator) 51 is at a lower resolution compared to when the apparatus functions to perform normal copying (when the image is not laid out). Specifically, when the apparatus functions to perform normal copying (when an image that has not been laid out is printed on paper), the control ASIC 51 generates image data with a relatively high resolution of 1440×720 dpi based on the data received from the scanner section 10. This resolution is adjusted to match the resolution of the printer section 30. On the other hand, when repeat printing is performed (when a laid-out image is printed on paper), the control ASIC 51 generates image data with a relatively low resolution of 200×200 dpi based on the data received from the scanner section 10. In this way, since the amount of data to be processed by the CPU 51 becomes small, the process speed is increased.

Further, the SPC multifunction apparatus 1 of the first and second embodiments comprises a movable head provided with a plurality of nozzles, and the control ASIC 51 has an interlace processing unit 62 and an image buffer unit (a unit for converting the image data into print data by rearranging the data so that they correspond to each of the nozzles) 64. In this way, since even the generation of the head-drive data is performed in the control ASIC 51, which is a dedicated unit, process speed is increased.

Further, in the SPC multifunction apparatus 1 of the first and second embodiments, the control ASIC (data generator) 51 has a binarization unit 60 for converting image data in the RGB system into image data in the CMYK system. In this way, since even color space conversion is performed in the control ASIC 51, which is a dedicated unit, process speed is increased.

Further, in the SPC multifunction apparatus 1 of the second embodiment, the CPU (controller) 54 generates, based on image data in the RGB system, layout image data (layout data) in the RGB system in which the image of the image data is laid out. In this way, the amount of data to be processed is smaller because the number of colors is smaller (the number of planes is smaller) compared to when the CPU 54 performs layout processing with respect to image data in the CMYK system, and therefore, process speed is increased.

Further, in the SPC multifunction apparatus 1 of the second embodiment, the resolution of the image of the layout image data (layout data) generated by the CPU (controller) 54 is at a lower resolution compared to the resolution of the image of the head-drive data (first recording data). Specifically, the resolution of the image of the layout image data is 200×200 dpi, and the resolution of the image of the head-drive data is 1440×720 dpi. When assuming that the CPU 54 generates the layout image data with a resolution of 1440×720 dpi, then the amount of data that the CPU 54 has to process increases, and the process speed will drop. On the other hand, according to the second embodiment, the amount of data that the CPU 54 has to process is small, and therefore, process speed is increased.

Further, in the SPC multifunction apparatus 1 of the second embodiment, the control ASIC 51 has a re-sizing unit 59 for changing the resolution of the layout image data generated by the CPU 54.

The resolution of the image data in the RGB system to be processed by the CPU 54 does not have to be matched with the resolution of the printer section 30 of the SPC multifunction apparatus 1. Therefore, it is possible to make the resolution of the image data to be processed by the CPU 54 low. However, it is ultimately necessary to make the resolution of the image data match the resolution of the printer section. Therefore, the resolution of the image data in the RGB system is made to match the resolution of the printer section 30 using this re-sizing unit 59.

<About 4-Piece Repeat Copying>

Figure 28:
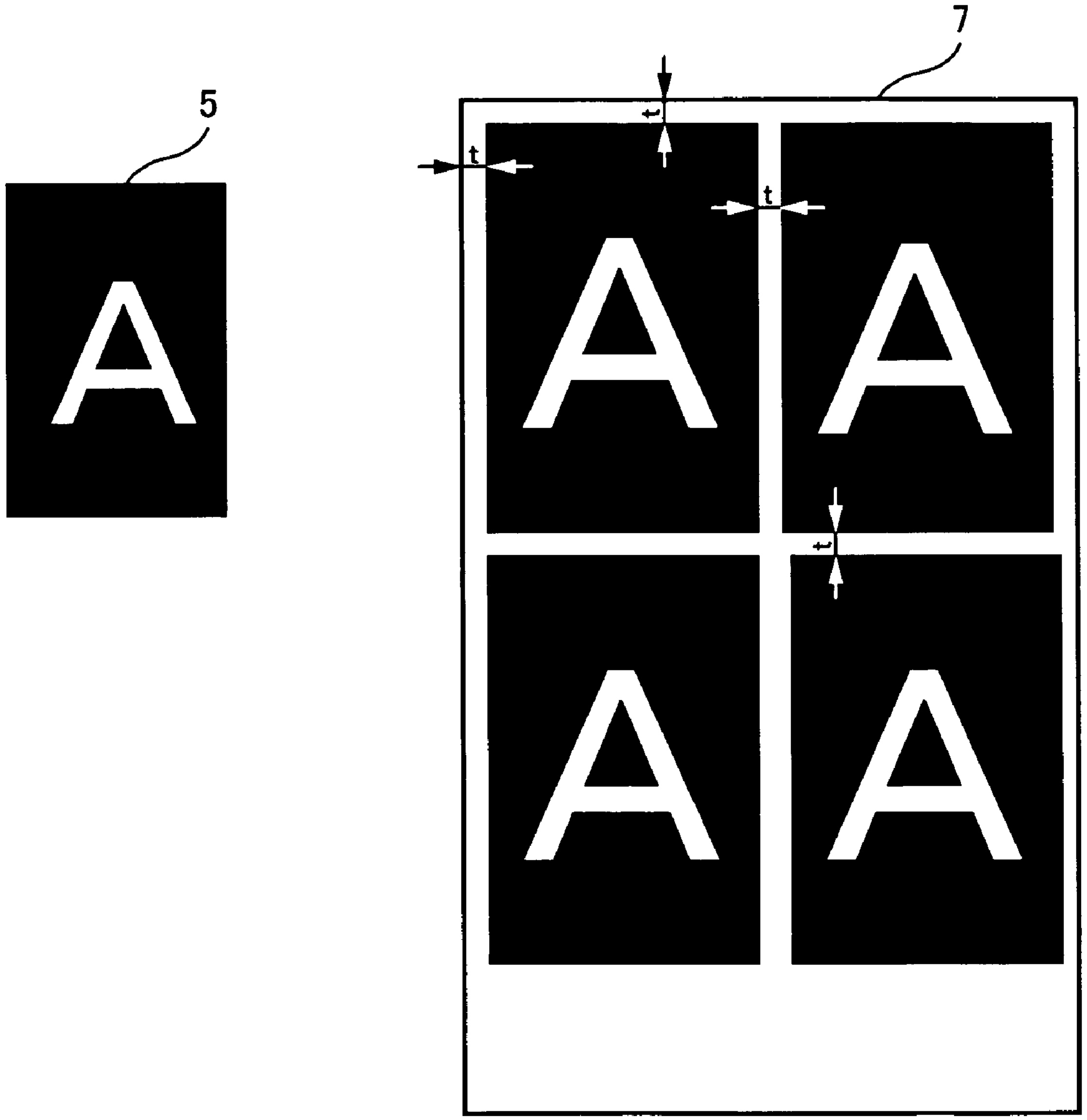
FIG. 28 is a diagram for illustrating 4-piece repeat copying.

FIG. 28 is a diagram for illustrating 4-piece repeat copying. In the figure, 5 indicates the original, and an image "A" is described on its surface. 7 is the paper that has been printed by the SPC multifunction apparatus 1. According to 4-piece repeat copying, four pieces of print images, which have been reduced or enlarged in size, are printed on the print paper.

<About the 4-Piece Repeat Copying Processing Operation>

Figure 29:
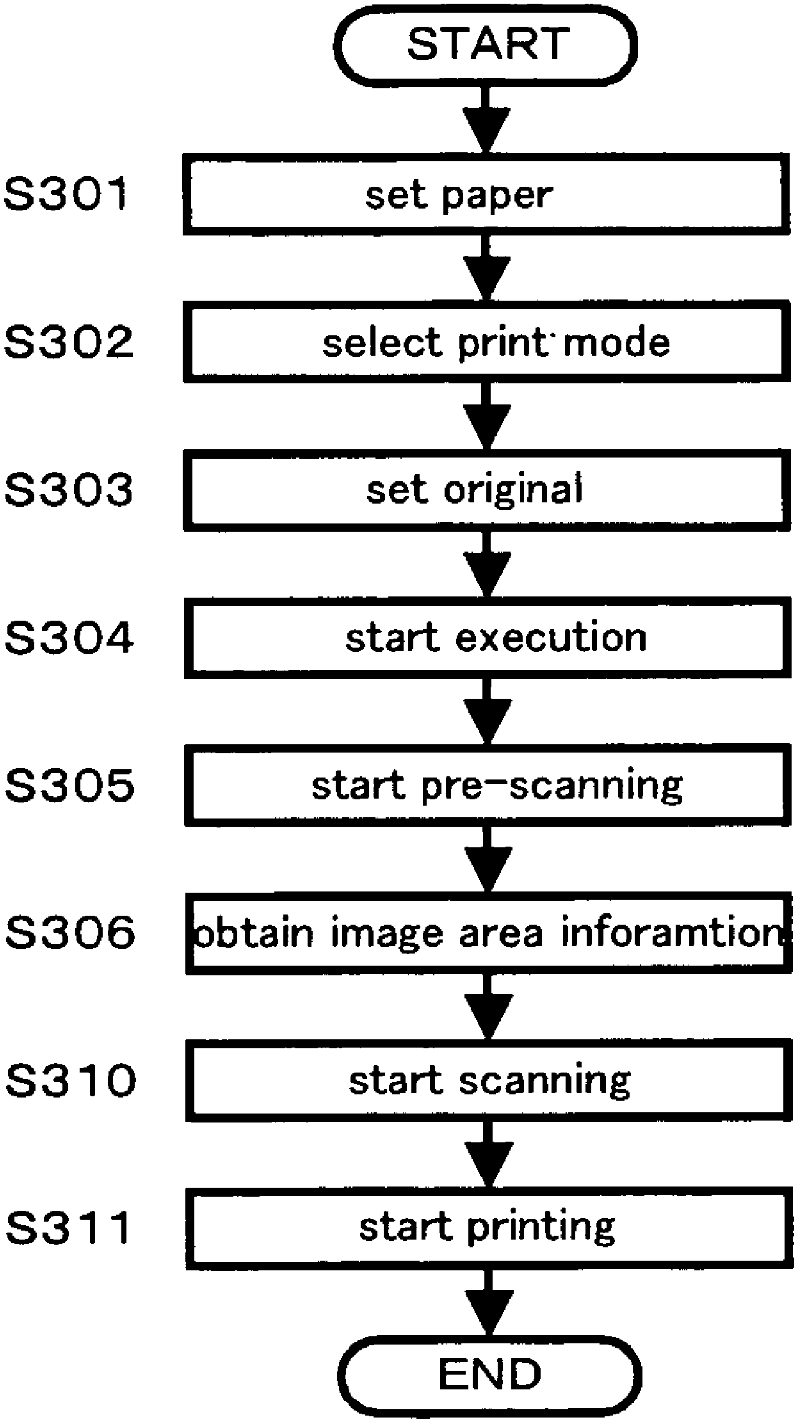
FIG. 29 is a flowchart for illustrating a procedure of a 4-piece repeat copying processing operation.

FIG. 29 is a flowchart for illustrating a procedure of a 4-piece repeat copying processing operation. Below, 4-piece repeat copying is described using FIG. 28 and FIG. 29. It should be noted that programs relating to the procedure of the 4-piece repeat copying processing operation are stored in the ROM 55 (FIG. 23).

The operations from when the paper 7 is set up to when the image area information is obtained (S301 through S306) are the same as for when the above-described repeat printing is performed, and therefore description thereof is omitted. However, when the user selects the print mode, he/she can set the number or sheets to print. This is because he/she can set the number of sheets necessary since he/she already knows that four pieces of images will be printed per sheet of paper. Further, since the number of images per sheet of paper is already known, the number of images will not be displayed after the image area information is obtained.

Therefore, after pre-scanning, the scanner section 10 of the SPC multifunction apparatus 1 automatically reads the image in the original (S310). Then, based on the image data of the original having been read, the printer section 30 of the SPC multifunction apparatus 1 arranges four pieces of images on a sheet of paper and prints them on paper (S311).

<About the Data Flow in the Control Circuit 50 during 4-Piece Repeat Copying>

The control circuit 50 for when 4-piece repeat copying is performed is the same as the above-described repeat printing (refer to FIG. 23).

When comparing the 4-piece repeat copying and automatic repeat copying, the layout processing by the CPU 54 and the re-sizing processing by the re-sizing unit 59 of the control ASIC 51 are different. Therefore, these processes will be described, and descriptions of other processes are omitted.

The CPU 54 generates layout image data based on the RGB image data taken into the first layout buffer 573A. However, only an area capable of storing only several lines of line data for the lateral width of paper is allocated to the second layout buffer 573B for storing the generated layout image data.

Therefore, the CPU 54 generates layout image data in lines and sends the generated layout image data into the second layout buffer 573B. The layout image data for several lines having been sent into the second layout buffer 573B are then successively sent into the re-sizing buffer 692 in the control-ASIC-SDRAM 69 via the CPUIF unit 66.

The layout image data are generated as follows. First, the CPU 54 generates null data for the margin to generate image data corresponding to the margin from the upper end of the paper up to the image. After the null data amounting to the width t of the margin have been generated, the CPU 54 generates a layout image in which two pieces of the RGB image data taken into the first layout buffer 573A are arranged in the lateral direction (the width direction of the paper). When the RGB image data are being arranged, the CPU 54 inserts null data amounting to the width t from the side end of the paper up to the image. In this way, margins in the lateral direction with width t are generated in the layout image. When the RGB image data are repeatedly arranged in line, the CPU 54 uses the same RGB image data (the RGB image data of the image "A" taken into the first layout buffer 573A). Therefore, the same image is repeatedly aligned in the lateral direction (the width direction of the paper) in the layout image. This operation of generating the layout image in which the images are repeatedly aligned in the lateral direction is performed for the area in the vertical direction of the image. After finishing generating the layout image for the area in the vertical direction of the image, the CPU 54 again generates null data for the margin to generate image data for the margin between the images. In this way, a margin in the vertical direction with width t is generated in the layout image. The same operations are repeated until two pieces of images are arranged in the vertical direction of the paper.

It should be noted that the layout image data sent into the re-sizing buffer 692 are RGB multi-gradation image data with a resolution of 200 dpi×200 dpi. Further, when the entire layout image data gather together, they become image data laid out so that two images "A" are arranged in both the vertical and lateral directions. However, since the layout image data for several lines are successively processed by each of the units, the data will not be stored in the buffer in a state in which the entire layout image data are gathered together.

In order to make the layout image data that have been taken into the re-sizing buffer 692 and whose resolution is 200 dpi×200 dpi match the resolution of the printer section, the re-sizing unit 59 performs linear interpolation between pixels to change the resolution. Further, the re-sizing unit 59 performs interpolation of the number of pixels so that the layout image data, which have been made to match the resolution of the printer section, matches the paper size. The re-sized RGB image data are sent from the re-sizing unit 59 to the binarization processing unit 60. It should be noted that, since the processes that follow are the same as those for the above-described repeat printing, description thereof is omitted.

<About 2-Up Copying>

Figure 30:
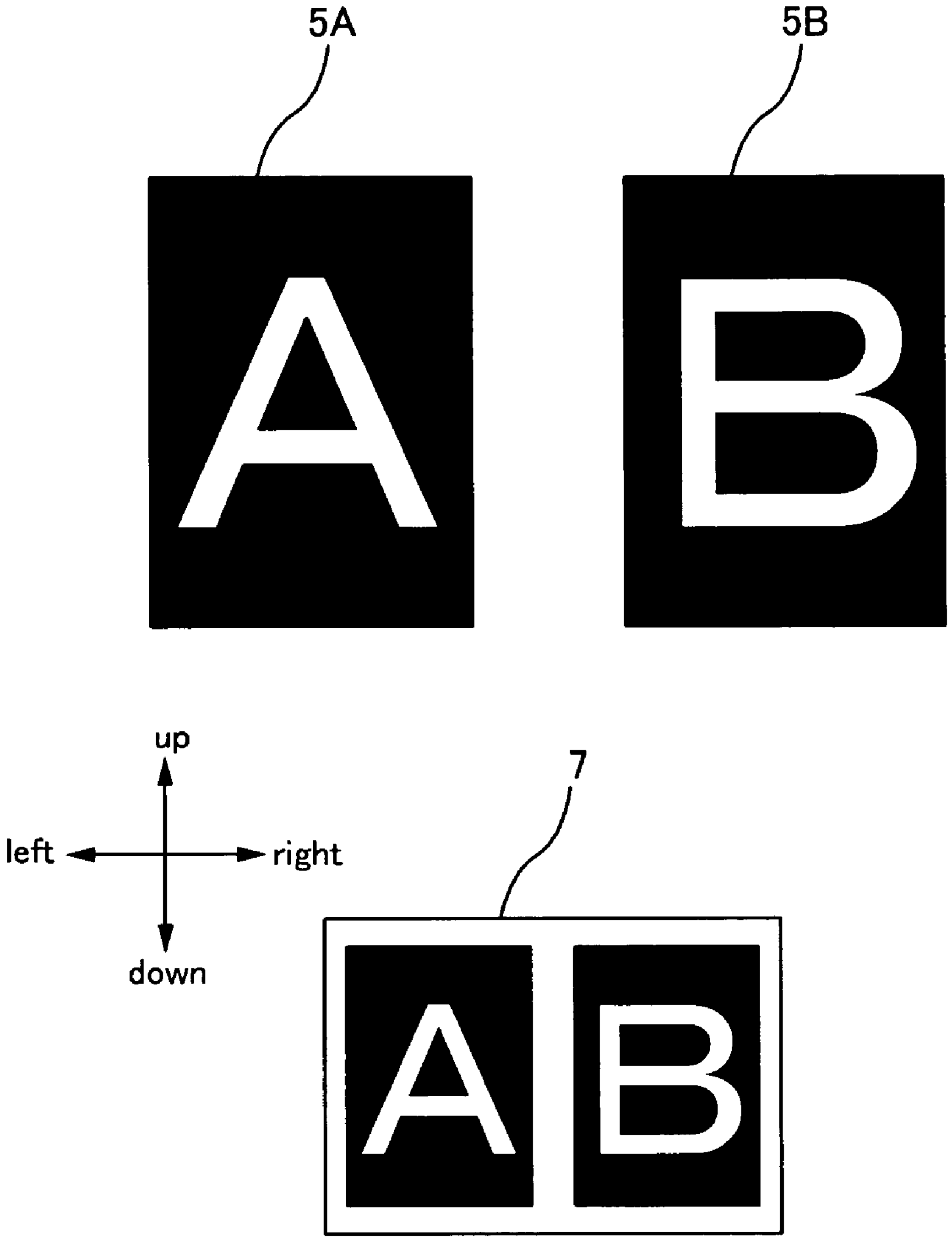
FIG. 30 is a diagram for illustrating 2-up copying.

FIG. 30 is a diagram for illustrating 2-up copying. In the figure, 5A is the first original and has an image "A" on its surface. Further, 5B is the second original and has an image "B" on its surface. 7 is the paper printed by the SPC multifunction apparatus 1. According to the print mode of the present embodiment, a print image in which the image "A" of the first original and the image "B" of the second original are reduced in size and aligned is printed on the paper 7. That is, in this print mode, two images (image "A" and image "B") are printed in each of their predetermined positions in one sheet of paper 7. Below, this print mode is called "2-up copying". It should be noted that in the present embodiment, as shown in FIG. 30, a margin is provided between the end of the paper and each image. Further, a margin is provided between the images.

<About the Processing Operation of 2-Up Copying>

Figure 31:
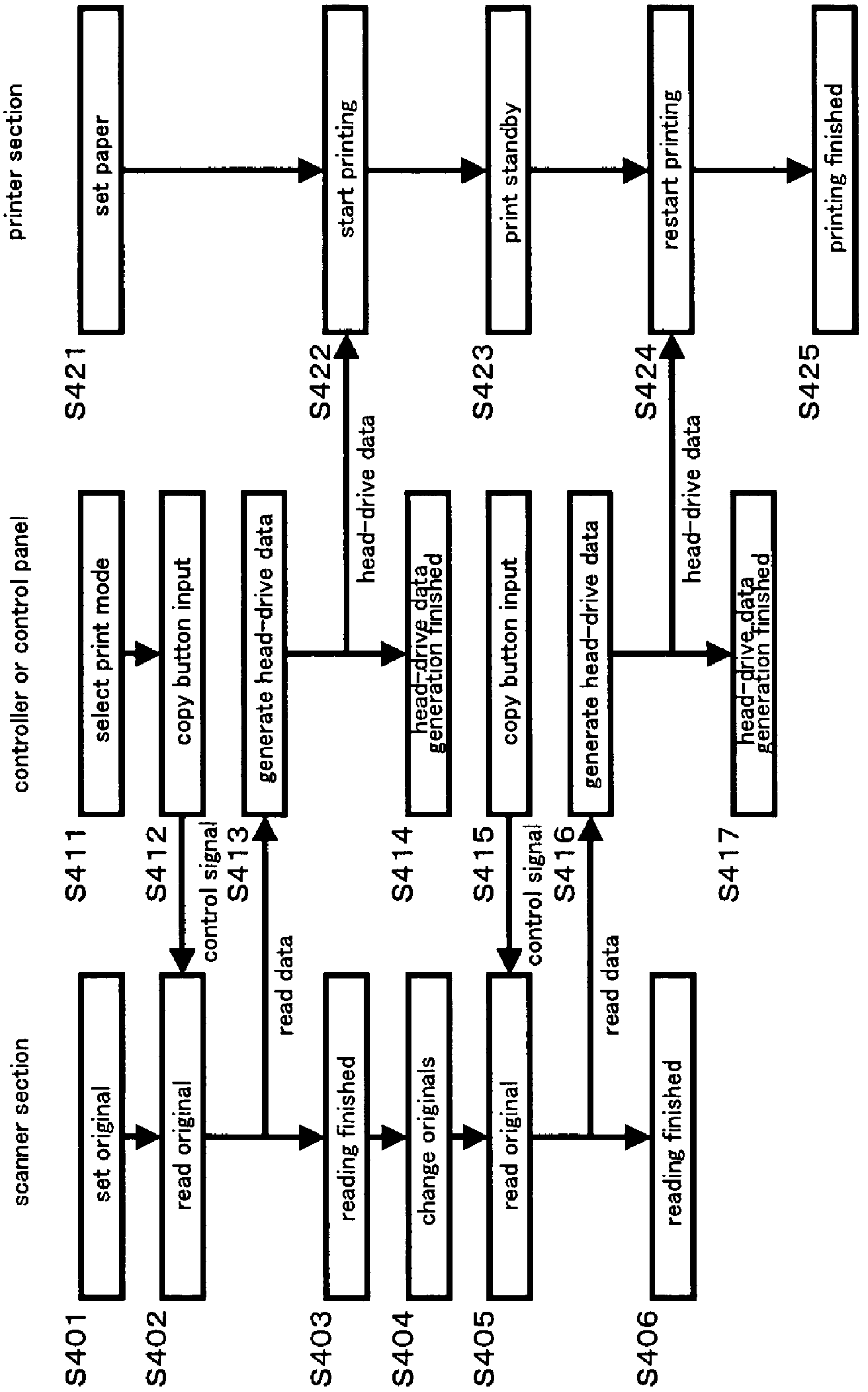
FIG. 31 is a flowchart for illustrating a procedure of a 2-up copying processing operation of the present embodiment.

FIG. 31 is a flowchart for illustrating the procedure of the processing operation of the 2-up copying of the present embodiment. The figure shows the operation flow for the scanner section 10, the control circuit 50 (or the control panel section 70), and the printer section 30 of the SPC multifunction apparatus 1.

Below, the 2-up copying mode is described using FIG. 30 and FIG. 31. It should be noted that programs relating to the procedure of the processing operation of the 2-up copying are stored in the ROM 55.

First, the user sets paper 7 in the paper supply tray of the SPC multifunction apparatus 1 (S421). In the following description, it is assumed that a plurality of single-sheet print paper in A4 size is set. It should be noted that the user may enter information about the paper 7 by operating the various buttons on the control panel section 70.

Next, the user operates the various buttons on the control panel section 70 to select "2-up copying" from a plurality of print modes (S411). That is, first, the user successively changes the setting items that have been displayed using the copy mode button 771 to go to the display screen "copy mode" which is the setting item to be set. Next, the user sets the setting value to "2-up copying" by pressing right and left of the cross button. In this way, the print mode of the SPC multifunction apparatus 1 is selected to be "2-up copying". Further, in the same way, the user operates the various buttons on the control panel section 70 to set the size of the width t of the margin. In this way, the SPC multifunction apparatus 1 obtains information about the margin (margin information). If, however, the width t of the margin is not set through the control panel section 70, a default value that is set in advance is used as the preset value for the margin width. In the present embodiment, the margin information indicates that the width is t (mm).

Figure 32A:
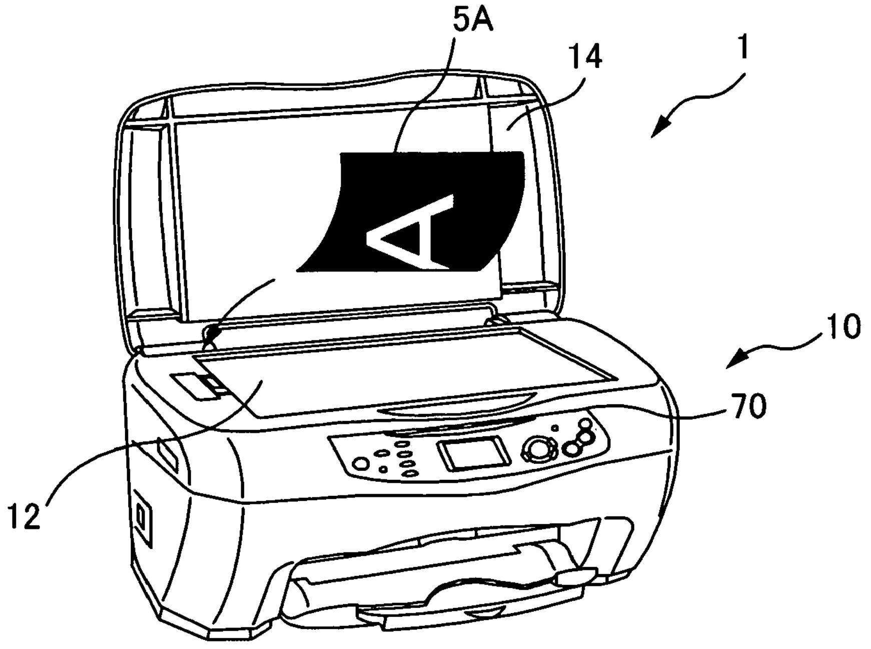
FIG. 32A is an explanatory diagram showing how a first original is set.

Next, the user sets the first original 5A, as the first sheet of original, on the scanner section 10 of the SPC multifunction apparatus 1 (S401). The way in which the first original 5A is set is described using FIG. 32A. First, the user opens the original bed cover 14 and places the first original 5A on the original bed glass 12. When the first original 5A is placed on the original bed glass 12, the user faces the side on which the image "A" is written downwards and places a corner of the first original 5A against the origin mark at a corner of the original bed glass 12. Then, the user closes the original bed cover 14 to make the original bed cover 14 press the first original 5A on the original bed glass 12 against the original bed glass 12. In this way, the first original 5A is set on the scanner section 10.

Next, the user instructs the operation of reading the first sheet of original 5A to start. Since the apparatus is already set to perform the 2-up copying (S411), the reading operation starts when the user presses the color copy button 84 or the monochrome button 86 of the control panel section 70 (S412).

Next, the scanner section 10 of the SPC multifunction apparatus starts operating to read the image "A" in the first original 5A (S402). While the scanner section 10 is reading the image "A" in the original 5A, second recording data (RGB data) is output from the CCD sensor according to a predetermined cycle. It should be noted that the linear sensors of the CCD sensor are aligned parallel to the lateral direction of the image "A", and the reading carriage 16 performs its scan movement parallel to the vertical direction of the image "A". (That is, the image "A" in the first original 5A of FIG. 30 is read by the scanner section 10 from the top toward the bottom.) Therefore, the read data that is output from the scanner section 10 is data formed by successively outputting line data that is in the lateral direction of the image "A".

Next, the control circuit 50 of the SPC multifunction apparatus 1 generates head-drive data based on the second recording data (read data) that is successively sent from the scanner section 10 (S413). The head-drive data generated at this time is data for printing the image "A" part of the print image "AB" in the paper 7 of FIG. 30. It should be noted that the process for generating the head-drive data based on the second recording data (read data) will be described later. The generated head-drive data are successively sent to the head control unit 68.

In the present embodiment, the print image "AB" is printed on the paper 7 by moving the writing carriage 36 parallel to the short-side direction of the paper 7 and carrying the paper 7 in the long-side direction of the paper 7. (That is, in the present embodiment, the print image "AB" on the paper 7 of FIG. 30 is printed from left to right.) Therefore, the head-drive data will be data formed by successively outputting line data that is in the vertical direction of the image "A". As a result, the printer section 30 is able to start printing the image "A" even before the head-drive data for the image "B" is generated. Therefore, in the present embodiment, printing is started for the image "A" that has already been read from the first original 5A before finishing reading the image "B" in the second original.

The printer section 30 starts printing according to the head-drive data that is successively sent to the head control unit 68 (S422). It should be noted that, when the process of generating the head-drive data for the image "A" is finished (S414), no head-drive data will be sent to the head control unit 68. Therefore, the printer section 30 stops its printing operation and enters a print-standby state (a state in which various operations, such as the operation of carrying the paper 7 and the printing operation of ejecting ink, are in standby) (S423).

Figure 32B:
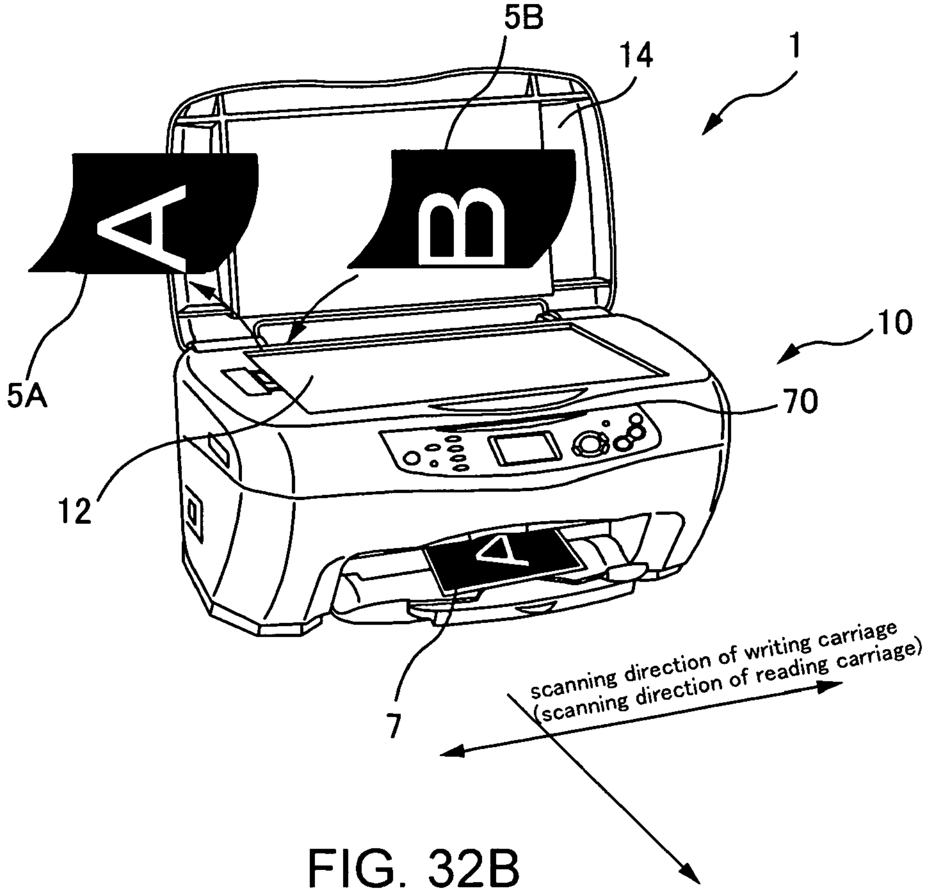
FIG. 32B is an explanatory diagram showing how a second original is set.

After the operation of reading the first original is finished, the displaying section of the SPC multifunction apparatus 1 displays a message prompting the user to change originals. Confirming this message, the user changes the first original 5A that is set on the scanner section 10 to the second original 5B. The way in which the originals are changed is described using FIG. 32B. First, the user opens the original bed cover 14 and takes out the first original 5A placed on the original bed glass 12. Then, the user sets the second original as a second sheet of original. It should be noted that, since the procedure of setting the second original is the same as the procedure of setting the first original described above, description thereof is omitted.

It should be noted that in the present embodiment, printing of the image "A" of the print image "AB" is started before reading of the image "B" in the second original is started. Therefore, in the present embodiment, a portion of the print image is already discharged from the paper discharge section 34 when the originals are being changed (refer to FIG. 32B).

After changing the originals, the user instructs the operation of reading the second sheet of original 5A to start. The operation of reading the second sheet of original is also started when the user presses the color copy button 84 or the monochrome button 86 on the control panel section 70 (S415).

Next, the scanner section 10 of the SPC multifunction apparatus starts operating to read the image "B" in the second original 5B (S405). While the scanner section 10 is reading the image "B" in the original 5B, read data (RGB data) are output from the CCD sensor according to a predetermined cycle.

Next, the control circuit 50 of the SPC multifunction apparatus 1 generates head-drive data based on the read data that is successively sent from the scanner section 10 (S416). The head-drive data generated at this time are data for printing the image "B" part in the paper 7 of FIG. 32. It should be noted that the process of generating the head-drive data according to the read data will be described later. The generated head-drive data are successively sent to the head control unit 68.

The printer section 30 restarts printing according to the head-drive data that is successively sent to the head control unit 68 (S424). That is, after the operation of reading the image "B" is started, the printer section 30 restarts the carry operation of intermittently carrying the paper 7, the printing operation of ejecting ink from the nozzles that move in the scanning direction, and so forth.

When printing is finished (S417, S425), the paper 7 is discharged from the paper discharge section 34. On the discharged paper 7, there will be printed a print image "AB", as shown in the paper 7 of FIG. 32B.

After the operation of reading the second original is finished, the displaying section of the SPC multifunction apparatus 1 displays a message prompting the user to take out the second original. Confirming this message, the user takes out the second original 5B that is set on the scanner section 10.

<About the Data Flow during 2-Up Copying>

The control circuit 50 for when 2-up copying is performed is the same as the above-described repeat printing (refer to FIG. 26).

(1) First, the data flow in the control circuit 50 from when the image "A" is read from the first sheet of original (first original 5A) (FIG. 31, S402) until printing is started (S422) is described. When comparing 2-up copying and repeat copying, the layout processing by the CPU 54 is different. Therefore, these processes will be described, and descriptions of other processes are omitted.

The CPU 54 generates layout image data based on the RGB image data taken into the first layout buffer 573A. However, only an area capable of storing only several lines of line data for the lateral width of paper is allocated to the second layout buffer 573B for storing the generated layout image data. Therefore, the CPU 54 generates layout image data in lines and sends the generated layout image data into the second layout buffer 573B. The layout image data for several lines having been sent into the second layout buffer 573B are then successively sent into the re-sizing buffer 692 in the control-ASIC-SRAM 69 via the CPUIF unit 66.

In 2-up copying, the read data that is output from the scanner section is data in which line data in the lateral direction of the image "A" have been successively output. Therefore, RGB image data in the lateral direction of the image "A" are successively sent into the first layout buffer 573A. On the other hand, it is necessary that the head-drive data be data in which line data in the vertical direction of the image "A" have been successively output. Therefore, in 2-up copying, the first layout buffer 573A once takes in the whole data of the image "A", and when the CPU 54 generates the layout image data in the second layout buffer 573B, it performs a process of turning the data of the image "A" and then successively generates the line data in the vertical direction (data that has been turned) of the image "A". As a result, the data successively sent from the second layout buffer 573B to the re-sizing buffer 692 become line data in the vertical direction of the image "A", and therefore, it becomes possible to successively generate, based on these data, the head-drive data in the vertical direction of the image "A".

FIG. 33A through FIG. 33G are conceptual diagrams of the layout image data sent into the second layout buffer 573B. The layout image data is stored in a continuous memory area, but when it is wrapped around according to the width of the image and rearranged, it becomes the layout image (a portion of the print image) for several lines in the vertical direction as shown in the figure. (In this description, only an image in one plane among the RGB data is explained, in order to simplify the description.)

Figure 33A:
FIG. 33A is a conceptual diagram of layout image data sent into the second layout buffer 573B first.
Figure 33B:
FIG. 33B is a conceptual diagram of layout image data sent into the second layout buffer 573B second.
Figure 33C:
FIG. 33C is a conceptual diagram of layout image data sent into the second layout buffer 573B third.
Figure 33D:
FIG. 33D is a conceptual diagram of layout image data sent into the second layout buffer 573B fourth.
Figure 33E:
FIG. 33E is a conceptual diagram of layout image data sent into the second layout buffer 573B fifth.
Figure 33F:
FIG. 33F is a conceptual diagram of layout image data sent into the second layout buffer 573B sixth.
Figure 33G:
FIG. 33G is a conceptual diagram of layout image data sent into the second layout buffer 573B seventh.

The layout image data is generated as follows. First, the CPU 54 generates null data for the margin to generate image data corresponding to the margin from the upper end of the paper up to the image (the margin on the left of the image "A") (FIG. 33A, FIG. 33B). After the null data amounting to the width of the margin has been generated, the CPU 54 generates a layout image in which line data (RGB image data) in the vertical direction of the image "A" taken into the first layout buffer 573A are successively arranged (FIG. 33B). When the line data in the vertical direction of the image "A" are being arranged, the CPU 54 inserts null data amounting to the width of the margin from the side end of the paper up to the image. In this way, margins in the lateral direction (margins on the top and bottom of the image "A") are generated in the layout image. The line data in the vertical direction of the image "A" are generated only for the area in the lateral direction of the image "A" (FIG. 33B through FIG. 33F). After finishing generating the layout image for the area of the image "A", the CPU 54 again generates null data for the margin to generate image data for the margin between the images (FIG. 33F, FIG. 33G). In this way, a margin in the vertical direction (the margin on the right of the image "A") is generated in the layout image. It should be noted that the layout image data that are generated as above whenever necessary are successively sent into the re-sizing buffer 692 in the control-ASIC-SRAM 69.

It should be noted that the layout image data sent into the re-sizing buffer 692 are RGB multi-gradation image data with a resolution of 200 dpi×200 dpi. Further, when the entire layout image data are gathered together, they become image data laid out such that the image "A" has been turned 90°. However, since the layout image data for several lines are successively processed by each of the units, the data will not be stored in the buffer in a state in which the entire layout image data are gathered together.

In order to make the layout image data that have been taken into the re-sizing buffer 692 and whose resolution is 200 dpi×200 dpi match the resolution of the printer section, the re-sizing unit 59 performs linear interpolation between pixels to change the resolution. Further, the re-sizing unit 59 performs interpolation of the number of pixels so that the layout image data, which have been made to match the resolution of the printer section, matches the paper size. The re-sized RGB image data are sent from the re-sizing unit 59 to the binarization processing unit 60. It should be noted that, since the processes that follow are the same as those for the above-described automatic repeat printing, description thereof is omitted.

In this way, in the present embodiment, it is possible to perform printing such that the images "A" are arranged in the paper 7 as shown in FIG. 30.

(2) Next, the data flow in the control circuit 50 from when printing has started (S422) up to the print-standby state (S423) is described.

Figure 34:
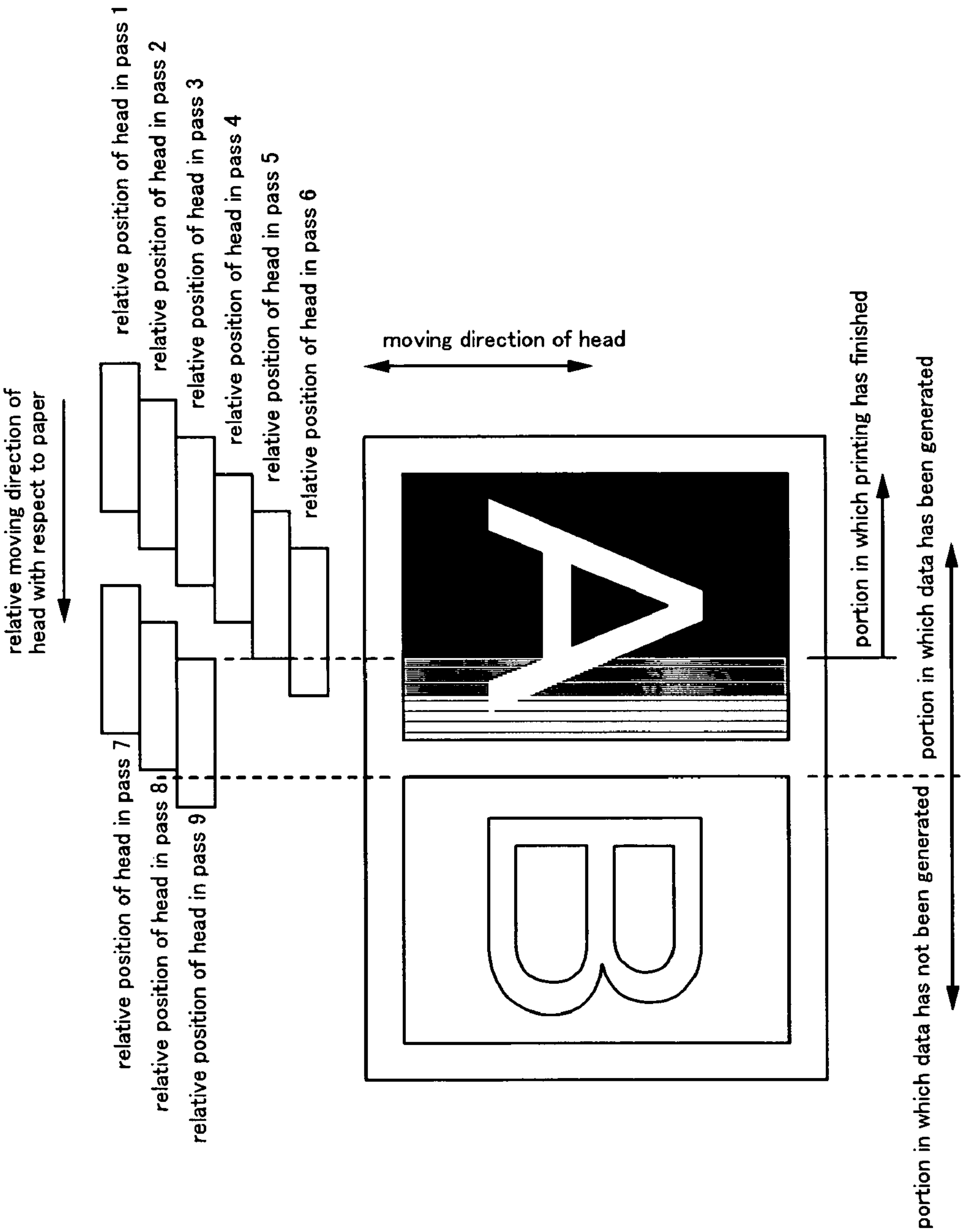
FIG. 34 is an explanatory diagram showing how printing is performed before the image "B" in a second sheet of original (a second original) is read.

FIG. 34 is an explanatory diagram showing how printing is performed before the image "B" in the second sheet of original (the second original) is read. As already explained, the head-drive data for the image "A" (and the margin portions surrounding it) are successively stored in the image buffer. When the head-drive data for the first scan movement is stored, the stored head-drive data is sent out to the head control unit 68 by the CPU 54. Then, when the head moves in the scanning direction, ink droplets are ejected from the nozzles in the head according to the head-drive data. Therefore, the head-drive data necessary for pass 1 (the first scan movement) through pass 8 in the figure can be sent out successively to the head control unit 68 after the image "A" in the first sheet of original (first original) has been read.

On the other hand, the head-drive data necessary for pass 9 (the ninth scan movement) require head-drive data for the image "B" in the second original. That is, if the image "B" in the second original has not been read, the head-drive data (data corresponding to a plurality of nozzles) necessary for pass 9 are not stored in the image buffers 694, 695 (that is, the head-drive data have not been assembled); therefore, it is not possible to actuate the head for pass 9. As a result, before the head-drive data for the image "B" of the second original are generated, the printer section cannot print the image that is located in pass 9.

Therefore, in the present embodiment, the scan movement of the writing carriage 36 is stopped and the apparatus is in a print-standby state at the point where printing has finished for pass 8 (the eighth scan movement). That is, printing for the part to be printed in pass 9 and thereafter is not finished. Therefore, in the present embodiment, the apparatus enters the standby state in the middle of printing a portion of the image "A" of the first original (the right-side portion of the image "A") that is to be printed on the paper.

It should be noted that in the present embodiment, if the cancel button 82 is pressed and there is an instruction to stop printing during the standby state, the SPC multifunction apparatus 1 completes printing the image "A" of the first original, discharges the paper 7, and then terminates printing. This is because the image "A" will be in a half-finished state if the paper 7 is discharged as it is when the apparatus is in the standby state.

(3) Finally, the data flow in the control circuit 50 from when the second sheet of original (the second original) is set until printing is completed is described.

The data flow is the same as that for the first original described above.

It should be noted that the head-drive data for the image "A" for pass 9 (refer to FIG. 34) (the head-drive data for the right-side portion of the image "A") is not accumulated (is not assembled) until the head-drive data for the image "B" is generated. Therefore, the data is not sent out to the head control unit. Thus, the head-drive data for the image "A" for pass 9 remains in the image buffer until the head-drive data for the image "B" is generated (that is, until the operation of reading the image "B" is started). After the operation of reading the image "B" is started, the head-drive data for the left-side portion of the image "B" is stored in the image buffer, in which the head-drive data for the image "A" still remains. When the head-drive data for the scan movement for pass 9 is accumulated in the image buffer, the accumulated drive data is sent out by the CPU 54 to the head control unit 68, and printing is restarted. (That is, after the head-drive data for the image "B" has been generated, the printer section 30 restarts the carry operation of intermittently carrying the paper 7, the printing operation of ejecting ink from the nozzles that move in the scanning direction, and so forth.) Therefore, the head-drive data in pass 9 is head-drive data generated based on the image "A" and the image "B". Therefore, the right-side portion of the image "A" and the left-side portion of the image "B" are both printed, at the same time, in pass 9.

In this way, in the present embodiment, it is possible to perform printing such that the print image "AB" is arranged in the paper 7 as shown in FIG. 30.

(4) Another example of print standby

According to the description above, the printing operation entered a standby state before printing of the image "A" is finished. The timing for the standby state, however, is not limited to this.

Figure 35:
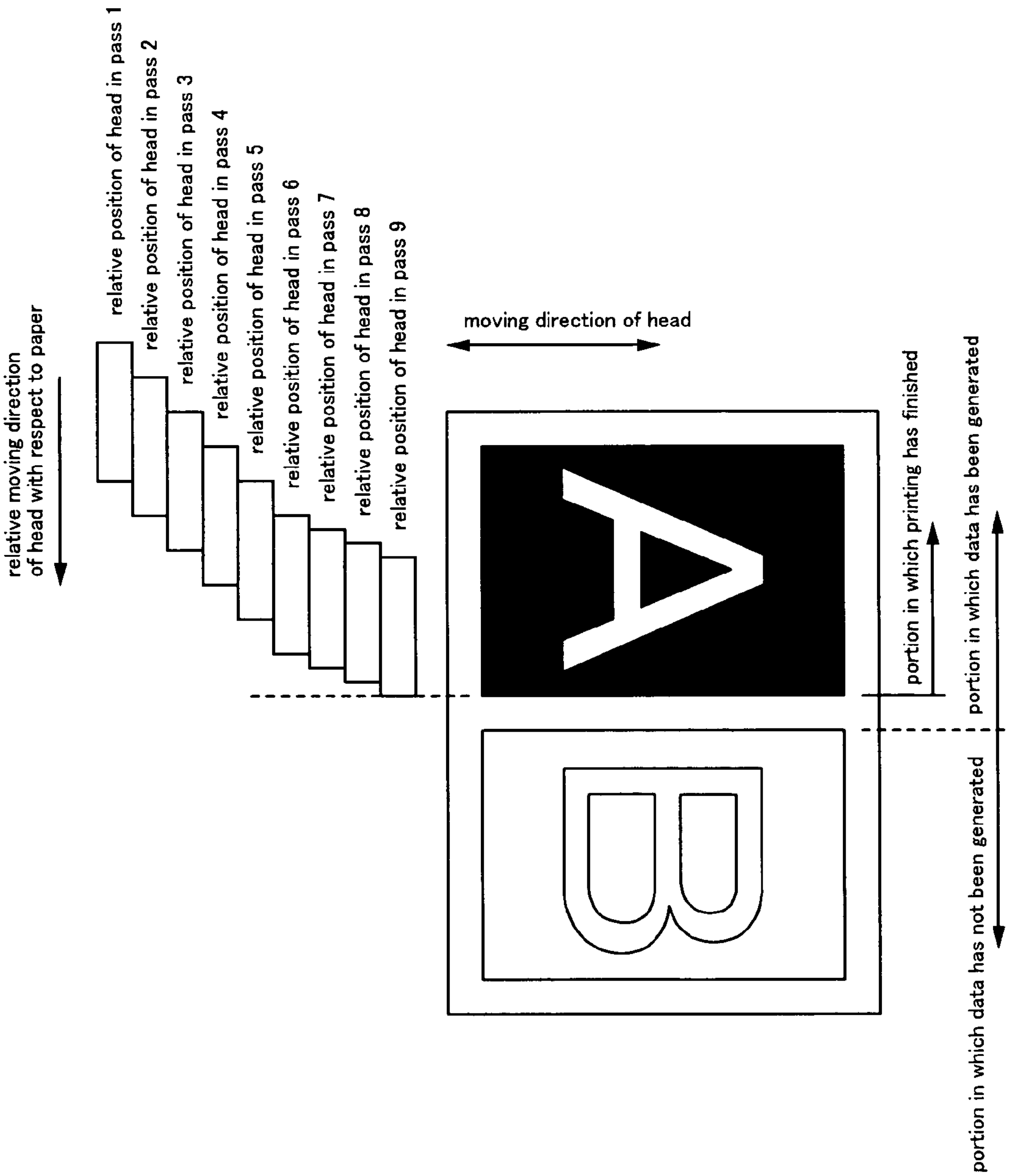
FIG. 35 is a diagram for illustrating another print standby state.

FIG. 35 is a diagram for illustrating another print standby state. According to this figure, the relative movement distance of the head from pass 6 through pass 9 is made small compared to the relative movement distance between each pass for the prior passes. In this way, it is possible to print the image "A" regardless of whether the head-drive data for the image "B" is going to be generated or not. If the reading operation for the image "B" has not been started when printing of the image "A" is finished, the carrying operation of the paper 7 (or the printing operation of ejecting ink from the nozzles) is brought into a standby state until the reading operation for the image "B" is started. Accordingly, the timing for the standby state may be after printing of the image "A" is finished.

According to this print standby state, since the operation does not enter the standby state in the middle of printing the image "A", it is possible to prevent the image from deteriorating due to differences in the printing state (such as the difference in the way the ink dries before and after standby).

On the other hand, if there is not much of a difference in drying of ink, then the above-described example allows the entire image "A" to be printed evenly because the relative movement distance of the head before and after entering the standby state is constant (or the relative movement distance of the head before and after printing the joining section between the image "A" and the image "B" is constant).

Comparison between Present Embodiments and Reference Example

Figure 36A:
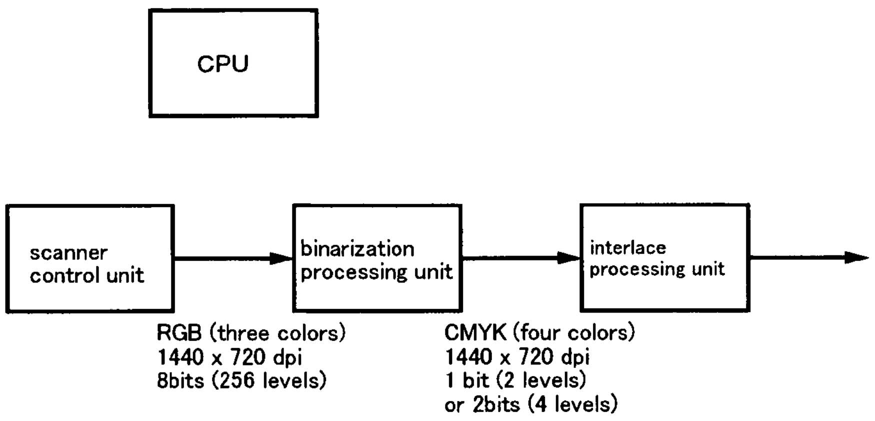
FIG. 36A is an explanatory diagram of a data flow for when the apparatus functions to perform normal copying.
Figure 36B:
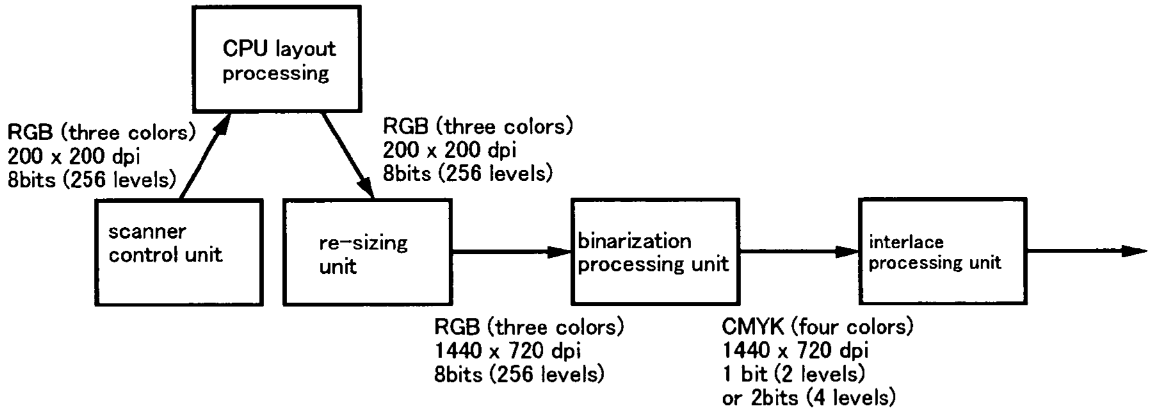
FIG. 36B is an explanatory diagram of a data flow for when layout processing is performed using RGB data.
Figure 36C:
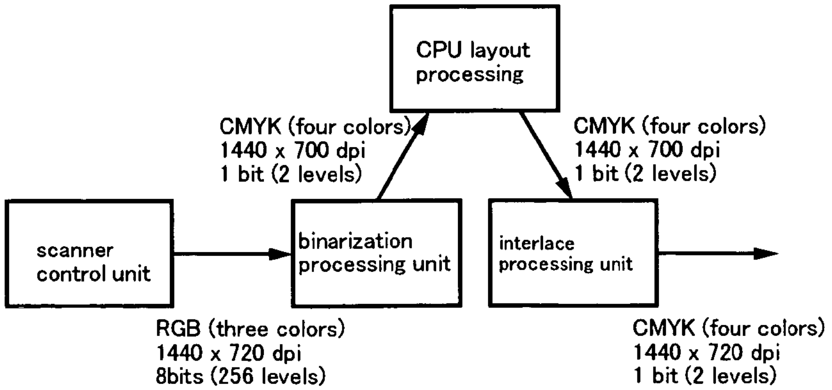
FIG. 36C is an explanatory diagram of a data flow for when layout processing is performed using CMYK data.

FIG. 36A is an explanatory diagram of a data flow for when the apparatus functions to perform normal copying. FIG. 36B is an explanatory diagram of a data flow for when layout processing of the present embodiments is performed. FIG. 36C is an explanatory diagram of a data flow for a reference example.

When the apparatus functions to perform normal copying, during a period from when the RGB image data are read in by the scanner control unit 58 until when the CMYK head-drive data are written into the image buffers 694, 695, it is not necessary to exchange data between the SDRAM 69 for the ASIC and the SDRAM 56 for the CPU. That is, since only the local bus 511 is used to send data between the control ASIC 51 and the ASIC-SDRAM 69, the CPU bus 501 is hardly used. If interrupt operations to/from the CPU 54 are reduced, processing will be accelerated and it will be possible to increase copying speed, because the control ASIC is manufactured as a dedicated unit for converting RGB image data into CMYK head-drive data.

In repeat printing, 4-piece repeat copying, and 2-up copying, layout processing that requires computation by the CPU 54 is performed. In the present embodiments, the RGB image data are sent to the CPU-SDRAM 56, and based on the RGB image data, the CPU 54 performs layout processing.

The amount of data to be processed is smaller for RGB image data because the number of colors is smaller (the number of planes is smaller) compared to CMYK image data. As shown in FIG. 36C, if the CPU 54 were to perform layout processing with respect to the CMYK image data of the binarization processing unit, then since the number of colors is large, the amount of data to be processed will become large. On the other hand, in the present embodiments, since the amount of data to be processed is small, the load for when the CPU 54 performs computation decreases, and also, the process speed increases.

Further, the amount of data to be processed is smaller for data with a resolution of 200×200 dpi because the number of pixels is smaller compared to data with a resolution of 1440×720 dpi. As shown in FIG. 36C, if the CPU 54 were to perform layout processing with respect to image data with a resolution of 1440×720 dpi of the binarization processing unit, then since the resolution is high, the amount of data to be processed will become large. On the other hand, in the present embodiments, since the amount of data to be processed is small, the load for when the CPU 54 performs computation decreases, and also, the process speed increases.

It should be noted that the amount of data to be processed becomes large for multi-gradation data compared to data in 2-level halftone (or 4-level halftone). However, in the present embodiments, the entire amount of data to be processed is smaller for the RGB image data than the CMYK image data ($3\times200\times200\times8<4\times1440\times720\times1$). Therefore, in the present embodiments, since the amount of data to be processed is smaller compared to the reference example, the load for when the CPU 54 performs computation decreases, and also, the process speed increases.

Brief Account of Printing Requiring Layout (1) The above-mentioned SPC multifunction apparatus (recording apparatus) 1 comprises a control ASIC (data generator) 51 and a CPU (controller) 54.

The control ASIC 51 is a dedicated unit for converting the image data in the RGB system into image data in the CMYK system. Therefore, its processing operation is fast even if the amount of data to be processed is large. The control ASIC 51, however, cannot perform processes (such as layout processing) other than a predetermined process because it is manufactured as a dedicated unit. On the other hand, the CPU 54 is a general-purpose unit for generating, based on the image data, image data in which the image of the above image data is laid out. Therefore, the CPU 54 can be used for other purposes, and it can perform layout processing and so forth. However, if the amount of data to be processed by the CPU 54 increases, the process speed drops.

When an image is laid out and printed on paper (a medium) in such a configuration, the stage at which the CPU 54 performs layout processing becomes a problem. This is because it is preferable for the amount of data that the CPU 54 processes to be smaller.

If the CPU 54 were to perform the process of laying out the image in the image data after converting the image data in the RGB system into image data in the CMYK system, then since the number of colors is larger for the image data in the CMYK system than the image data in the RGB system, it would take more time for layout processing (refer to FIG. 36C).

In view of this, the CPU (controller) 54 generates, based on image data in the RGB system, image data in the RGB system in which the image of the above image data is laid out. The control ASIC (data generator) 51 then converts the image data in the RGB system generated by the CPU 54 into image data in the CMYK system, and the SPC multifunction apparatus 1 prints the laid out image on the medium according to the image data in the CMYK system that have been converted.

Accordingly, since the amount of data to be subjected to layout processing is small, the load for when the CPU 54 performs computation decreases, and also, the process speed increases.

(2) In the above-mentioned SPC multifunction apparatus (recording apparatus) 1, the resolution 200×200 dpi of the image data in the RGB system for when the CPU (controller) 54 performs layout is smaller than the resolution 1440×720 dpi of the image data in the CMYK system.

The resolution of the image data in the CMYK system is adjusted to match the resolution of the printer section of the SPC multifunction apparatus 1. On the other hand, since there is no need to adjust the resolution of the image data in the RGB system to match the resolution of the printer section 30 of the SPC multifunction apparatus 1, it is possible to set the resolution lower than the resolution of the image data in the CMYK system.

(3) In the above-mentioned SPC multifunction apparatus 1, when an image is printed on paper (a medium) without being laid out, the control ASIC (data generator) 51 converts the image data in the RGB system into image data in the CMYK system, and the SPC multifunction apparatus (recording apparatus) 1 prints the image on the medium according to the image data in the CMYK system that have been converted.

That is, when layout processing is not performed, conversion of image data is performed mainly with the control ASIC 51, which is a dedicated unit, and therefore, the process speed is fast.

(4) The above-mentioned SPC multifunction apparatus further comprises a scanner section for reading an image from an original, and the control ASIC (data generator) 51 has a scanner control unit for generating image data in the RGB system based on the data received from the scanner section.

In this way, the SPC multifunction apparatus can obtain image data in the RGB system. Further, since the image data in the RGB system are generated in the control ASIC, which is a dedicated unit, the process speed is fast.

However, the route in which the image data in the RGB system are obtained is not limited to the scanner section. It is possible to obtain the image data in the RGB system from an external device.

(5) The above-mentioned SPC multifunction apparatus further comprises a movable head provided with a plurality of nozzles, and the control ASIC (data generator) 51 has a unit (the interlace processing unit 62 and the image buffer unit 64) for performing conversion from the image data in the CMYK system into head-drive data that have been rearranged corresponding to each of the nozzles.

In this way, it is possible to generate the head-drive data from the image data in the RGB system in the control ASIC 51, which is a dedicated unit, and therefore, the process speed is fast.

(6) The above-mentioned SPC multifunction apparatus 1 further comprises scanner section 10 for reading an image from an original and a movable head 38 provided with a plurality of nozzles. The above-mentioned data conversion section is capable of generating the image data in the RGB system based on the data received from the above-mentioned scanner section, converting the image data in the RGB system into image data in the CMYK system, and converting the image data in the CMYK system into the head-drive data that have been rearranged corresponding to each of the nozzles.

In this way, it is possible to perform processing of from obtaining the image data in the RGB system up to generating the head-drive data in the control ASIC, which is a dedicated unit, and therefore, the process speed is fast.

(7) The above-mentioned SPC multifunction apparatus 1 further includes a re-sizing unit for converting the size of the image data in the RGB system generated by the CPU (layout section).

It is not necessary to adjust the resolution of the image data in the RGB system to match the resolution of the printer section of the SPC multifunction apparatus 1. Therefore, it is possible to make the resolution (size) of the image data in the RGB system that are processed by the CPU small. However, it is ultimately necessary to adjust the resolution of the image data to match the resolution of the printer section. Therefore, the re-sizing unit 59 makes the resolution of the image data in the RGB system match the resolution of the printer section.

(8) The above-mentioned SPC multifunction apparatus 1 further includes an ASIC-SDRAM 69 for storing the image data to be processed by the control ASIC 51, a local bus (second transfer path) 511 for exchanging image data between the control ASIC 51 and the ASIC-SDRAM 69, a CPU-SDRAM 56 for storing the image data to be processed by the CPU (controller) 54, and a CPU bus (first transfer path) 501 that is provided separate from the local bus 511 and that is for exchanging image data between the CPU 54 and the CPU-SDRAM 56.

That is, the local bus 511 and the CPU bus 501 are provided separately. In this way, it is possible to perform data conversion processing with the control ASIC 51 without causing any decrease in the process speed of the CPU 54.

(9) In the above-mentioned SPC multifunction apparatus 1, when an image is printed on paper (a medium) without being laid out, the control ASIC (data generator) 51 performs conversion from the image data in the RGB system into the image data in the CMYK system without using the CPU bus (first transfer path) 501.

In this way, when layout processing is not performed, conversion of image data is performed mainly with the control ASIC 51, which is a dedicated unit, and therefore, the process speed becomes fast.

(10) In the above-mentioned SPC multifunction apparatus 1, the control ASIC (data generator) 51 has a CPUIF unit 66 for transmitting the image data in the ASIC-SDRAM 69 to the CPU-SDRAM 56 without passing them through the local bus (second transfer path) 511.

In this way, it is possible to transmit the image data in the ASIC-SDRAM 69 to the CPU side.

(11) In the above-mentioned SPC multifunction apparatus 1, the CPU (controller) generates the image data in the RGB system laid out so that a plurality of images are arranged therein.

In this way, the SPC multifunction apparatus can perform repeat copying (such as automatic repeat copying and 4-piece repeat copying).

(12) In the above-mentioned SPC multifunction apparatus 1, the CPU (controller) 54 generates the image data in the RGB system laid out so that the images are turned.

In this way, the SPC multifunction apparatus 1 can perform 2-up copying.

(13) In the above-mentioned SPC multifunction apparatus 1, the CPU (controller) is a general-purpose unit, and the control ASIC (data generator) is a dedicated unit.

In such a configuration, the processing operating of the control ASIC 51 is fast even if the amount of data to be processed is large. The control ASIC 51, however, cannot perform processes (such as layout processing) other than a predetermined process because it is manufactured as a dedicated unit. On the other hand, the CPU 54 can be used for other purposes, and it can perform layout processing and so forth. However, if the amount of data to be processed by the CPU 54 increases, the process speed drops. In such a configuration, it is preferable that the amount of data to be processed by the CPU 54 be small.

In view of this, according to the above-mentioned SPC multifunction apparatus 1, since it is possible to reduce the amount of data that the CPU 54 processes, the load for when the CPU 54 performs computation decreases. It should be noted that, even if the amount of data to be processed by the control ASIC 51 increases, since the control ASIC 51 is a dedicated unit, the unit can perform data conversion at high processing speed.

Other Embodiments

A recording apparatus etc. according to the present invention was described above based on an embodiment thereof. The above-mentioned embodiments of the invention, however, are for facilitating understanding of the present invention and are not to limit the present invention. The present invention may be modified and/or altered without departing from the gist thereof, and it is needless to say that the present invention includes its equivalents.

The foregoing embodiments mainly describe an SPC multifunction apparatus, but it is needless to say that the description includes disclosures of recording apparatuses, printing apparatuses, printing methods, carrying devices, programs, storage media, computer systems, display screens, methods for displaying screens, methods for manufacturing printed objects, recording devices, liquid ejecting apparatuses, and so forth.

Further, in the present embodiments, some or all of the structures realized by hardware may instead be achieved by software, and conversely, some of the configurations realized by software may be achieved by hardware.

Configuration of Computer System Etc

Next, an embodiment of a computer system, which is an example of an embodiment according to the present invention, is described with reference to the drawings.

Figure 37:
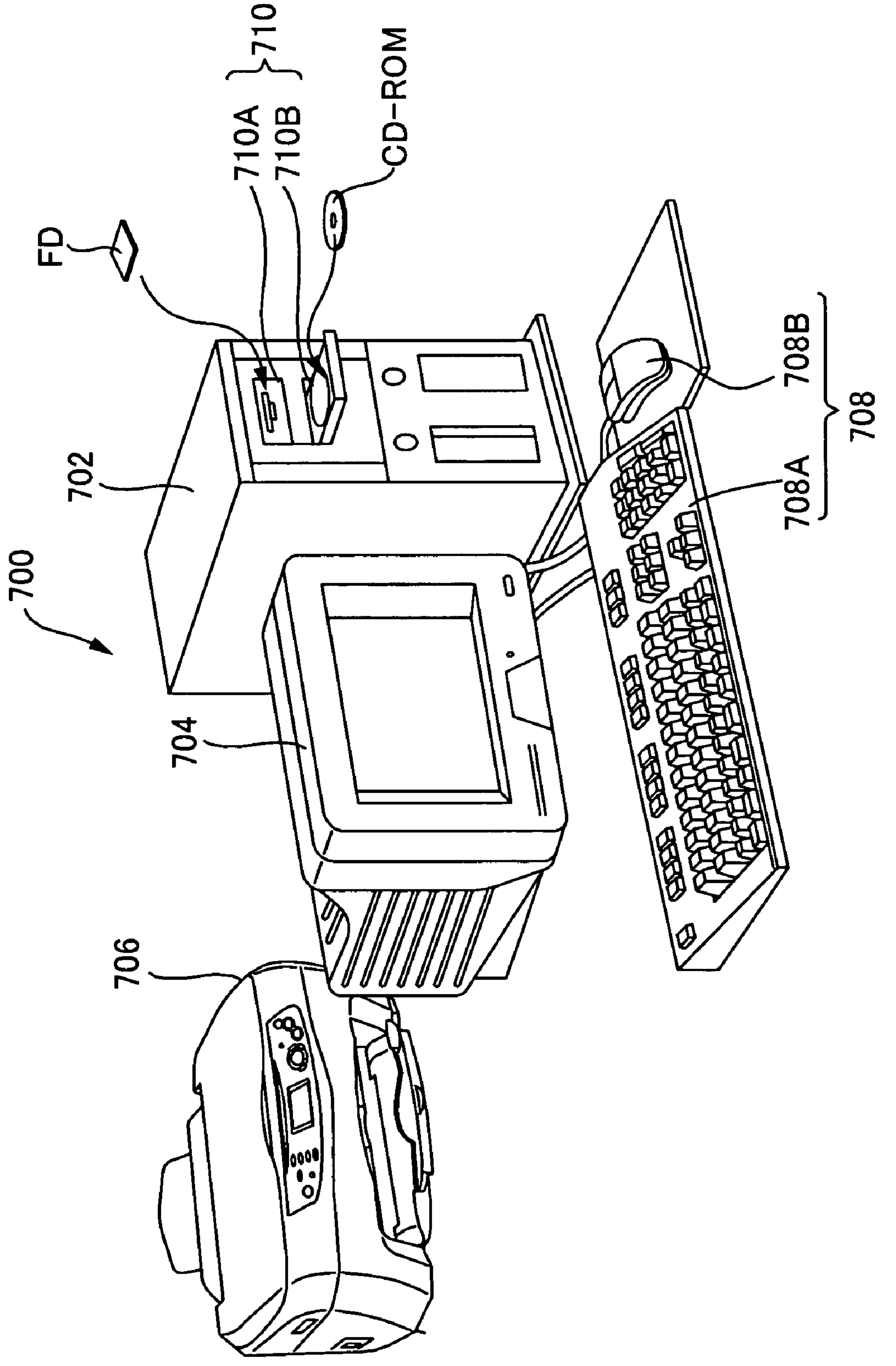
FIG. 37 is an explanatory diagram showing an external configuration of a computer system.

FIG. 37 is an explanatory diagram showing the external configuration of a computer system. The computer system 700 includes: a computer unit 702; a display device 704; an SPC multifunction apparatus 706; input operation means 708; and a data reading device 710. In the present embodiment, the computer unit 702 is housed in a mini-tower casing; however the structure is not limited to this example. Although a CRT (Cathode Ray Tube), a plasma display, or a liquid crystal display device is generally used as the display device 704, this is not a limitation. The SPC multifunction apparatus described above is used as the SPC multifunction apparatus 706. In the present embodiment, a keyboard 708A and a mouse 708B are used as the input operation means 708; however, this is not a limitation. In the present embodiment, a flexible disk drive device 710A and a CD-ROM drive device 710B are used as the data reading device 710; however, this is not a limitation, and it is also possible to use an MO (Magneto Optical) disk drive device, a DVD (Digital Versatile Disk) drive, or any other kinds of devices.

Figure 38:
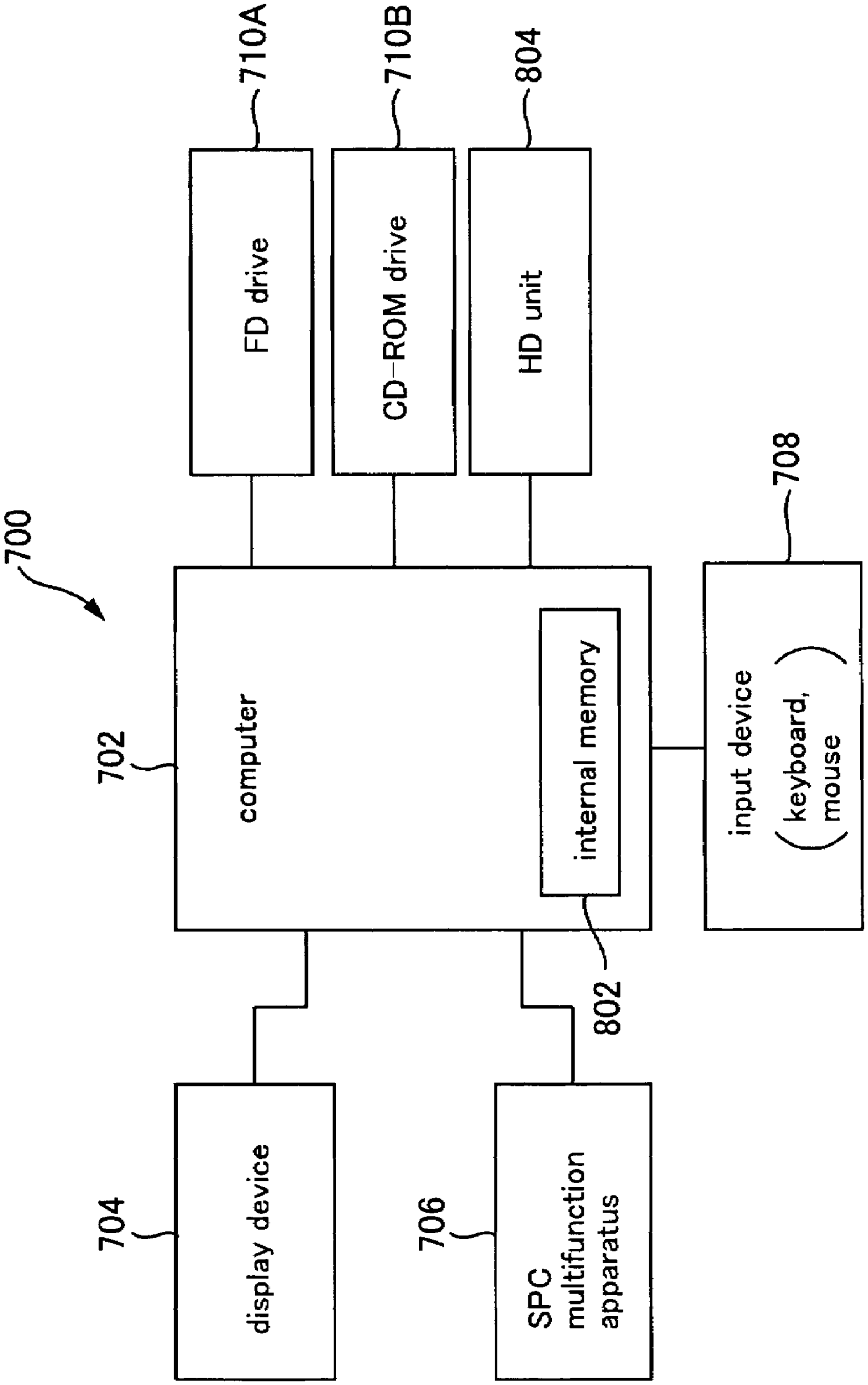
FIG. 38 is a block diagram showing a configuration of the computer system shown in FIG. 37.

FIG. 38 is a block diagram showing the configuration of the computer system shown in FIG. 37. The figure shows that an internal memory 802, such as a RAM, provided inside the casing in which the computer unit 702 is housed, and an external memory, such as a hard-disk drive unit 804, are also provided.

It should be noted that in the description above, description was made of an example in which the SPC multifunction apparatus 706 is connected to the computer unit 702, the display device 704, the input operation means 708, and the data reading device 710 to configure the computer system. However, the configuration is not limited to the above. For example, the computer system may be structured of the computer unit 702 and the SPC multifunction apparatus 706, and the computer system does not have to comprise any one of the display device 704, the input operation means 708, and the data reading device 710.

Further, for example, it is also possible for the SPC multifunction apparatus 706 to have some of the functions or mechanisms of each of the computer unit 702, the display device 704, the input operation means 708, and the data reading device 710. For example, it is possible to structure the apparatus so that it comprises, for example, a recording media mounting section for detachably mounting a recording medium on which image data captured with a digital camera or the like is stored.

The above-mentioned computer program for controlling the operations of the printer may be downloaded to, for example, the computer connected to the SPC multifunction apparatus 706 via a communications line such as the Internet. It is also possible, for example, to record the program on a computer-readable storage medium and distribute it in this form. It is possible to use various kinds of storage media such as flexible disks FDs, CD-ROMs, DVD-ROMs, magneto-optical disks MOs, hard disks, and memories, as the storage medium. It should be noted that the information recorded on such a storage medium can be read by various kinds of reading devices 710.

Figure 39:
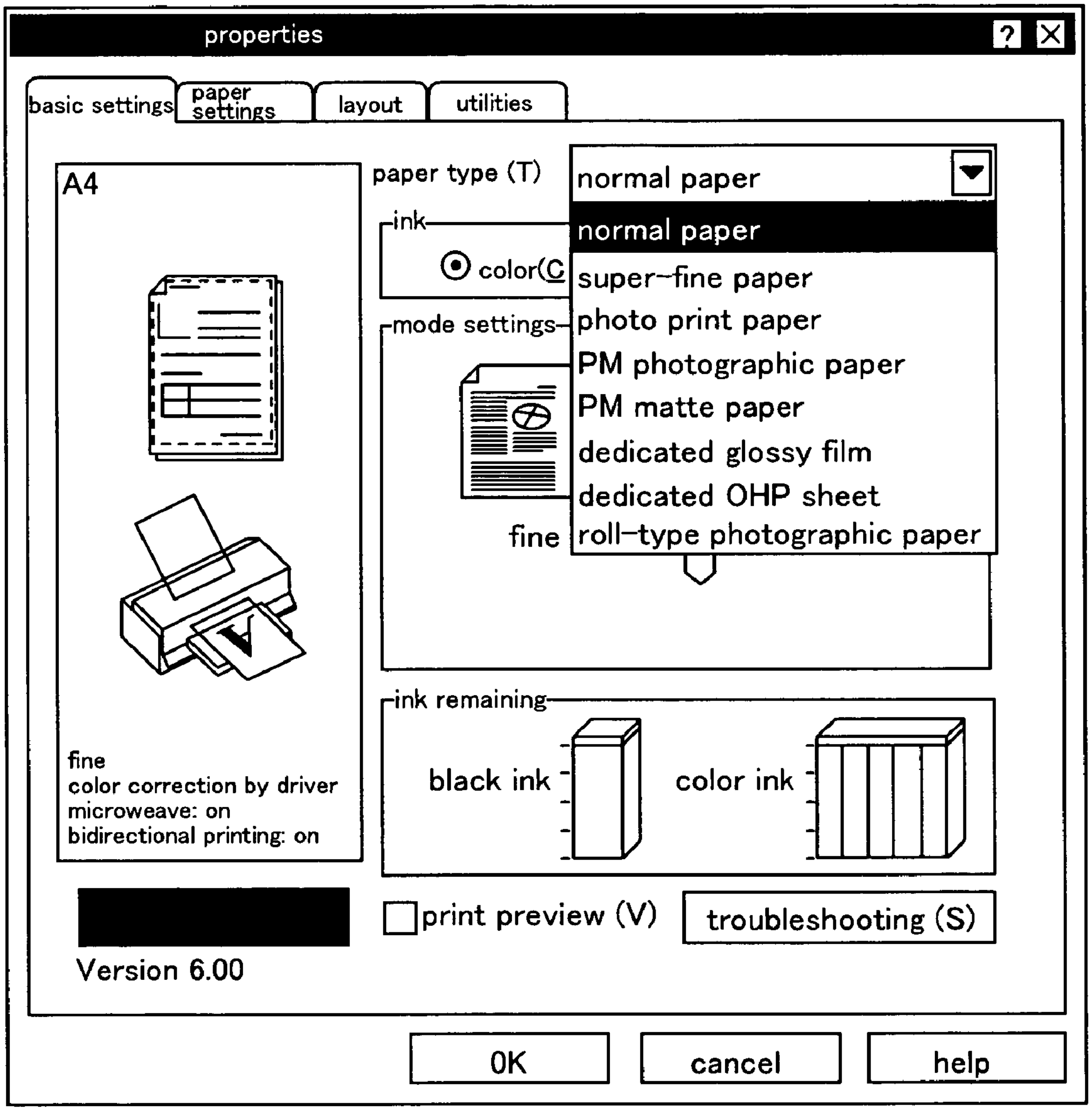
FIG. 39 is an explanatory diagram showing a user interface of a printer driver displayed on a screen of a display device 704 that is connected to the computer system.

FIG. 39 is an explanatory diagram showing a user interface of a printer driver displayed on the screen of the display device 704 that is connected to the computer system. The printer driver serves as to support the printer function of the SPC multifunction apparatus 1. The user can carry out various settings of the printer driver using the input device 708.

The user can select the print mode from this screen. For example, the user can select the high-speed printing mode or the fine printing mode as the print mode. Further, the user can select the distance between dots (the resolution) for printing from this screen. For example, the user can select, from this screen, 720 dpi or 360 dpi as the print resolution.

Figure 40:
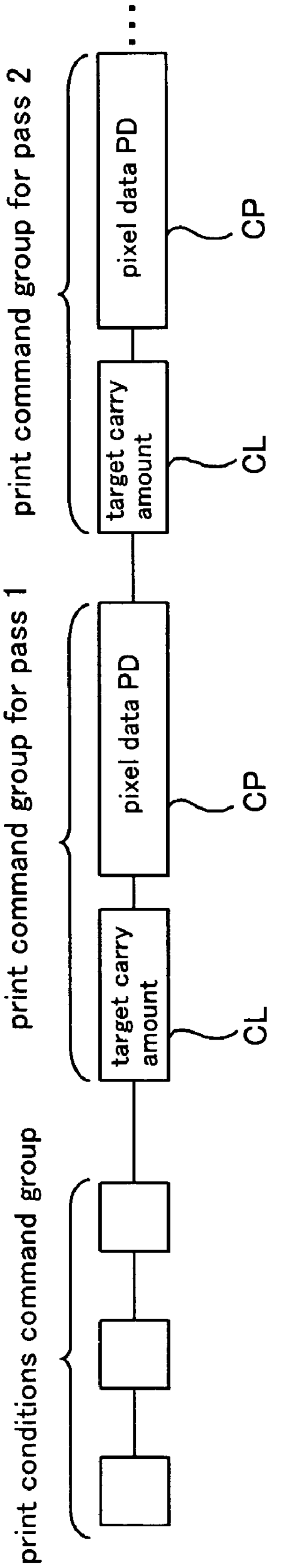
FIG. 40 is an explanatory diagram of a format of print data supplied to an SPC multifunction apparatus 706 from a computer unit 702.

FIG. 40 is an explanatory diagram of a format of print data supplied to the SPC multifunction apparatus 706 from the computer unit 702. The print data is generated from the image information according to the settings of the printer driver. The print data includes a print condition command group and command groups for each pass. The print condition command group includes commands indicating the print resolution, commands indicating the printing direction (unidirectional/bidirectional), and so forth. Further, the print command group for each pass includes a target carry amount command CL and a pixel data command CP. The pixel data command CP includes pixel data PD indicating the recording status for each pixel of the dots recorded in that pass. It should be noted that, although the various commands shown in the figure each has a header and a data portion, they are depicted in a simplified fashion. Further, these command groups are intermittently supplied from the computer unit to the printer on a command-by-command basis. The print data, however, is not limited to this format.

It should be noted that in the above description, an example in which the SPC multifunction apparatus 706 is connected to the computer unit 702, the display device 704, the input device 708, and the reading device 710 to configure the computer system was described. However, the configuration is not limited to the above. For example, the computer system may be configured comprising only the computer unit 702 and the SPC multifunction apparatus 706, and it does not have to comprise any one of the display device 704, the input device 708, or the reading device 710. Further, for example, it is also possible for the SPC multifunction apparatus 706 to have some of the functions or mechanisms of each of the computer unit 702, the display device 704, the input devices 708, and the reading device 710. For example, it is possible to structure the SPC multifunction apparatus 706, such as that shown in FIG. 38, so that it comprises, for example, an image processor for processing images, a display section for performing various kinds of displaying, a recording media mounting section for detachably mounting a recording medium on which image data captured with a digital camera, or an interface for obtaining data stored in a memory of a digital camera.

A computer system configured as above will be superior to existing computer systems as a whole.

<About the Recording Apparatus>

In the foregoing embodiments, a multifunction apparatus comprising a scanner section etc. was described as the recording apparatus. The recording apparatus, however, is not limited to this. For example, it may be, for example, a printing apparatus that does not have a scanning section. In short, any apparatus may be adopted as long as it is such a recording apparatus that obtains image data in the RGB system and converts the image data in the RGB system into image data in the CMYK system.

Further, other than the SPC multifunction apparatus described above, the recording apparatus may be a normal printer, such as an inkjet printer and a bubble jet (registered trademark) printer, or it may be, for example, a printer that adopts other ink ejecting methods.

Further, other than recording apparatuses such as printers that print on media by ejecting ink, technology like that of the present embodiments can also be applied to, for example, color filter manufacturing devices, dyeing devices, fine processing devices, semiconductor manufacturing devices, surface processing devices, three-dimensional shape forming machines, liquid vaporizing devices, organic EL manufacturing devices (particularly macromolecular EL manufacturing devices), display manufacturing devices, film formation devices, or DNA chip manufacturing devices. Moreover, methods therefor and manufacturing methods thereof also fall within the range of application of the present invention. When the technology of the present invention is applied to such fields, savings in material, processes, and costs compared to conventional cases can be achieved in those fields, because the technology has the feature of being able to directly eject (directly render) a liquid on the target material.

<About the Ink>

The above-described embodiments were about embodiments of printers, and therefore dye ink or pigment ink ejected from the nozzles. The liquid ejected from the nozzles, however, is not limited to inks. For example, it is also possible to eject, from the nozzles, liquid (including water) such as metallic materials, organic materials (in particular polymeric materials), magnetic materials, conductive materials, wiring materials, film forming materials, electronic ink, machining liquids, genetic solutions, and so forth. By directly ejecting such liquids onto the target material, savings in material, processes, and costs can be achieved.

<About the Nozzles>

In the foregoing embodiments, nozzles were simply adopted as the dot forming sections. However, as long as they are nozzles that can eject liquid, a method using piezoelectric elements to eject ink may be employed, or other methods may also be employed, such as a method for generating bubbles in the nozzles using heat, as the method for ejecting the liquid.

<About the Medium>

As for the media in the present invention, other than the above-mentioned paper, that is, paper materials such as cut paper and roll paper, print medium formed of various materials such as cloth materials and film materials may be considered. Further, other types of media may be employed.

<About the Image Arrangement>

In the foregoing embodiments, the vertical and lateral directions of the image that is read and the vertical and lateral directions of the plurality of images arranged and printed on the paper were the same. However, the direction of the images printed on the paper is not limited to this.

FIG. 39 is a diagram for illustrating another arrangement of the images. In the present embodiment, the CPU 54 turns the vertical and lateral directions of the image data in the first layout buffer 573A 90° to generate the layout image in the second layout buffer 573B, and arranges and prints on print paper the plurality of images that have been turned. In this way, the image information having been read may be turned, and a plurality of images according to this image information, which has been subjected to turning, may be arranged and printed. In the present embodiment, it is possible to arrange one more of the same image on paper that has the same print area, compared to the foregoing embodiments. It should be noted that in the present embodiment, the maximum number m of images that can be arranged in the vertical direction of the paper is calculated based on the print area information (X1) in the vertical direction and the image area information (Y2) in the lateral direction. In the same way, the maximum number n of images that can be arranged in the lateral direction of the paper is calculated based on the print area information (Y1) in the lateral direction and the image area information (X2) in the vertical direction.

Further, it is possible to perform printing on paper by first comparing the case in which the images are arranged without subjecting them to turning as in the foregoing embodiments and the case in which the images are turned 90° and then arranged as in the above embodiment, and selecting the one in which more images can be arranged.

Further, it is possible to arrange and print a plurality of images by mixing images that are arranged without being turned as in the foregoing embodiments and images that are turned 90° and then arranged as in the above embodiment.

<About the Margins>

In the foregoing embodiments, the width of the margins provided between the image and the ends (the upper end or side ends) of the paper was approximately the same as the width of the margin provided between the images. However, the width of the margins provided between the image and the ends (the upper end or side ends) of the paper does not necessarily have to be the same. However, if the width of the margins provided between the image and the ends (the upper end or side ends) of the paper is the same, it is possible to cut all of the images in the same state when the plurality of images printed on the paper are to be cut.

Further, in the foregoing embodiments, margins were provided between the image and the ends of the paper and between the images. The margins, however, do not necessarily have to be provided. It should be noted that when no margin is provided between the image and the ends of the paper, then it is preferable not to provide a margin between the images. This is because in this way, when the plurality of images printed on the paper are to be cut, it is possible to cut all of the images in the same state. It should be noted that if margins are not provided, there will be no need to consider the margin information in determining the number of images arranged on the paper.

Further, in the foregoing embodiment, a margin was simply provided between the images. However, a cut-off line may be provided in the margin portion. This enables easier cutting when the plurality of images printed on the paper are to be cut.

<About Displaying the Number of Images and Setting the Number of Sheets to be Printed>

In the foregoing embodiments, the number of sheets to print was set after the number of images per sheet was displayed. However, the setting of the number of sheets to print is not limited to this.

For example, the user may first enter the total number of images (for example, the image "A") necessary, and the number of sheets of paper to print may be set according to the number of images per sheet that has been calculated.

Further, the paper may be printed one sheet at a time every time a button is pressed, without particularly setting the number of sheets to print.

<About the Image Data in the CMYK System>

In the foregoing embodiments, the colors usable by the printing apparatus were cyan (C), magenta (M), yellow (Y), and black (K). Therefore, the number of colors in the CMYK system was four. However, the number of colors in the CMYK system is not limited to this. For example, light cyan (LC) and light magenta (LM) may be added, and the number of colors may be six. Further, red (R), violet (V), and so forth, may be added. Further, in some cases, not only colored ink, but also clear ink may be included as the inks usable by the printing apparatus. In such cases, the image data may include image data for clear ink.

What is claimed is:

1. A recording apparatus comprising:

a recording head for performing recording on a medium according to first recording data;

a controller for managing control of said recording apparatus;

a data generator that is connected to said controller via a first transfer path, said data generator being capable of generator said first recording data;

a memory that is connected to said data generator via a second transfer path; and a data obtaining section for obtaining data from an external source wherein:

second recording data that are stored in said memory based on the data obtained by sail data obtaining section are transferred to said data generator through said second transfer path; and based on said second recording data that have been transferred, said data generator generates said first recording data;

said data generator has a plurality of processing units;

said memory is capable of storing unprocessed data that are to be processed by each of said processing units and processed data that have been processed each of said processing units;

each of said processing units:

obtains the unprocessed data from said memory via said second transfer path, processes the obtained unprocessed data, and transfers the processed data that have been processed to said memory via said second transfer path;

said recording head has a plurality of dot forming sections; and said data generator has at least a color conversion processing unit for performing color conversion processing with respect to said second recording data that have been obtained by said data obtaining section and that are stored in said memory, and a rearrangement unit for rearranging said second recording data that have been subjected to the color conversion processing by said color conversion processing unit into data corresponding to each of said dot forming sections as said plurality of processing units.

2. A recording apparatus according to claim 1, wherein:

said recording apparatus performs recording on said medium by repeating an operation of carrying said medium in a carrying direction, and an operation of forming dots on said medium with said plurality of dot forming sections while making said recording head move in a direction that intersects said carrying direction; and the data that have been rearranged by said rearrangement unit are used every time the dots are formed on said medium with said plurality of dot forming sections while said recording head is moved in the direction that intersects said carrying direction.

3. A recording apparatus comprising:

a recording head for performing recording on a medium according to first recording data;

a controller for managing control of said recording apparatus;

a data generator that is connected to said controller via a first transfer path, said data generator being capable of generating said first recording data;

a memory that is connected to said data generator via a second transfer path; and a data obtaining section for obtaining data from an external source, wherein:

second recording data that are stored in said memory based on the data obtained by said data obtaining section are transferred to said data generator through said second transfer path;

based on said second recording data that have been transferred, said data generator generates said first recording data;

said data generator has a head control unit for controlling said recording head;

said first recording data stored in said memory are transferred to said head control unit via said second transfer path without passing through said first transfer path; and said head control unit controls said recording head according to said first recording data that have been transferred via said second transfer path.

4. A recording apparatus comprising:

a recording head for performing recording on a medium according to first recording data;

a controller for managing control recording apparatus;

a data generator that is connected to said controller via a first transfer path, said data generator being capable of generating said first recording data;

a memory that is connected to said data generator via a second transfer path; and a data obtaining section for obtaining data from an external source, wherein:

second recording data that are stored in said memory based on the data obtained by said data obtaining section are transferred to said data generator through said second transfer path;

based on said second recording data that have been transferred, said data generator generates said first recording data;

said data obtaining section is a scanner for reading an image in an original to obtain data;

said data generator has at least a color conversion processing unit for performing color conversion processing with respect to said second recording data that have been stored in said memory based on the data obtained by said scanner;

said memory has an image data storage area for storing said second recording data that are based on the data obtained by said scanner, and a converted data storage area for storing the data that have been subjected to the color conversion processing by said color conversion unit; and when said second recording data are output to an external source, said second recording data are also stored in said converted data storage area.

5. A recording apparatus comprising:

a recording head for performing recording on a medium according to first recording data;

a controller for managing control of said recording apparatus;

a data generator that is connected to said controller via a first transfer path, said data generator being capable of generating said first recording data;

a memory that is connected to said data generator via a second transfer path; and a data obtaining section for obtaining data from an external source, wherein:

second recording data that are stored in said memory based on the data obtained by said data obtaining section are transferred to said data generator through said second transfer path;

based on said second recording data that have been transferred, said data generator generates said first recording data;

said data obtaining section is a scanner for reading an image in an original to obtain data;

said data generator has at least a color conversion processing unit for performing color conversion processing with respect to said second recording data that have been stored in said memory based on the data obtained by said scanner;

said memory has an image data storage area for storing said second recording data that are based on the data obtained by said scanner, and a converted data storage area for storing the data that have been subjected to the color conversion processing by said color conversion unit; and a ratio between a size of said image data storage area and a size of said converted data storage area is set according to a read resolution with which said image is read.

6. A recording apparatus according to claim 5, wherein:

the ratio between the size of said image data storage area and the size of said converted data storage area is set in levels according to a read resolution with which said image is read.

7. A recording apparatus according to claim 6, wherein:

setting information about the ratio between the size of said image data storage area and the size of said converted data storage area is stored.

8. A recording apparatus comprising:

a recording head for performing recording on a medium according to first recording data;

a controller for managing control of said recording apparatus;

a data generator that is connected to said controller via a first transfer path, said data generator being capable of generating said first recording data;

a memory that is connected to said data generator via a second transfer path; and a data obtaining section for obtaining data from an external source, wherein:

second recording data that are stored in said memory based on the data obtained by said data obtaining section are transferred to said data generator through said second transfer path;

based on said second recording data that have been transferred, said data or generator said first recording data;

said data obtaining section is a scanner for obtaining data by reading an image in an original;

said controller is capable of generating layout data in which an image of said second recording data that are based on the data obtained by said scanner is laid out;

when an image that has been laid out is to be recorded on said medium, said controller generates layout data in which said image is laid out, and said data generator converts the layout data that have been transferred from said controller via said first transfer path into said first recording data; and when an image that has not been laid out is to be recorded on said medium, said controller does not generate data in which said image is laid out, and said data generator converts said second recording data that have not passed through said first transfer path into said first recording data.

9. A recording apparatus according to claim 8, wherein:

a resolution of said second recording data that are based on the data obtained by said scanner differs according to whether said image is to be laid out or not.

10. A recording apparatus according to claim 9, wherein: when said image is to be laid out, the resolution of said second recording data is at a lower resolution compared to when said image is not to be laid out.

11. A recording apparatus according to claim 8, wherein:

said recording head has a plurality of dot forming sections for forming dots on said medium; and said data generator has a rearrangement unit for rearranging said second recording data to make the data correspond to each of said dot forming sections.

12. A recording apparatus according to claim 8, wherein:

said data generator has a color conversion processing unit for performing color conversion processing with respect to the second recording data in the RGB system that have been obtained by said scanner and that are stored in said memory to convert them into recording data in the CMYK system.

13. A recording apparatus according to claim 12, wherein:

based on said second recording data in the RGB system, said controller generates layout data in the RGB system in which the image of said second recording data is laid out.

14. A recording apparatus according to claim 13, wherein:

a resolution of the image of the layout data generated by said controller is at a lower resolution than a resolution of the image of said first recording data.

15. A recording apparatus comprising:

a recording head for performing recording on a medium according to first recording data;

a controller for managing control of said recording apparatus;

a data generator that is connected to said controller via a first transfer path, said data generator being capable of generating said first recording data;

a memory that is connected to said data generator via a second transfer path; and a data obtaining section for obtaining data from an external source, wherein:

second recording data that are stored in said memory based on the data obtained by said data obtaining section are transferred to said data generator through said second transfer path;

based on said second recording data that have been transferred, said data generator generates said first recording data;

said data generator has a color conversion processing unit for performing color conversion processing with respect to said second recording data that have been obtained by said data obtaining section and that are stored in said memory, wherein said color conversion processing unit is capable of converting the second recording data in the RGB system into recording data in the CMYK system;

based on said second recording data in the RGB system, said controller generates layout data in the RGB system in which the image of said second recording data is laid out;

said color conversion processing unit converts the layout data in the RGB system that have been generated by said controller into layout data in the CMYK system;

said first recording data are generated from the layout data in the CMYK system that have been converted; and based on the generated first recording data, said recording head records on said medium the image that has been laid out.

16. A recording apparatus according to claim 15, wherein:

a resolution of the image of said second recording data in the RGB system for when said controller performs layout is lower than a resolution of the image of said layout data in the CMYK system.

17. A recording apparatus according to claim 15, further comprising a scanner for obtaining data by reading an image in an original, wherein said data generator generates said second recording data in the RGB system based on the data received from said scanner.

* * * * *